US012233641B2

(12) United States Patent
Yamaguchi et al.

(10) Patent No.: US 12,233,641 B2
(45) Date of Patent: Feb. 25, 2025

(54) TAPE CASSETTE

(71) Applicant: BROTHER KOGYO KABUSHIKI KAISHA, Nagoya (JP)

(72) Inventors: Koshiro Yamaguchi, Kakamigahara (JP); Tsuyoshi Nagae, Kasugai (JP); Teruo Imamaki, Nissin (JP); Masato Kato, Kasugai (JP); Takashi Horiuchi, Kariya (JP); Akira Sago, Seto (JP); Yasuhiro Iriyama, Mie-ken (JP); Yasuhiro Shibata, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/943,869

(22) Filed: Sep. 13, 2022

(65) Prior Publication Data

US 2023/0082472 A1 Mar. 16, 2023

Related U.S. Application Data

(63) Continuation of application No. 16/924,874, filed on Jul. 9, 2020, now Pat. No. 11,479,053, which is a (Continued)

(30) Foreign Application Priority Data

Dec. 25, 2008 (JP) ................................ 2008-331634
Dec. 25, 2008 (JP) ................................ 2008-331635
(Continued)

(51) Int. Cl.
*B41J 11/00* (2006.01)
*B41J 3/407* (2006.01)
(Continued)

(52) U.S. Cl.
CPC .......... *B41J 11/009* (2013.01); *B41J 3/4075* (2013.01); *B41J 15/044* (2013.01); *B41J 32/00* (2013.01); *B41J 33/14* (2013.01)

(58) Field of Classification Search
None
See application file for complete search history.

(56) References Cited

U.S. PATENT DOCUMENTS 3,901,372 A 8/1975 Denley
4,127,883 A 11/1978 Mestdagh
(Continued)

FOREIGN PATENT DOCUMENTS

AU 2003294971 A1 7/2004
CA 2108332 A1 4/1994
(Continued)

OTHER PUBLICATIONS

Office Action dated Oct. 26, 2022 received in related U.S. Appl. No. 17/538,254.

(Continued)

*Primary Examiner* — Matthew G Marini
(74) *Attorney, Agent, or Firm* — Kenealy Vaidya LLP

(57) ABSTRACT

A tape cassette that includes a tape cassette that includes a housing having a top surface, a bottom surface, a rear wall, a front wall, and a tape feed exit located on the front wall, a tape included at least partially within the housing and configured to be fed along a tape feed path extending to the tape feed exit, and a first indicator aperture positioned on the front wall and a second indicator aperture position on a rear portion of the bottom surface. A position of the first indicator aperture on the front wall indicates a type of the tape included within the housing. A position of the second indicator aperture indicates a color of characters.

48 Claims, 41 Drawing Sheets

Related U.S. Application Data continuation of application No. 15/981,465, filed on May 16, 2018, now Pat. No. 10,744,798, which is a continuation of application No. 15/276,474, filed on Sep. 26, 2016, now Pat. No. 10,189,284, which is a continuation of application No. 14/226,380, filed on Mar. 26, 2014, now Pat. No. 9,649,861, which is a continuation of application No. 12/644,572, filed on Dec. 22, 2009, now Pat. No. 9,493,016.

(30) Foreign Application Priority Data

| | | |
|---|---|---|
| Dec. 25, 2008 | (JP) | 2008-331638 |
| Dec. 25, 2008 | (JP) | 2008-331639 |
| Dec. 25, 2008 | (JP) | 2008-331641 |
| Dec. 25, 2008 | (JP) | 2008-331642 |
| Dec. 25, 2008 | (JP) | 2008-331643 |
| Mar. 31, 2009 | (JP) | 2009-088440 |
| Mar. 31, 2009 | (JP) | 2009-088441 |
| Mar. 31, 2009 | (JP) | 2009-088456 |
| Mar. 31, 2009 | (JP) | 2009-088460 |
| Mar. 31, 2009 | (JP) | 2009-088468 |

(51) Int. Cl.

| | |
|---|---|
| ***B41J 15/04*** | (2006.01) |
| ***B41J 32/00*** | (2006.01) |
| ***B41J 33/14*** | (2006.01) |

(56) References Cited

U.S. PATENT DOCUMENTS

| | | | | | |
|---|---|---|---|---|---|
| 4,226,547 | A | | 10/1980 | Bradshaw et al. | |
| 4,360,278 | A | | 11/1982 | Paque | |
| D267,330 | S | | 12/1982 | Worrell | |
| 4,391,539 | A | | 7/1983 | Connoy | |
| 4,402,619 | A | | 9/1983 | Paque et al. | |
| 4,557,617 | A | | 12/1985 | Richardson et al. | |
| 4,567,488 | A | | 1/1986 | Moriguchi et al. | |
| 4,678,353 | A | | 7/1987 | Richardson et al. | |
| 4,725,155 | A | | 2/1988 | Kittel et al. | |
| 4,773,775 | A | | 9/1988 | Bradshaw et al. | |
| 4,815,871 | A | | 3/1989 | McGourty et al. | |
| 4,815,874 | A | | 3/1989 | Richardson et al. | |
| 4,815,875 | A | | 3/1989 | Richardson et al. | |
| 4,832,514 | A | | 5/1989 | Basile | |
| 4,844,636 | A | | 7/1989 | Paque | |
| 4,880,325 | A | | 11/1989 | Ueda et al. | |
| 4,892,425 | A | | 1/1990 | Shimizu et al. | |
| 4,907,902 | A | | 3/1990 | Doi | |
| D307,296 | S | | 4/1990 | Ivarson et al. | |
| 4,915,516 | A | | 4/1990 | Shimizu et al. | |
| 4,917,514 | A | | 4/1990 | Richardson et al. | |
| D307,918 | S | | 5/1990 | Goda | |
| 4,927,278 | A | | 5/1990 | Kuzuya et al. | |
| 4,930,913 | A | | 6/1990 | Basile | |
| D311,416 | S | | 10/1990 | Richardson et al. | |
| 4,966,476 | A | | 10/1990 | Kuzuya et al. | |
| 4,983,058 | A | | 1/1991 | Nagae | |
| 5,022,771 | A | | 6/1991 | Paque | |
| D319,070 | S | | 8/1991 | Lavander | |
| D320,391 | S | | 10/1991 | Paque | |
| 5,056,940 | A | | 10/1991 | Basile | |
| 5,078,523 | A | | 1/1992 | McGourty et al. | |
| 5,098,208 | A | | 3/1992 | Martinez | |
| 5,104,247 | A | | 4/1992 | Ohshima | |
| 5,111,216 | A | | 5/1992 | Richardson et al. | |
| 5,188,469 | A | | 2/1993 | Nagao et al. | |
| 5,193,919 | A | | 3/1993 | Godo et al. | |
| 5,195,835 | A | | 3/1993 | Collins | |
| 5,203,951 | A | | 4/1993 | Hattori et al. | |
| 5,223,939 | A | | 6/1993 | Imaizumi et al. | |
| 5,227,477 | A | | 7/1993 | Auerbach et al. | |
| 5,239,437 | A | | 8/1993 | Hoge et al. | |
| D342,275 | S | | 12/1993 | Cooper | |
| 5,273,272 | A | | 12/1993 | Nakamura et al. | |
| RE34,521 | E | | 1/1994 | Shimizu et al. | |
| 5,277,503 | A | | 1/1994 | Nagao | |
| 5,318,370 | A | | 6/1994 | Nehowig | |
| 5,348,406 | A | | 9/1994 | Yoshiaki et al. | |
| 5,350,243 | A | * | 9/1994 | Ichinomiya | B41J 32/00 242/615 |
| D352,305 | S | | 11/1994 | Cooper | |
| 5,374,132 | A | | 12/1994 | Kimura | |
| D356,333 | S | | 3/1995 | Pearce et al. | |
| 5,395,173 | A | | 3/1995 | Ueno et al. | |
| 5,399,033 | A | | 3/1995 | Putman | |
| D357,497 | S | | 4/1995 | Gray et al. | |
| 5,411,339 | A | | 5/1995 | Bahrabadi et al. | |
| 5,419,648 | A | | 5/1995 | Nagao et al. | |
| D359,303 | S | | 6/1995 | Gray et al. | |
| 5,424,757 | A | | 6/1995 | Thom | |
| 5,429,443 | A | | 7/1995 | Kobayashi et al. | |
| 5,431,504 | A | | 7/1995 | Beadman et al. | |
| 5,435,657 | A | | 7/1995 | Pearce et al. | |
| 5,454,650 | A | | 10/1995 | Yamaguchi | |
| 5,466,076 | A | | 11/1995 | Kobayashi et al. | |
| 5,492,282 | A | | 2/1996 | Okuchi et al. | |
| 5,492,420 | A | | 2/1996 | Nunokawa et al. | |
| 5,494,362 | A | | 2/1996 | Kobayashi et al. | |
| 5,506,736 | A | | 4/1996 | Ota | |
| 5,511,891 | A | | 4/1996 | Nehowig et al. | |
| 5,518,328 | A | | 5/1996 | Okuchi et al. | |
| D372,044 | S | | 7/1996 | Ware et al. | |
| 5,533,818 | A | | 7/1996 | Bahrabadi | |
| 5,536,092 | A | | 7/1996 | Yamaguchi | |
| 5,538,352 | A | | 7/1996 | Sugiura | |
| 5,540,510 | A | | 7/1996 | Sims et al. | |
| 5,541,796 | A | | 7/1996 | Sawada | |
| 5,553,952 | A | | 9/1996 | Umbach | |
| 5,564,843 | A | | 10/1996 | Kawaguchi | |
| 5,593,237 | A | | 1/1997 | Nozaki et al. | |
| 5,595,447 | A | | 1/1997 | Takayama et al. | |
| 5,599,119 | A | | 2/1997 | Nunokawa et al. | |
| 5,605,404 | A | | 2/1997 | Nunokawa et al. | |
| 5,620,268 | A | | 4/1997 | Yamaguchi et al. | |
| 5,634,728 | A | | 6/1997 | Nunokawa et al. | |
| 5,653,542 | A | | 8/1997 | Sugimoto et al. | |
| 5,658,083 | A | | 8/1997 | Day et al. | |
| 5,659,441 | A | | 8/1997 | Eckberg et al. | |
| 5,709,486 | A | | 1/1998 | Day | |
| 5,727,888 | A | | 3/1998 | Sugimoto et al. | |
| 5,730,536 | A | | 3/1998 | Yamaguchi | |
| 5,739,839 | A | | 4/1998 | Iwai et al. | |
| 5,752,777 | A | | 5/1998 | Nunokawa et al. | |
| 5,755,519 | A | | 5/1998 | Klinefelter | |
| 5,765,954 | A | | 6/1998 | Nunokawa et al. | |
| 5,771,803 | A | | 6/1998 | Takami | |
| 5,788,387 | A | | 8/1998 | Takayama et al. | |
| 5,795,086 | A | | 8/1998 | Watanabe et al. | |
| 5,813,773 | A | | 9/1998 | Kawai | |
| 5,813,779 | A | | 9/1998 | Palmer et al. | |
| 5,823,689 | A | | 10/1998 | Nehowig et al. | |
| 5,825,724 | A | | 10/1998 | Matsumoto et al. | |
| 5,826,995 | A | | 10/1998 | Day et al. | |
| 5,857,788 | A | | 1/1999 | Gutsell et al. | |
| 5,860,752 | A | | 1/1999 | Watanabe et al. | |
| 5,887,993 | A | | 3/1999 | Nunokawa et al. | |
| 5,903,294 | A | | 5/1999 | Abe et al. | |
| 5,961,225 | A | | 10/1999 | Nunokawa et al. | |
| 5,964,539 | A | | 10/1999 | Yamaguchi et al. | |
| 5,967,678 | A | | 10/1999 | Nunokawa et al. | |
| 5,997,194 | A | | 12/1999 | Nunokawa et al. | |
| 6,012,860 | A | | 1/2000 | Nunokawa et al. | |
| 6,016,749 | A | | 1/2000 | Tukahara et al. | |
| 6,042,280 | A | | 3/2000 | Yamaguchi et al. | |
| 6,048,118 | A | | 4/2000 | Martinez et al. | |
| 6,050,672 | A | * | 4/2000 | Matsuhashi | B41J 3/407 347/86 |
| 6,050,734 | A | | 4/2000 | Watanabe et al. | |
| 6,059,469 | A | | 5/2000 | Hirumi | |
| 6,106,171 | A | | 8/2000 | Nunokawa et al. | |

(56) References Cited

U.S. PATENT DOCUMENTS

| | | | |
|---|---|---|---|
| 6,116,796 | A | 9/2000 | Yamaguchi et al. |
| 6,126,344 | A | 10/2000 | Takayama et al. |
| 6,132,120 | A | 10/2000 | Yamaguchi et al. |
| 6,146,034 | A | 11/2000 | Watanabe et al. |
| 6,149,325 | A | 11/2000 | Nunokawa et al. |
| 6,160,679 | A | 12/2000 | Maekawa et al. |
| 6,167,696 | B1 | 1/2001 | Maaseidvaag et al. |
| 6,168,328 | B1 | 1/2001 | Ueda et al. |
| 6,190,065 | B1 | 2/2001 | Brzuskiewicz |
| 6,190,067 | B1 | 2/2001 | Kobayashi et al. |
| 6,190,069 | B1 | 2/2001 | Yamaguchi et al. |
| 6,196,740 | B1 | 3/2001 | Yamaguchi et al. |
| 6,227,477 | B1 | 5/2001 | Komatsuzaki et al. |
| 6,232,993 | B1 | 5/2001 | Kobayashi et al. |
| 6,247,860 | B1 | 6/2001 | Yanagisawa |
| 6,270,269 | B1 | 8/2001 | Watanabe et al. |
| 6,317,156 | B1 | 11/2001 | Nagasaki et al. |
| 6,334,724 | B2 | 1/2002 | Yamaguchi et al. |
| 6,366,425 | B1 | 4/2002 | Kletzl et al. |
| 6,386,774 | B1 | 5/2002 | Takayama et al. |
| 6,406,202 | B1 | 6/2002 | Unno et al. |
| 6,419,648 | B1 | 7/2002 | Vitek et al. |
| 6,429,443 | B1 | 8/2002 | Mankos et al. |
| 6,435,744 | B1 | 8/2002 | Dunn et al. |
| 6,476,838 | B1 | 11/2002 | Italiano |
| 6,485,206 | B1 | 11/2002 | Takahashi |
| 6,520,696 | B2 | 2/2003 | Huss et al. |
| 6,644,876 | B2 | 11/2003 | Carriere et al. |
| D486,853 | S | 2/2004 | Wilken et al. |
| 6,707,571 | B1 | 3/2004 | Kurashina |
| 6,709,179 | B2 | 3/2004 | Yamaguchi et al. |
| 6,910,819 | B2 | 6/2005 | Carriere et al. |
| 6,929,415 | B2 | 8/2005 | Wilken |
| 6,955,318 | B2 | 10/2005 | Nonomura |
| D519,522 | S | 4/2006 | Lee |
| 7,070,347 | B2 | 7/2006 | Carriere et al. |
| 7,070,348 | B2 | 7/2006 | Sugimoto et al. |
| 7,097,372 | B1 | 8/2006 | Heyse et al. |
| 7,121,751 | B2 | 10/2006 | Harada et al. |
| 7,128,483 | B2 | 10/2006 | Harada et al. |
| D534,203 | S | 12/2006 | Harada et al. |
| 7,201,522 | B2 | 4/2007 | Bandholz et al. |
| D542,334 | S | 5/2007 | Harada et al. |
| 7,232,268 | B2 | 6/2007 | Sugimoto et al. |
| 7,251,044 | B1 | 7/2007 | Kurashina |
| 7,287,715 | B2 | 10/2007 | Ban |
| 7,296,941 | B2 | 11/2007 | Suzuki et al. |
| 7,357,585 | B2 | 4/2008 | Kurashina |
| 7,404,684 | B2 | 7/2008 | Sugimoto et al. |
| D579,942 | S | 11/2008 | Terry et al. |
| 7,503,714 | B2 | 3/2009 | Yamamoto et al. |
| 7,841,790 | B2 | 11/2010 | Yamaguchi et al. |
| 7,942,594 | B2 | 5/2011 | Kumazaki et al. |
| 7,965,308 | B2 | 6/2011 | Jauert et al. |
| 8,045,288 | B2 | 10/2011 | Ota et al. |
| 8,109,684 | B2 | 2/2012 | Yamaguchi |
| 8,162,553 | B2 | 4/2012 | Vandermeulen |
| 8,164,609 | B2 | 4/2012 | Liu et al. |
| 8,382,389 | B2 | 2/2013 | Yamaguchi et al. |
| D681,727 | S | 5/2013 | Van Den Broecke |
| 8,529,142 | B2 | 9/2013 | Tanaka |
| 8,540,444 | B2 | 9/2013 | Vandermeulen et al. |
| 8,550,393 | B2 | 10/2013 | Tada |
| 8,562,228 | B2 | 10/2013 | Yamaguchi et al. |
| 8,641,304 | B2 * | 2/2014 | Yamaguchi .............. B41J 32/00 400/208 |
| 8,734,035 | B2 | 5/2014 | Suva et al. |
| 8,740,482 | B2 | 6/2014 | Yamaguchi et al. |
| 8,757,907 | B2 | 6/2014 | Yamaguchi et al. |
| 8,764,326 | B2 | 7/2014 | Yamaguchi et al. |
| 8,770,877 | B2 | 7/2014 | Yamaguchi et al. |
| 9,403,389 | B2 | 8/2016 | Yamaguchi et al. |
| 9,498,998 | B2 | 11/2016 | Yamaguchi et al. |
| 9,533,522 | B2 | 1/2017 | Yamaguchi et al. |
| 9,566,808 | B2 | 2/2017 | Yamaguchi et al. |
| 9,649,861 | B2 | 5/2017 | Yamaguchi et al. |
| 9,656,495 | B2 | 5/2017 | Noda |
| 9,802,432 | B2 | 10/2017 | Yamaguchi et al. |
| 9,815,295 | B2 | 11/2017 | Kudo et al. |
| 9,855,768 | B2 | 1/2018 | Tanizaki |
| 9,855,779 | B2 | 1/2018 | Yamaguchi et al. |
| 10,226,949 | B2 | 3/2019 | Yamaguchi et al. |
| 10,265,982 | B2 | 4/2019 | Noda |
| 10,315,442 | B2 | 6/2019 | Sato |
| 10,391,732 | B2 | 8/2019 | Tanaka |
| 10,414,176 | B2 | 9/2019 | Kawai |
| 10,625,527 | B2 | 4/2020 | Sato |
| 10,675,894 | B2 | 6/2020 | Yamaguchi et al. |
| 11,052,685 | B2 | 7/2021 | Yamaguchi et al. |
| 2002/0006303 | A1 | 1/2002 | Yamaguchi et al. |
| 2002/0012558 | A1 | 1/2002 | Huss et al. |
| 2002/0047063 | A1 | 4/2002 | Kaneda et al. |
| 2002/0085080 | A1 | 7/2002 | Kurashina |
| 2002/0135938 | A1 | 9/2002 | Hiraguchi et al. |
| 2003/0081978 | A1 | 5/2003 | Carriere et al. |
| 2004/0056143 | A1 | 3/2004 | Nonomura |
| 2004/0062586 | A1 | 4/2004 | Harada et al. |
| 2004/0233269 | A1 | 11/2004 | Tsubota |
| 2004/0265027 | A1 | 12/2004 | Hine et al. |
| 2005/0036816 | A1 | 2/2005 | Carriere et al. |
| 2005/0117881 | A1 * | 6/2005 | Baba ...................... G11B 15/07 386/323 |
| 2005/0152732 | A1 | 7/2005 | Bandholz et al. |
| 2005/0172981 | A1 | 8/2005 | Byun |
| 2006/0008608 | A1 | 1/2006 | Kurashina |
| 2006/0088802 | A1 | 4/2006 | Akaiwa |
| 2006/0121229 | A1 | 6/2006 | Nagae |
| 2006/0182921 | A1 | 8/2006 | Hioki et al. |
| 2006/0193669 | A1 | 8/2006 | Takada et al. |
| 2006/0204304 | A1 | 9/2006 | Hioki et al. |
| 2006/0216099 | A1 | 9/2006 | Sakano et al. |
| 2006/0216100 | A1 | 9/2006 | Minoya et al. |
| 2006/0233582 | A1 * | 10/2006 | Horiuchi ................ B41J 15/044 400/208 |
| 2006/0233583 | A1 | 10/2006 | Ono |
| 2006/0238600 | A1 | 10/2006 | Vandermeulen et al. |
| 2006/0239743 | A1 | 10/2006 | Naito |
| 2007/0009302 | A1 | 1/2007 | Vandermeulen |
| 2007/0009306 | A1 | 1/2007 | Harada et al. |
| 2007/0031171 | A1 | 2/2007 | Heyse et al. |
| 2007/0041772 | A1 | 2/2007 | Harada et al. |
| 2007/0070168 | A1 | 3/2007 | Mindler et al. |
| 2007/0098473 | A1 | 5/2007 | Heyse et al. |
| 2007/0172293 | A1 | 7/2007 | Vandermeulen |
| 2007/0212149 | A1 | 9/2007 | Ota et al. |
| 2007/0212151 | A1 | 9/2007 | Innocenti et al. |
| 2007/0231041 | A1 | 10/2007 | Ueda et al. |
| 2007/0237562 | A1 | 10/2007 | Kato et al. |
| 2007/0264070 | A1 | 11/2007 | Loo et al. |
| 2007/0283249 | A1 | 12/2007 | Nose et al. |
| 2008/0003043 | A1 | 1/2008 | Fukui et al. |
| 2008/0029530 | A1 | 2/2008 | Yuyama et al. |
| 2008/0050160 | A1 | 2/2008 | Yamaguchi et al. |
| 2008/0056793 | A1 | 3/2008 | Yokoyama |
| 2008/0080922 | A1 | 4/2008 | Vandermeulen |
| 2008/0165009 | A1 | 7/2008 | Hirota |
| 2008/0181703 | A1 | 7/2008 | Ito et al. |
| 2008/0181708 | A1 | 7/2008 | Yamaguchi et al. |
| 2008/0205958 | A1 | 8/2008 | Moriyama et al. |
| 2008/0226373 | A1 | 9/2008 | Yamaguchi et al. |
| 2008/0232886 | A1 | 9/2008 | Kato et al. |
| 2008/0310904 | A1 | 12/2008 | Yamaguchi et al. |
| 2009/0016795 | A1 | 1/2009 | Caveney et al. |
| 2009/0085451 | A1 | 4/2009 | Yuyama et al. |
| 2009/0190988 | A1 | 7/2009 | Vereecken et al. |
| 2009/0202283 | A1 | 8/2009 | Kumazaki et al. |
| 2009/0231607 | A1 | 9/2009 | Kurashina |
| 2009/0285617 | A1 | 11/2009 | Vandermeulen |
| 2010/0119280 | A1 | 5/2010 | Vandermeulen |
| 2010/0119281 | A1 | 5/2010 | Ford et al. |
| 2010/0166475 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0232862 | A1 | 9/2010 | Vandermeulen |

(56) References Cited

U.S. PATENT DOCUMENTS

| | | | |
|---|---|---|---|
| 2010/0247206 | A1 | 9/2010 | Yamaguchi et al. |
| 2010/0247208 | A1 | 9/2010 | Yamaguchi et al. |
| 2010/0247209 | A1 | 9/2010 | Yamaguchi et al. |
| 2010/0247210 | A1 | 9/2010 | Yamaguchi et al. |
| 2010/0250233 | A1 | 9/2010 | Tanaka |
| 2010/0272492 | A1 | 10/2010 | Van Britsom et al. |
| 2011/0058884 | A1 | 3/2011 | Kato et al. |
| 2012/0008999 | A1 | 1/2012 | Yamaguchi et al. |
| 2012/0009001 | A1 | 1/2012 | Sago et al. |
| 2012/0027485 | A1 | 2/2012 | Suva et al. |
| 2012/0027486 | A1 | 2/2012 | Suva et al. |
| 2012/0027487 | A1 | 2/2012 | Suva et al. |
| 2012/0057917 | A1 | 3/2012 | Van Britsom et al. |
| 2012/0080550 | A1 | 4/2012 | Yamaguchi et al. |
| 2012/0170959 | A1 | 7/2012 | Vandermeulen et al. |
| 2012/0175454 | A1 | 7/2012 | Noda |
| 2012/0188325 | A1 | 7/2012 | Yamaguchi et al. |
| 2012/0189366 | A1 | 7/2012 | Yamaguchi et al. |
| 2012/0201588 | A1 | 8/2012 | Yamaguchi et al. |
| 2014/0205350 | A1 | 7/2014 | Yamaguchi et al. |
| 2014/0218458 | A1 | 8/2014 | Suva et al. |
| 2015/0283837 | A1 | 10/2015 | Sakano |
| 2017/0100948 | A1 | 4/2017 | Yamaguchi et al. |
| 2017/0305163 | A1 | 10/2017 | Kimura et al. |
| 2018/0257400 | A1 | 9/2018 | Yamaguchi |
| 2018/0345673 | A1 | 12/2018 | Shirono et al. |

FOREIGN PATENT DOCUMENTS

| | | | |
|---|---|---|---|
| CA | 2182264 | A1 | 6/1996 |
| CH | 121073 | | 6/1927 |
| CH | 136498 | | 11/1929 |
| CN | 1063641 | A | 8/1992 |
| CN | 1098984 | A | 2/1995 |
| CN | 1119146 | A | 3/1996 |
| CN | 1143928 | A | 2/1997 |
| CN | 1146954 | A | 4/1997 |
| CN | 1148547 | A | 4/1997 |
| CN | 1148548 | A | 4/1997 |
| CN | 1166155 | A | 11/1997 |
| CN | 1209776 | A | 3/1999 |
| CN | 1289293 | A | 3/2001 |
| CN | 1313197 | A | 9/2001 |
| CN | 1313198 | A | 9/2001 |
| CN | 1085151 | C | 5/2002 |
| CN | 1376115 | A | 10/2002 |
| CN | 1385312 | A | 12/2002 |
| CN | 1385313 | A | 12/2002 |
| CN | 1385314 | A | 12/2002 |
| CN | 1397431 | A | 2/2003 |
| CN | 1415482 | A | 5/2003 |
| CN | 1415484 | A | 5/2003 |
| CN | 1415485 | A | 5/2003 |
| CN | 1469811 | A | 1/2004 |
| CN | 1493462 | A | 5/2004 |
| CN | 1636755 | A | 7/2005 |
| CN | 1642746 | A | 7/2005 |
| CN | 1663807 | A | 9/2005 |
| CN | 1744993 | A | 3/2006 |
| CN | 1744994 | A | 3/2006 |
| CN | 1762720 | A | 4/2006 |
| CN | 1785685 | A | 6/2006 |
| CN | 1799850 | A | 7/2006 |
| CN | 1799851 | A | 7/2006 |
| CN | 1820940 | A | 8/2006 |
| CN | 1827386 | A | 9/2006 |
| CN | 1829607 | A | 9/2006 |
| CN | 1835867 | A | 9/2006 |
| CN | 1865012 | A | 11/2006 |
| CN | 1914045 | A | 2/2007 |
| CN | 1990261 | A | 7/2007 |
| CN | 1331684 | C | 8/2007 |
| CN | 101028771 | A | 9/2007 |
| CN | 101035683 | A | 9/2007 |
| CN | 101039807 | A | 9/2007 |
| CN | 101060985 | A | 10/2007 |
| CN | 101077664 | A | 11/2007 |
| CN | 101128324 | A | 2/2008 |
| CN | 201030694 | Y | 3/2008 |
| CN | 101229724 | A | 7/2008 |
| CN | 101264701 | A | 9/2008 |
| CN | 101264702 | A | 9/2008 |
| CN | 101310989 | A | 11/2008 |
| CN | 101327696 | A | 12/2008 |
| CN | 101356061 | A | 1/2009 |
| CN | 101516628 | A | 8/2009 |
| CN | 101758676 | A | 6/2010 |
| CN | 102616025 | A | 8/2012 |
| CN | 202895934 | U | 4/2013 |
| EP | 214466 | A2 | 3/1987 |
| EP | 0329369 | A2 | 8/1989 |
| EP | 0511602 | A1 | 11/1992 |
| EP | 0555954 | B1 | 8/1993 |
| EP | 0593269 | A2 | 4/1994 |
| EP | 0629509 | A2 | 12/1994 |
| EP | 0635375 | A2 | 1/1995 |
| EP | 0644506 | A2 | 3/1995 |
| EP | 0684143 | A2 | 11/1995 |
| EP | 0703089 | A1 | 3/1996 |
| EP | 734878 | A2 | 10/1996 |
| EP | 0742103 | A1 | 11/1996 |
| EP | 0760291 | A2 | 3/1997 |
| EP | 0863021 | B1 | 9/1998 |
| EP | 0644506 | B1 | 4/1999 |
| EP | 0936076 | A2 | 8/1999 |
| EP | 0940263 | A2 | 9/1999 |
| EP | 0958931 | A2 | 11/1999 |
| EP | 0997300 | A2 | 5/2000 |
| EP | 1167049 | A1 | 1/2002 |
| EP | 1170139 | A1 | 1/2002 |
| EP | 1199179 | A1 | 4/2002 |
| EP | 1284196 | A2 | 2/2003 |
| EP | 1502758 | A1 | 2/2005 |
| EP | 1516739 | A1 | 3/2005 |
| EP | 1552949 | A1 | 7/2005 |
| EP | 1575781 | A1 | 9/2005 |
| EP | 1700705 | A1 | 9/2006 |
| EP | 1707395 | A1 | 10/2006 |
| EP | 1829696 | A2 | 9/2007 |
| EP | 2059396 | A1 | 5/2009 |
| EP | 2236303 | A1 | 10/2010 |
| EP | 2236304 | A1 | 10/2010 |
| EP | 2448762 | B1 | 9/2013 |
| JP | S56-20944 | U | 2/1981 |
| JP | S58-139415 | U | 9/1983 |
| JP | S58-220783 | A | 12/1983 |
| JP | S59-78879 | A | 5/1984 |
| JP | S60-99692 | A | 6/1985 |
| JP | S61-179776 | A | 8/1986 |
| JP | S62-173944 | U | 11/1987 |
| JP | S63-81063 | U | 5/1988 |
| JP | S63-166557 | A | 7/1988 |
| JP | S63-203348 | A | 8/1988 |
| JP | S63-254085 | A | 10/1988 |
| JP | H01-195088 | A | 8/1989 |
| JP | H01-146945 | U | 10/1989 |
| JP | H02-56664 | U | 4/1990 |
| JP | H02-56665 | U | 4/1990 |
| JP | H02-56666 | U | 4/1990 |
| JP | H02-147272 | A | 6/1990 |
| JP | H03-14865 | A | 1/1991 |
| JP | H03-63155 | A | 3/1991 |
| JP | H03-93584 | A | 4/1991 |
| JP | H03-151261 | A | 6/1991 |
| JP | H03-118672 | U | 12/1991 |
| JP | H03-120680 | A | 12/1991 |
| JP | H11-263055 | A | 12/1991 |
| JP | H04-16113 | U | 2/1992 |
| JP | H04-37575 | A | 2/1992 |
| JP | H04-133756 | A | 5/1992 |
| JP | H04-168086 | A | 6/1992 |
| JP | H05-16342 | U | 3/1993 |
| JP | H05-18853 | U | 3/1993 |
| JP | H05-63067 | A | 3/1993 |

(56) References Cited

FOREIGN PATENT DOCUMENTS

| | | | |
|---|---|---|---|
| JP | H05-104840 | A | 4/1993 |
| JP | H05-155067 | A | 6/1993 |
| JP | 5-51662 | U | 7/1993 |
| JP | H05-54225 | U | 7/1993 |
| JP | H05-78565 | U | 10/1993 |
| JP | H05-80765 | U | 11/1993 |
| JP | H05-294051 | A | 11/1993 |
| JP | H05-301435 | A | 11/1993 |
| JP | H06-12053 | U | 2/1994 |
| JP | H06-52560 | A | 2/1994 |
| JP | 106-21953 | U | 3/1994 |
| JP | 106-124406 | A | 5/1994 |
| JP | H06-122239 | A | 5/1994 |
| JP | H06-122249 | A | 5/1994 |
| JP | H06-127094 | A | 5/1994 |
| JP | H06-152907 | A | 5/1994 |
| JP | H06143761 | A | 5/1994 |
| JP | 106-191081 | A | 7/1994 |
| JP | H06-53560 | U | 7/1994 |
| JP | H06-183117 | A | 7/1994 |
| JP | H06-210889 | A | 8/1994 |
| JP | H06-255145 | A | 9/1994 |
| JP | H06-74348 | U | 10/1994 |
| JP | H06-328800 | A | 11/1994 |
| JP | H07-1782 | A | 1/1995 |
| JP | H07-1805 | A | 1/1995 |
| JP | H07-9743 | A | 1/1995 |
| JP | H07-20725 | A | 1/1995 |
| JP | H07-25122 | A | 1/1995 |
| JP | H07-25123 | A | 1/1995 |
| JP | H07-47737 | A | 2/1995 |
| JP | H07-61009 | A | 3/1995 |
| JP | H07-68814 | A | 3/1995 |
| JP | H07-68877 | A | 3/1995 |
| JP | H07-069497 | A | 3/1995 |
| JP | H07-89115 | A | 4/1995 |
| JP | H07-89196 | A | 4/1995 |
| JP | H07-101133 | A | 4/1995 |
| JP | H07-108702 | A | 4/1995 |
| JP | H07-108730 | A | 4/1995 |
| JP | H07-137327 | A | 5/1995 |
| JP | H07-164680 | A | 6/1995 |
| JP | H107-40456 | U | 7/1995 |
| JP | H07-214876 | A | 8/1995 |
| JP | H07-237314 | A | 9/1995 |
| JP | H07-251539 | A | 10/1995 |
| JP | H07-276695 | A | 10/1995 |
| JP | H07-290803 | A | 11/1995 |
| JP | H07-314862 | A | 12/1995 |
| JP | H07-314864 | A | 12/1995 |
| JP | H07-314865 | A | 12/1995 |
| JP | H07-314866 | A | 12/1995 |
| JP | H08-25768 | A | 1/1996 |
| JP | H08-39909 | A | 2/1996 |
| JP | H08-058211 | A | 3/1996 |
| JP | H108-90887 | A | 4/1996 |
| JP | H08-118738 | A | 5/1996 |
| JP | H08-165035 | A | 6/1996 |
| JP | H08-216461 | A | 8/1996 |
| JP | H08-252964 | A | 10/1996 |
| JP | H08-267839 | A | 10/1996 |
| JP | H08-290618 | A | 11/1996 |
| JP | H08-290681 | A | 11/1996 |
| JP | H09-39347 | A | 2/1997 |
| JP | 9-76614 | A | 3/1997 |
| JP | H09-85928 | A | 3/1997 |
| JP | 2596263 | B2 | 4/1997 |
| JP | H09-109533 | A | 4/1997 |
| JP | H09-118044 | A | 5/1997 |
| JP | H09-123579 | A | 5/1997 |
| JP | H09-134557 | A | 5/1997 |
| JP | H09-141986 | A | 6/1997 |
| JP | H109-141997 | A | 6/1997 |
| JP | 109-188049 | A | 7/1997 |
| JP | H09-188050 | A | 7/1997 |
| JP | H09-240158 | A | 9/1997 |
| JP | 9-277673 | A | 10/1997 |
| JP | H10-56604 | A | 2/1998 |
| JP | H10-181063 | A | 7/1998 |
| JP | H10-301701 | A | 11/1998 |
| JP | H11-78188 | A | 3/1999 |
| JP | H11-78189 | A | 3/1999 |
| JP | H11-91144 | A | 4/1999 |
| JP | H11-105351 | A | 4/1999 |
| JP | H11-129563 | A | 5/1999 |
| JP | H11-263056 | A | 9/1999 |
| JP | 2000-006481 | A | 1/2000 |
| JP | 2000-006501 | A | 1/2000 |
| JP | 2000-025251 | A | 1/2000 |
| JP | 2000-025316 | A | 1/2000 |
| JP | 2998617 | B2 | 1/2000 |
| JP | 2000-043336 | A | 2/2000 |
| JP | 2000-043337 | A | 2/2000 |
| JP | 2000-076372 | A | 3/2000 |
| JP | 2000-085224 | A | 3/2000 |
| JP | 2000-103129 | A | 4/2000 |
| JP | 2000-103131 | A | 4/2000 |
| JP | 3031439 | B2 | 4/2000 |
| JP | 2000-135843 | A | 5/2000 |
| JP | 2000-198258 | A | 7/2000 |
| JP | 2000-211193 | A | 8/2000 |
| JP | 2000-229750 | A | 8/2000 |
| JP | 2001-011594 | A | 1/2001 |
| JP | 2001-048389 | A | 2/2001 |
| JP | 2001-088359 | A | 4/2001 |
| JP | 2001-121797 | A | 5/2001 |
| JP | 3207860 | B2 | 9/2001 |
| JP | 2001-310540 | A | 11/2001 |
| JP | 2001-319447 | A | 11/2001 |
| JP | 2002-042441 | A | 2/2002 |
| JP | 2002-053248 | A | 2/2002 |
| JP | 3266736 | B2 | 3/2002 |
| JP | 3266739 | B2 | 3/2002 |
| JP | 2002-103762 | A | 4/2002 |
| JP | 2002-104568 | A | 4/2002 |
| JP | 2002-166605 | A | 6/2002 |
| JP | 2002-166606 | A | 6/2002 |
| JP | 2002-167084 | A | 6/2002 |
| JP | 2002-179300 | A | 6/2002 |
| JP | 2002-192769 | A | 7/2002 |
| JP | 2002-308481 | A | 10/2002 |
| JP | 2002-308518 | A | 10/2002 |
| JP | 2002-367333 | A | 12/2002 |
| JP | 3357128 | B2 | 12/2002 |
| JP | 2003-011454 | A | 1/2003 |
| JP | 2003-026164 | A | 1/2003 |
| JP | 2003-048337 | A | 2/2003 |
| JP | 2003-506235 | A | 2/2003 |
| JP | 3378622 | B2 | 2/2003 |
| JP | 2003-072127 | A | 3/2003 |
| JP | 2003-145902 | A | 5/2003 |
| JP | 3426983 | B2 | 7/2003 |
| JP | 2003-251902 | A | 9/2003 |
| JP | 2003-251904 | A | 9/2003 |
| JP | 2003-285522 | A | 10/2003 |
| JP | 2004-018077 | A | 1/2004 |
| JP | 2004-155150 | A | 6/2004 |
| JP | 3543659 | B2 | 7/2004 |
| JP | 2004-255656 | A | 9/2004 |
| JP | 3564848 | B2 | 9/2004 |
| JP | 3567469 | B2 | 9/2004 |
| JP | 2004-291591 | A | 10/2004 |
| JP | 2004-323241 | A | 11/2004 |
| JP | 3106187 | U | 12/2004 |
| JP | 2005-059504 | A | 3/2005 |
| JP | 2005-088597 | A | 4/2005 |
| JP | 2005-178206 | A | 7/2005 |
| JP | 2005-231203 | A | 9/2005 |
| JP | 2005-280008 | A | 10/2005 |
| JP | 2005-297348 | A | 10/2005 |
| JP | 2005-298031 | A | 10/2005 |
| JP | 2006-021432 | A | 1/2006 |
| JP | 2006-096030 | A | 4/2006 |
| JP | 2006-512224 | A | 4/2006 |

(56) References Cited

FOREIGN PATENT DOCUMENTS

| | | | |
|---|---|---|---|
| JP | 2006-142835 | A | 6/2006 |
| JP | 2006-168974 | A | 6/2006 |
| JP | 2006-182034 | A | 7/2006 |
| JP | 2006-224675 | A | 8/2006 |
| JP | 2006-240310 | A | 9/2006 |
| JP | 2006-248059 | A | 9/2006 |
| JP | 2006-264337 | A | 10/2006 |
| JP | 2006-272895 | A | 10/2006 |
| JP | 2006-272977 | A | 10/2006 |
| JP | 2006-289991 | A | 10/2006 |
| JP | 2007-070028 | A | 3/2007 |
| JP | 2007-111863 | A | 5/2007 |
| JP | 2007-196654 | A | 8/2007 |
| JP | 2007-230155 | A | 9/2007 |
| JP | 2007-268815 | A | 10/2007 |
| JP | 2007-296863 | A | 11/2007 |
| JP | 4003068 | B2 | 11/2007 |
| JP | 2007-313681 | A | 12/2007 |
| JP | 2008-044180 | A | 2/2008 |
| JP | 2008-062474 | A | 3/2008 |
| JP | 4061507 | B2 | 3/2008 |
| JP | 2008-080668 | A | 4/2008 |
| JP | 2008-083432 | A | 4/2008 |
| JP | 2008-094103 | A | 4/2008 |
| JP | 2008-509823 | A | 4/2008 |
| JP | 2008-213462 | A | 9/2008 |
| JP | 2008-229855 | A | 10/2008 |
| JP | 2008-254384 | A | 10/2008 |
| JP | 2008-265180 | A | 11/2008 |
| JP | 2008-265278 | A | 11/2008 |
| JP | 2008-279678 | A | 11/2008 |
| JP | 2008-307703 | A | 12/2008 |
| JP | 2009-001020 | A | 1/2009 |
| JP | 2009-028976 | A | 2/2009 |
| JP | 2009-509812 | A | 3/2009 |
| JP | 2009-184832 | A | 8/2009 |
| JP | 2009-214431 | A | 9/2009 |
| JP | 2009-215083 | A | 9/2009 |
| JP | 2010-234697 | A | 10/2010 |
| JP | 4571626 | B2 | 10/2010 |
| JP | 2011-011401 | A | 1/2011 |
| JP | 2011-011407 | A | 1/2011 |
| JP | 2011-110843 | A | 6/2011 |
| JP | 2011-110845 | A | 6/2011 |
| JP | 2011-110848 | A | 6/2011 |
| KR | 2007-0091073 | A | 9/2007 |
| RU | 2297333 | C2 | 4/2007 |
| TW | 200827179 | A | 7/2008 |
| WO | 96/16812 | A1 | 6/1996 |
| WO | 2000032401 | A1 | 6/2000 |
| WO | 0110649 | A1 | 2/2001 |
| WO | 0232680 | A1 | 4/2002 |
| WO | 03080350 | A1 | 10/2003 |
| WO | 2004/058509 | A1 | 7/2004 |
| WO | 2005101306 | A1 | 10/2005 |
| WO | 2005/120844 | A1 | 12/2005 |
| WO | 20060013466 | A2 | 2/2006 |
| WO | 2006024913 | A2 | 3/2006 |
| WO | 2006033431 | A1 | 3/2006 |
| WO | 2006033432 | A1 | 3/2006 |
| WO | 2006090842 | A1 | 8/2006 |
| WO | 2008/029931 | A1 | 3/2008 |
| WO | 2009107534 | A1 | 9/2009 |
| WO | 2010-113782 | A1 | 10/2010 |
| WO | 2010113445 | A1 | 10/2010 |

OTHER PUBLICATIONS

Notice of Allowance dated Oct. 26, 2022 received in related U.S. Appl. No. 17/339,374.
Office Action dated Nov. 9, 2022 received in related U.S. Appl. No. 17/677,455.
Feb. 16, 2016—(US) Non-Final Office Action—U.S. Appl. No. 14/867,877.
Feb. 24, 2016—(US) Non-Final Office Action—U.S. Appl. No. 14/226,262.
Feb. 25, 2016—(US) Non-Final Office Action—U.S. Appl. No. 14/141,568.
Feb. 22, 2016—(US) Non-Final Office Action—U.S. Appl. No. 14/226,386.
Feb. 23, 2016—(US) Final Office Action—U.S. Appl. No. 14/226,424.
Mar. 4, 2016—(US) Notice of Allowance—U.S. Appl. No. 14/643,865.
Mar. 15, 2016—(US) Notice of Allowance—U.S. Appl. No. 14/226,367.
Mar. 29, 2016—(US) Notice of Allowance—U.S. Appl. No. 13/431,350.
Mar. 29, 2016—(US) Notice of Allowance—U.S. Appl. No. 14/641,681.
Apr. 18, 2016—(US) Final Office Action—U.S. Appl. No. 14/226,373.
Apr. 19, 2016—(US) Notice of Allowance—U.S. Appl. No. 14/226,417.
Apr. 21, 2016—(US) Notice of Allowance—U.S. Appl. No. 14/226,428.
May 25, 2016—(US) Notice of Allowance—App 14/755,141.
Aug. 16, 2016—(US) Notice of Allowance—U.S. Appl. No. 13/240,322.
Jun. 1, 2016—(US) Non-Final Office Action—U.S. Appl. No. 14/226,259 (no new art).
Jun. 2, 2016—(US) Non-Final Office Action—U.S. Appl. No. 14/226,165.
Jul. 4, 2017—(CN) Office Action—App 201510714069.5 with English Translation.
Dec. 28, 2016—(US) Notice of Allowance—U.S. Appl. No. 14/226,380.
Jan. 8, 2018—(US) Non-Final Office Action—U.S. Appl. No. 15/226,188.
Nov. 6, 2017—(CN) Office Action—App 201610344359.X with English Translation.
Jul. 5, 2017—(US) Office Action—U.S. Appl. No. 15/357,004.
Dec. 20, 2017—(US) Notice of Allowance—U.S. Appl. No. 15/389,497.
Aug. 25, 2017—(US) Office Action—U.S. Appl. No. 15/389,497.
Sep. 22, 2016—(KR) Notice of Final Rejection—App 10-2011-7021961, Eng Tran.
Notice of Allowance dated Apr. 8, 2020 received in related U.S. Appl. No. 16/796,463.
Notice of Allowance dated Nov. 5, 2019 received in related U.S. Appl. No. 16/160,343.
Notification of Reasons for rejection dated Oct. 29, 2019 received from the Japanese Patent Office in application JP 2018-246396.
Office Action dated Nov. 12, 2019 received in related U.S. Appl. No. 15/981,465.
Office Action dated May 20, 2019 received in related U.S. Appl. No. 15/226,188.
Extended European Search Report dated Aug. 29, 2019 received in European Patent Application No. 19173286.6.
Official Action dated Jun. 3, 2019 received from the Chinese Patent Office in application CN 201711461753.2.
Office Action dated Apr. 4, 2019 received in related U.S. Appl. No. 16/256,604.
Office Action dated Apr. 12, 2019 received in related U.S. Appl. No. 15/715,329.
Notice of Allowance dated Jun. 5, 2019 received in related U.S. Appl. No. 15/832,531.
Photographs of a Brother Kogyo Kabushiki Kaisha TX series cassette sold in the United States at least around Jan. 6, 1993.
Photographs of a Brother Kogyo Kabushiki Kaisha TC series cassette sold in the United States at least around Dec. 28, 1988.
Office Action dated Oct. 30, 2018 received in related U.S. Appl. No. 15/832,531.
Notice of Allowance dated Apr. 9, 2020 received in related U.S. Appl. No. 15/981,465.
Office Action dated Jun. 5, 2019 received in related U.S. Appl. No. 15/981,465.
Apr. 13, 2015—(CN) Notification of Third Office Action—App 201210071810.7—Eng. Tran.
Apr. 14, 2015—(US) Notice of Allowance—U.S. Appl. No. 13/240,266.
Apr. 17, 2015—(US) Final Office Action—U.S. Appl. No. 14/226,367.
Apr. 20, 2015 (AU) Office Action in Application No. 2010231426.
Apr. 21, 2015—(US) Final Office Action—U.S. Appl. No. 14/226,428.
Aug. 4, 2015—(US) Notice of Allowance—U.S. Appl. No. 14/141,576.
Aug. 6, 2015—(CN) Office Action—App 201410046812.X—Eng Tran.
Aug. 11, 2015—(AU) Patent Examination Report 1—App 2014221250.
Aug. 13, 2015—(US) Final Office Action—U.S. Appl. No. 13/431,371.

(56) References Cited

OTHER PUBLICATIONS

Aug. 24, 2015—(US) Final Office Action—U.S. Appl. No. 14/226,402.
Feb. 6, 2015—(EP) Extended Search Report—App. 14189221.6.
Feb. 10, 2015—(US) Notice of Allowance—U.S. Appl. No. 14/226,380.
Feb. 12, 2015—(US) Final Office Action—U.S. Appl. No. 12/732,257.
Feb. 12, 2015—(US) Final Office Action—U.S. Appl. No. 13/431,350.
Feb. 12, 2015—(US) Final Office Action—U.S. Appl. No. 14/226,417.
Feb. 13, 2015—(US) Non-Final Office Action—U.S. Appl. No. 13/240,322.
Feb. 17, 2015—(US) Final Office Action—U.S. Appl. No. 14/141,673.
Feb. 19, 2015 (CA) Office Action in Application No. 2755885.
Jan. 2, 2015—(US) Non-Final Office Action—U.S. Appl. No. 14/226,262.
Jan. 5, 2015—(US) Non-final Office Action—U.S. Appl. No. 14/226,201.
Jan. 16, 2015—(US) Non-Final Office Action—U.S. Appl. No. 14/226,402.
Jan. 20, 2015—(US) Non-Final Office Action—U.S. Appl. No. 13/431,371.
Jan. 22, 2015—(US) Non-Final Office Action—U.S. Appl. No. 14/226,411.
Jan. 22, 2015—(US) Notice of Allowance—U.S. Appl. No. 12/732,457.
Jan. 23, 2015 (AU) Office Action in Application No. 2010231426.
Jan. 28, 2015—(US) Notice of Allowance—U.S. Appl. No. 13/431,277.
Jan. 29, 2015—(TW) Office Action—App 099132599.
Jul. 7, 2015—(US) Notice of Allowance—U.S. Appl. No. 14/141,673.
Jul. 16, 2015—(US) Non-Final Office Action—U.S. Appl. No. 14/226,417.
Jul. 31, 2015—(US) Final Office Action—U.S. Appl. No. 14/226,411.
Jun. 1, 2015—(CN) Notification of First Office Action—App 201310717842.4—Eng Tran.
Jun. 1, 2015—(CN) Notification of First Office Action—App 201310717871.0—Eng Tran.
Jun. 2, 2015—(US) Final Office Action—U.S. Appl. No. 14/226,262.
Jun. 2, 2015—(US) Non-Final Office Action—U.S. Appl. No. 14/226,256.
Jun. 5, 2015—(US) Notice of Allowance—U.S. Appl. No. 14/226,380.
Jun. 17, 2015—(US) Final Office Action—U.S. Appl. No. 14/226,325.
Jun. 19, 2015—(CN) Notification of First Office Action—App 201310659875.8—Eng Tran.
Jun. 25, 2015—(US) Non-Final Office Action—U.S. Appl. No. 13/431,350.
Mar. 2, 2015 (TW) Office Action in Application No. 101110368.
Mar. 4, 2015—(US) Final Office Action—U.S. Appl. No. 14/141,576.
Mar. 4, 2015—(US) Non-Final Office Action—U.S. Appl. No. 14/226,386.
Mar. 6, 2015 (AU) Office Action in Application No. 2010231425.
Mar. 6, 2015—(US) Final Office Action—U.S. Appl. No. 14/226,424.
Mar. 10, 2015—(JP) Office Action in Application No. 2014-095027.
Mar. 12, 2015—(EP) Search Report in Application No. 14156840.2.
Mar. 13, 2015—(US) Notice of Allowance in U.S. Appl. No. 14/226,165.
Mar. 17, 2015—(US) Notice of Allowance—U.S. Appl. No. 13/848,750.
Mar. 23, 2015 (US) Notice of Allowance in U.S. Appl. No. 13/934,512.
May 1, 2015—(US) Notice of Allowance—U.S. Appl. No. 12/644,572.
May 6, 2015—(US) Final Office Action—U.S. Appl. No. 14/226,259.
Apr. 2, 2013 (JP) Office Action issued in Japanese Patent Application No. 2009-156357.
Apr. 2, 2013 (JP) Office Action issued in Japanese Patent Application No. 2009-156371.
Apr. 2, 2013 (JP) Office Action issued in Japanese Patent Application No. 2009-156398.
Apr. 2, 2013 (JP) Office Action issued in Japanese Patent Application No. 2009-156403.
Apr. 2, 2013 (JP) Office Action issued in Japanese Patent Application No. 2009-270325.
Apr. 8, 2013 (EP) European Search Report issued in European Patent Application No. 09852278.2.
Apr. 15, 2013 (CN) Office Action issued in Chinese Patent Application No. 201080013099.9.
Apr. 19, 2013 (CN) Office Action issued in Chinese Patent Application No. 200910262678.6.
Apr. 23, 2013 (JP) Office Action issued in Japanese Patent Application No. 2010-73748.
Apr. 23, 2013 (JP) Office Action issued in Japanese Patent Application No. 2010-73750.
Apr. 23, 2013 (US) Office Action in U.S. Appl. No. 13/430,080.
Apr. 26, 2013 (CN)Office Action issued in Chinese Patent Application No. 200910262676.7.
Apr. 26, 2013 (US) Office Action in U.S. Appl. No. 13/755,174.
May 2, 2013 (CN) Office Action issued in Chinese Patent Application No. 200910262677.1.
May 2, 2013 (CN) Office Action issued in Chinese Patent Application No. 200910262679.0.
May 2, 2013 (CN) Office Action issued in Chinese Patent Application No. 200910262680.3.
May 7, 2013 (US) Office Action in U.S. Appl. No. 12/732,404.
May 14, 2013 (JP) Office Action issued in Japanese Patent Application No. 2010-073747.
May 14, 2013 (US) Office Action in U.S. Appl. No. 13/431,350.
May 14, 2013 (US) Office Action in U.S. Appl. No. 13/431,371.
May 21, 2013 (JP) Office Action issued in Japanese Patent Application No. 2009-154698.
May 21, 2013 (JP) Office Action issued in Japanese Patent Application No. 2009-154699.
May 21, 2013 (JP) Office Action issued in Japanese Patent Application No. 2010-073749.
May 21, 2013 (JP) Office Action issued in Japanese Patent Application No. 2010-073755.
May 21, 2013 (US) Office Action in U.S. Appl. No. 12/732,257.
May 21, 2013 (US) Office Action in U.S. Appl. No. 12/732,828.
May 22, 2013 (US) Office Action in U.S. Appl. No. 12/644,413.
May 22, 2013 (US) Office Action in U.S. Appl. No. 12/873,633.
May 28, 2013 (JP) Office Action issued in Japanese Patent Application No. 2010-073751.
May 30, 2013 (US) Office Action in U.S. Appl. No. 12/732,247.
Jun. 4, 2013 (CN) Office Action issued in Chinese Patent Application No. 200980161443.6.
Jun. 4, 2013 (JP) Office Action issued in Japanese Patent Application No. 2010-073754.
Jun. 19, 2013 (US) Office Action in U.S. Appl. No. 12/644,373.
Jul. 2, 2013 (JP) Office Action issued in Japanese Patent Application No. 2009-156281.
Jul. 2, 2013 (JP) Office Action issued in Japanese Patent Application No. 2009-156350.
Jul. 10, 2013 (NZ) (Office Action issued in New Zealand Patent Application No. 596044.
Jul. 16, 2013 (US) Office Action issued in U.S. Appl. No. 12/817,556.
Aug. 1, 2013 (US) Office Action in U.S. Appl. No. 12/732,747.
Aug. 7, 2013 (CN) Office Action issued in Chinese Patent Application No. 200910262675.2.
Aug. 9, 2013 (US) Office Action in U.S. Appl. No. 13/431,350.
Aug. 22, 2013 (CN) Office Action issued in Chinese Patent Application No. 201080013339.5.
Aug. 27, 2013 (US) Office Action in U.S. Appl. No. 12/644,451.
Aug. 27, 2013 (US) Office Action in U.S. Appl. No. 12/644,572.
Sep. 3, 2013 (CN) Office Action issued in Chinese Patent Application No. 201010150928.X.
Sep. 3, 2013 (JP) Office Action issued in Japanese Patent Application No. 2011-507143.
Sep. 9, 2013 (US) Office Action issued in U.S. Appl. No. 12/732,404.
Sep. 11, 2013 (US) Office Action in U.S. Appl. No. 13/430,080.
Sep. 12, 2013 (US) Office Action in U.S. Appl. No. 12/732,457.
Sep. 12, 2013 (US) Office Action in U.S. Appl. No. 12/732,828.
Sep. 17, 2013 (US) Office Action in U.S. Appl. No. 12/732,647.
Mar. 5, 2010 (PCT) International Search Report in International Application No. PCT/JP2009/007088.
Apr. 4, 2016—(US) Notice of Allowance—U.S. Appl. No. 14/226,402.
Apr. 6, 2016—(US) Notice of Allowance—U.S. Appl. No. 12/732,457.
Apr. 6, 2016—(US) Notice of Allowance—U.S. Appl. No. 14/141,673.

(56) References Cited

OTHER PUBLICATIONS

Apr. 20, 2016—(US) Non-Final Office Action—U.S. Appl. No. 14/226,325.
Aug. 1, 2016—(US) Notice of Allowance—U.S. Appl. No. 14/226,325.
Aug. 1, 2016—(US) Non-Final Office Action—U.S. Appl. No. 14/226,201.
Aug. 16, 2016—(US) Final Office Action—U.S. Appl. No. 14/226,262.
Aug. 18, 2016—(US) Final Office Action App—U.S. Appl. No. 14/226,386.
Aug. 22, 2016—(US) Notice of Allowance—U.S. Appl. No. 14/867,877.
Aug. 25, 2016—(US) Final Office Action—U.S. Appl. No. 14/141,568.
Aug. 26, 2016—(US) Notice of Allowance—U.S. Appl. No. 13/430,033.
Dec. 1, 2016—(US) Notice of Allowance and Fees Due—U.S. Appl. No. 14/226,262.
Dec. 2, 2016—(US) Notice of Allowance—U.S. Appl. No. 14/141,568.
Feb. 11, 2016—(US) Notice of Allowance—U.S. Appl. No. 14/226,402.
Feb. 12, 2016—(US) Notice of Allowance—U.S. Appl. No. 13/431,277.
Jul. 5, 2016—(US) Non-Final Office Action—U.S. Appl. No. 15/130,109.
Jun. 3, 2016—(US) Final Office Action—U.S. Appl. No. 14/920,398.
Jun. 16, 2016—(US) Final Office Action—U.S. Appl. No. 14/226,380.
Jun. 24, 2016—(US) Notice of Allowance—U.S. Appl. No. 14/226,256.
Mar. 31, 2016—(US) Notice of Allowance—U.S. Appl. No. 14/226,411.
May 2, 2016—(US) Notice of Allowance—U.S. Appl. No. 12/644,572.
May 3, 2016—(US) Final Office Action—U.S. Appl. No. 14/226,289.
May 12, 2016—(US) Notice of Allowance—U.S. Appl. No. 13/934,512.
May 17, 2016—(US) Notice of Allowance—U.S. Appl. No. 13/848,750.
May 23, 2016—(US) Notice of Allowance—U.S. Appl. No. 14/641,681.
Nov. 28, 2016—(US) Final Office Action—U.S. Appl. No. 14/226,165.
Oct. 3, 2016—(US) Non-Final Office Action—U.S. Appl. No. 15/250,310.
Oct. 19, 2016—(US) Non-Final Office Action—U.S. Appl. No. 14/226,373.
Oct. 19, 2016—(US) Notice of Allowance—U.S. Appl. No. 14/226,380.
Oct. 28, 2016—(US) Notice of Allowance—U.S. Appl. No. 15/130,109.
Sep. 14, 2016—(US) Notice of Allowance—U.S. Appl. No. 14/226,325.
Sep. 20, 2016—(US) Final Office Action—U.S. Appl. No. 14/226,259.
Sep. 23, 2016—(US) Notice of Allowance—U.S. Appl. No. 13/240,322.
Sep. 28, 2016—(US) Non-Final Office Action—U.S. Appl. No. 14/920,398.
Apr. 20, 2018—(US) Non-Final Office Action—U.S. Appl. No. 14/742,077.
Nov. 27, 2017—(US) Notice of Allowance—U.S. Appl. No. 15/276,474.
May 3, 2018—(US) Final Office Action—U.S. Appl. No. 15/226,188.
Jan. 31, 2017—(US) Office Action—U.S. Appl. No. 15/226,188.
Jul. 16, 2014 (US)—Restriction requirement in U.S. Appl. No. 13/848,750.
Sep. 11, 2014—(US) Election Requirement—U.S. Appl. No. 13/240,322.
Jun. 6, 2014 (US) Restriction Requirement issued in corresponding U.S. Appl. No. 13/430,033.
Feb. 8, 2018 (US) Notice of Allowance—U.S. Appl. No. 15/250,310.
Dec. 1, 2017 (US) Notice of Allowance—U.S. Appl. No. 15/250,310.
Sep. 25, 2017 (US) Notice of Allowance—U.S. Appl. No. 15/250,310.
Feb. 16, 2018 (US) Notice of Allowance—U.S. Appl. No. 15/276,474.
Jul. 14, 2017—(US) Office Action—U.S. Appl. No. 15/276,474.
Jun. 26, 2017 (US) Notice of Allowance—U.S. Appl. No. 15/276,599.
Apr. 27, 2018 (US) Office Action—U.S. Appl. No. 15/832,531.
Jan. 22, 2018 (US) Final Office Action—U.S. Appl. No. 15/357,004.
Office Action dated Jul. 1, 2020 received in related U.S. Appl. No. 15/715,329.
Office Action dated Jul. 29, 2020 received in related U.S. Appl. No. 16/286,132.
Office Action dated Oct. 6, 2020 received in related U.S. Appl. No. 16/866,950.
Official Action dated Oct. 12, 2020 received in related German Patent Application No. DE 10 2010 012 892.9.
Official Action dated Nov. 24, 2020 received in related U.S. Appl. No. 16/782,368.
Official Action dated Dec. 14, 2020 received in related U.S. Appl. No. 15/715,329.
Office Action dated Jan. 7, 2021 from related application U.S. Appl. No. 16/293,984.
Notice of Allowance dated Mar. 4, 2021 from related application U.S. Appl. No. 16/866,950.
Office Action dated Mar. 30, 2021 received from the United States Patent Office in related application U.S. Appl. No. 16/286,132.
Office Action dated Apr. 22, 2021 received from the United States Patent Office in related application U.S. Appl. No. 15/715,329.
Office Action dated Jul. 1, 2021 received from the United States Patent Office in related application U.S. Appl. No. 16/782,368.
Notice of Allowance dated Sep. 23, 2021 received from the United States Patent Office in related application U.S. Appl. No. 16/286,132.
Notice of Allowance dated Oct. 7, 2021 received in related U.S. Appl. No. 16/923,690.
Office Action dated Oct. 21, 2021 received in related U.S. Appl. No. 16/924,874.
Notice of Allowance dated Nov. 22, 2021 received in related United States Patent Application No. U.S. Appl. No. 16/782,368.
Explanation of Proofs submitted in Nullification Appeal for JP Patent 5233800 dated Feb. 17, 2022.
Office Action dated Mar. 24, 2022 received in U.S. Appl. No. 17/339,374.
Notice of Allowance dated Jun. 10, 2022 received in related U.S. Appl. No. 16/924,874.
Notice of Reasons for Refusal dated Aug. 30, 2022 received in Japanese Patent Application No. JP 2021-156029.
List of Patents or Patent Applications Treated as Related dated Oct. 17, 2022, 4 pages.
Mar. 16, 2010 (PCT) International Search Report and Written Opinion issued in International Application No. PCT/ JP2009/ 071812.
Mar. 16, 2010 (PCT) International Search Report in International Application No. PCT/JP2010/050253.
Mar. 23, 2010 (PCT) International Search Report in International Application No. PCT/JP2009/070971.
Mar. 23, 2010 (PCT) International Search Report in International Application No. PCT/JP2009/071568.
May 20, 2010 (PCT) International Search Report in International Application No. PCT/JP2009/007085.
May 20, 2010 (PCT) International Search Report in International Application No. PCT/JP2009/007086.
May 20, 2010 (PCT) International Search Report in International Application No. PCT/JP2009/007087.
May 21, 2010 (PCT) International Search Report in International Application No. PCT/JP2009/007089.
May 21, 2010 Extended European Search Report in European Patent Application No. 09180351.
May 21, 2010 Extended European Search Report in European Patent Application No. 09180354.
Jun. 22, 2010 (PCT) International Search Report in International Application No. PCT/JP2010/055305.
Jun. 22, 2010 (PCT) International Search Report in International Application No. PCT/JP2010/055310.
Jun. 22, 2010 (PCT) International Search Report in International Application No. PCT/JP2010/055311.
Jun. 22, 2010 (PCT) International Search Report in International Application No. PCT/JP2010/055324.
Jun. 22, 2010 (PCT) International Search Report in International Application No. PCT/JP2010/055326.
Jun. 28, 2010 (PCT) International Search Report in International Application No. PCT/JP2010/002170.
Jul. 2, 2010 Extended European Search Report in European Patent Application No. 10157994.
Jul. 12, 2010 Extended European Search Report in European Patent Application No. 10158024.
Jul. 30, 2010 (PCT) International Search Report in International Application No. PCT/JP2010/002165.
Jul. 30, 2010 (PCT) International Search Report in International Application No. PCT/JP2010/002169.
Aug. 3, 2010 (PCT) International Search Report in International Application No. PCT/JP2010/002154.

(56) References Cited

OTHER PUBLICATIONS

Aug. 3, 2010 (PCT) International Search Report in International Application No. PCT/JP2010/002161.
Aug. 24, 2010 (PCT) International Search Report in International Application No. PCT/JP2010/004076.
Oct. 12, 2010 Extended European Search Report in European Patent Application No. 10155348.
Dec. 3, 2010 Extended European Search Report in European Patent Application No. 10175769.
Oct. 11, 2011 (JP) Office Action issued in Japanese Patent Application No. 2008-331634.
Oct. 11, 2011 (JP) Office Action issued in Japanese Patent Application No. 2009-088227.
Oct. 11, 2011 (JP) Office Action issued in Japanese Patent Application No. 2009-088238.
Oct. 11, 2011 (JP) Office Action issued in Japanese Patent Application No. 2009-088441.
Oct. 11, 2011 (JP) Office Action issued in Japanese Patent Application No. 2009-088460.
Oct. 11, 2011 (JP) Office Action issued in Japanese Patent Application No. 2009-088440.
Nov. 15, 2011 (JP) Office Action issued in Japanese Patent Application No. 2009-088241.
Nov. 15, 2011 (PCT) International Preliminary Report on Patentability issued in PCT/JP2009/071568.
Nov. 15, 2011 (PCT) International Preliminary Report on Patentability issued in PCT/JP2010/050253.
Nov. 15, 2011 (PCT) International Preliminary Report on Patentability issued in PCT/JP2010/055324.
Nov. 15, 2011 (PCT) International Preliminary Report on Patentability issued in PCT/JP2010/055326.
Jan. 17, 2012 (JP) Office Action issued in Japanese Patent Application No. 2009-088456.
Feb. 14, 2012 (PCT) International Preliminary Report on Patentability in International Application No. PCT/JP2010/055305.
Feb. 14, 2012 (PCT) International Preliminary Report on Patentability in International Application No. PCT/JP2010/055311.
Mar. 7, 2012 (US) Office Action issued in U.S. Appl. No. 12/732,404.
Mar. 8, 2012 (US) Office Action issued in U.S. Appl. No. 12/732,247.
Mar. 9, 2012 (US) Office Action issued in U.S. Appl. No. 12/732,257.
Mar. 26, 2012 (US) Office Action issued in U.S. Appl. No. 12/732,457.
Mar. 27, 2012 (JP) Office Action issued in Japanese Patent Application No. 2008-331638.
Mar. 27, 2012 (JP) Office Action issued in Japanese Patent Application No. 2008-331639.
Mar. 27, 2012 (JP) Office Action issued in Japanese Patent Application No. 2009-156405.
Mar. 27, 2012 (JP) Office Action issued in Japanese Patent Application No. 2009-156406.
Mar. 27, 2012 (JP) Office Action issued in Japanese Patent Application No. 2009-156407.
Mar. 27, 2012 (JP) Office Action issued in Japanese Patent Application No. 2009-270221.
Sep. 22, 2013 (CN) Office Action issued in Chinese Patent Application No. 201010150109.5.
Sep. 25, 2013 (NZ) Office Action issued in New Zealand Patent Application No. 596044.
Sep. 26, 2013 (CN) Office Action issued in Chinese Patent Application No. 201010150090.4.
Sep. 30, 2013 (CN) Office Action issued in Chinese Patent Application No. 201010150088.7.
Oct. 1, 2013 (JP) Office Action issued in Japanese Patent Application No. 2011-547222.
Oct. 16, 2013 (US) Non-Final Office Action issued in corresponding U.S. Appl. No. 13/240,266.
Oct. 28, 2013 (CN) Office Action issued in Chinese Patent Application No. 200980158165.9.
Nov. 1, 2013 (CN) Office Action Issued in Chinese Patent Application No. 200980161405.0.
Nov. 6, 2013 (EP) European Search Report issued in European Patent Application No. 09842716.4.
Nov. 8, 2013 (NZ) Office Action issued in New Zealand Patent Application No. 596044.
Nov. 12, 2013 (EP) European Search Report issued in European Patent Application No. 10758310.6.
Nov. 13, 2013 (US) Office Action issued in corresponding U.S. Appl. No. 13/240,216.
Nov. 19, 2013 (US) Office Action issued in corresponding U.S. Appl. No. 13/934,512.
Dec. 12, 2013 (JP) Office Action issued in Japanese Patent Application No. 2011-507049.
Dec. 16, 2013 (EP) Extended European Search Report in European Patent Application No. 12160324.5.
Dec. 18, 2013 (EP) Extended European Search Report in European Patent Application No. 12160192.6.
Dec. 19, 2013 (CN) Office Action issued in Chinese Patent Application No. 200910262674.8.
Dec. 20, 2013 (EP) Extended European Search Report issued in European Patent Application No. 12161271.7.
Dec. 23, 2013 (US) Final Office Action issued in U.S. Appl. No. 13/431,350.
Dec. 30, 2013 (CN) Office Action issued in Chinese Application No. 201010209208.6.
Dec. 30, 2013 (CN) Office Action issued in Chinese Patent Application No. 201210070147.9.
Aug. 12, 20142—(CN) Notice of Second Office Action—App 201210071810.7—Eng Tran.
Aug. 26, 2014—(CN) Notice of Second Office Action—App 201010274378.2—Eng Tran.
Aug. 28, 2014—(US) Non-Final Office Action—U.S. Appl. No. 13/240,216.
Dec. 1, 2014—(US) Non-Final Office Action—U.S. Appl. No. 14/226,289.
Dec. 5, 2014—(US) Non-Final Office Action—U.S. Appl. No. 14/226,325.
Dec. 16, 2014—(US) Non-Final Office Action—U.S. Appl. No. 14/226,259.
Dec. 16, 2014—(US) Notice of Allowance—U.S. Appl. No. 13/240,216.
Dec. 26, 2014—(CN) Office Action in Application No. 201080013339.5.
Feb. 4, 2014 (US) Notice of Allowance issued in U.S. Appl. No. 12/732,404.
Feb. 19, 2014 (US) Notice of Allowance issued in U.S. Appl. No. 12/732,747.
Feb. 24, 2014 (US) Notice of Allowance issued in U.S. Appl. No. 12/644,451.
Jan. 3, 2014 (AU) Office Action issued in Australian Patent Application No. 2010231426.
Jan. 27, 2014 (US) Notice of Allowance issued in U.S. Appl. No. 12/732,828.
Jul. 7, 2014 (US) Final Office Action issued in U.S. Appl. No. 13/430,080.
Jul. 8, 2014 (CA) Office Action issued in Canadian Patent Application No. 2,755,882.
Jul. 8, 2014 (JP) Office Action issued in Japanese Patent Application No. 2013-153421.
Jul. 8, 2014 (JP) Office Action issued in Japanese Patent Application No. 2013-153495.
Jul. 18, 2014 (US) Office Action in U.S. Appl. No. 13/431,350.
Jul. 22, 2014 (US) Office Action in U.S. Appl. No. 12/732,257.
Jul. 25, 2014—(CN) Notice of Second Office Action—App 201010150090.4—Eng Tran.
Jul. 28, 2014—(CN) Notice of Second Office Action—App 201010150088.7—Eng Tran.
Jun. 26, 2014—(CN) Office Action—App 200980161405.
Jun. 27, 2014 (AU) Office Action issued in Australian Patent Application No. 2010231426.
Nov. 4, 2014—(US) Non-Final Office Action—U.S. Appl. No. 14/226,367.
Nov. 4, 2014—(US) Non-Final Office Action—U.S. Appl. No. 14/226,428.

(56) References Cited

OTHER PUBLICATIONS

Nov. 5, 2014—(US) Non-FInal Office Action—U.S. Appl. No. 14/226,373.
Nov. 12, 2014 (MX) Office Action in Application No. MX/a/2011/013553.
Nov. 25, 2014—(US) Notice of Allowance—U.S. Appl. No. 13/934,512.
Oct. 2, 2014—(US) Non-Final Office Action—U.S. Appl. No. 13/430,033.
Oct. 10, 2014—(US) Notice of Allowance—U.S. Appl. No. 12/732,457.
Oct. 27, 2014—(US) Non-Final Office Action—U.S. Appl. No. 14/141,576.
Oct. 30, 2014 (US) Final Office Action—U.S. Appl. No. 14/226,256.
Sep. 2, 2014—(US) Non-Final Office Action—U.S. Appl. No. 14/226,165.
Sep. 9, 2014—(US) Non-Final Office Action—U.S. Appl. No. 14/226,380.
Sep. 9, 2014—(US) Non-Final Office Action—U.S. Appl. No. 14/226,417.
Sep. 10, 2014—(US) Notice of Allowance—U.S. Appl. No. 13/934,512.
Sep. 11, 2014—(US) Non-Final Office Action—U.S. Appl. No. 13/848,750.
Sep. 12, 2014—(US) Final Office Action—U.S. Appl. No. 13/431,371.
Sep. 12, 2014—(US) Non-Final Office Action—U.S. Appl. No. 14/226,386.
Sep. 22, 2014—(US) Non-Final Office Action—U.S. Appl. No. 14/141,673.
Sep. 24, 2014—(JP) Notification of Rejection—App 2013-142488—Eng Tran.
Sep. 24, 2014—(US) Notice of Allowance—U.S. Appl. No. 13/431,277.
Sep. 25, 2014—(US) Non-Final Office Action—U.S. Appl. No. 14/226,424.
Jan. 17, 2014 (CN) Office Action issued in Chinese Patent Application No. 201210071810.7.
Jan. 22, 2014 (CN) Office Action issued in Chinese Patent Application No. 201010274378.2.
Feb. 5, 2014 (EP) Extended European Search Report issued in European Patent Application No. 09852818.5.
Mar. 10, 2014 (US) Non-Final Office Action issued in U.S. Appl. No. 13/430,080.
Mar. 13, 2014 (CN) Office Action issued in Chinese Application No. 201010150928.
Mar. 25, 2014 (US) Non-Final Office Action issued in U.S. Appl. No. 13/431,371.
Mar. 26, 2014 (US) Final Office Action issued in U.S. Appl. No. 12/732,457.
Mar. 27, 2014 (US) Notice of Allowance issued in U.S. Appl. No. 13/240,266.
Apr. 1, 2014 (JP) Office Action issued in Japanese Patent Application No. 2013-035990.
Apr. 2, 2014 (CN) Office Action issued in Chinese Patent Application No. 201210070968.
Apr. 10, 2014 (CN) Office Action issued in Chinese Application No. 201010150109.
Apr. 1, 2014 (US) Notice of Allowance issued in U.S. Appl. No. 12/644,572.
Apr. 15, 2014 (AU) Office Action issued in Australian Patent Application No. 2009332345.
Apr. 17, 2014 (RU) Office Action issued in Russian Patent Application No. 2011143817.
Apr. 25, 2014 (MX) Mexican Office Action issued in Mexican Application No. MX/a/2011/013553.
May 6, 2014 (CN) Chinese Office Action issued in Chinese Application No. 201010150087.2.
May 6, 2014 (CN) Chinese Office Action issued in Chinese Application No. 201010150878.5.
May 6, 2014 (US) Notice of Allowance issued in U.S. Appl. No. 13/934,512.
May 7, 2014 (US) Final Office Action issued in U.S. Appl. No. 13/240,216.
May 9, 2014 (VN) Office Action issued in Vietnamese Patent Application No. 1-2011-02491.
May 13, 2014 (CN) Chinese Office Action issued in Chinese Application No. 201080013339.5.
May 21, 2014 (EP) Extended European Search Report issued in European Application No. 10758552.3.
May 22, 2014 (US) Non-Final Office Action issued in U.S. Appl. No. 14/226,256.
Jun. 2, 2014 (AU) Office action issued in Australian Patent Application No. 2010231425.
Jun. 10, 2014 (JP) Japanese Office Action issued Japanese Application No. 2013-142488.
Jun. 20, 2014 (CN) Office action issued in Chinese Patent Application No. 201210070147.
Jun. 24, 2014 (JP) Japanese Office Action issued Japanese Application No. 2013-153250.
Jun. 24, 2014 (JP) Japanese Office Action issued Japanese Application No. 2013-153340.
Apr. 1, 2015—(US) Notice of Allowance—U.S. Appl. No. 12/732,457.
Apr. 1, 2015—(US) Notice of Allowance—U.S. Appl. No. 13/430,033.
Apr. 2, 2015 (EP) Office Action in Application No. 10711776.4.
Apr. 7, 2015 (TW) Office Action in Application No. 99132600.
Apr. 9, 2015—(TW) Office Action—App 099132598—Eng. Tran.
Apr. 9, 2015—(US) Non-Final Office Action—U.S. Appl. No. 14/641,681.
Apr. 9, 2015—(US) Notice of Allowance—U.S. Appl. No. 13/431,277.
Apr. 10, 2015—(US) Non-Final Office Action—U.S. Appl. No. 13/430,080.
May 6, 2015—(US) Final Office Action—U.S. Appl. No. 14/226,373.
May 19, 2015—(US) Notice of Allowance—U.S. Appl. No. 14/226,201.
May 19, 2015—(US) Final Office Action—U.S. Appl. No. 14/226,289.
May 20, 2015—(US) Notice of Allowance—U.S. Appl. No. 13/848,750.
May 22, 2015—(US) Non-Final Office Action—U.S. Appl. No. 12/732,257.
May 26, 2015—(CN) Office Action—App 201310659625.4.
May 29, 2015—(MY) Substantive Examination Adverse Report—App. PI 2013702520—Eng Tran.
May 29, 2015—(US) Notice of Allowance—U.S. Appl. No. 14/226,165.
Sep. 1, 2015—(US) Notice of Allowance—U.S. Appl. No. 14/226,259.
Sep. 8, 2015—(JP) Office Action—App 2014-210427—Eng Tran.
Sep. 8, 2015—(US) Notice of Allowance—U.S. Appl. No. 14/141,673.
Sep. 9, 2015—(US) Final Office Action—U.S. Appl. No. 14/226,386.
Jul. 16, 2013—(US) Office Action in U.S. Appl. No. 12/817,556.
Sep. 17, 2015—(US) Non-Final Office Action—U.S. Appl. No. 14/226,424.
Sep. 18, 2015—(US) Non-Final Office Action—U.S. Appl. No. 14/226,428.
Oct. 1, 2015—(US) Notice of Allowance—U.S. Appl. No. 12/732,457.
Oct. 5, 2015—(US) Notice of Allowance—U.S. Appl. No. 12/644,572.
Oct. 5, 2015—(US) Notice of Allowance—U.S. Appl. No. 14/141,673.
Oct. 7, 2015—(US)—Final Office Action—U.S. Appl. No. 13/240,322.
Oct. 13, 2015—(US) Notice of Allowance—U.S. Appl. No. 13/430,033.
Oct. 20, 2015—(US) Notice of Allowance—U.S. Appl. No. 14/226,201.
Oct. 22, 2015—(US) Final Office Action—U.S. Appl. No. 14/641,681.
Sep. 2, 2015—(CN) Notification of First Office Action—App 201410200475.5.
Oct. 23, 2015—(US) Final Office Action—U.S. Appl. No. 13/431,350.
Oct. 26, 2015—(US)—Non-Final Office Action—U.S. Appl. No. 14/643,865.
Oct. 30, 2015—(US)—Non-Final Office Action—U.S. Appl. No. 14/226,373.
Nov. 3, 2015—(US) Notice of Allowance—U.S. Appl. No. 14/226,259.
Photographs of various TX cassettes relating to U.S. Pat. No. 5518328, undated.
Nov. 9, 2015—(US) Notice of Allowance—U.S. Appl. No. 13/848,750.
Nov. 13, 2015—(US) Non-Final Office Action—U.S. Appl. No. 14/226,289.
Nov. 25, 2015—(US) Final Office Action—U.S. Appl. No. 14/226,256.
Nov. 27, 2015—(US) Notice of Allowance—U.S. Appl. No. 14/226,367.
Dec. 4, 2015—(US) Notice of Allowance—U.S. Appl. No. 14/226,325.
Dec. 10, 2015—(US) Non-Final Office Action—U.S. Appl. No. 14/755,141.
Nov. 20, 2015—(KR) Office Action—App 10-2015-7006347.

(56) References Cited

OTHER PUBLICATIONS

Nov. 20, 2015—(KR) Office Action—App 10-2011-7017238.
Dec. 11, 2015—(US) Notice of Allowance—U.S. Appl. No. 14/226,165.
Dec. 17, 2015—(US) Non-Final Office Action—U.S. Appl. No. 14/920,398.
Dec. 21, 2015—(US) Notice of Allowance—U.S. Appl. No. 13/934,512.
Dec. 23, 2015—(US) Final Office Action—U.S. Appl. No. 14/226,417.
Oct. 27, 2015—(CN) Office Action—App 201410195767.4.
Dec. 24, 2015—(US) Non-Final Office Action—U.S. Appl. No. 14/226,380.
Nov. 27, 2015—(CN) Office Action—App 201410311930.9.
Dec. 3, 2015—(CN) Office Action—App 201510088644.5.
Jan. 12, 2016—(US) Notice of Allowance—U.S. Appl. No. 13/431,371.
Jan. 15, 2016—(US) Notice of Allowance—U.S. Appl. No. 12/732,257.
Jan. 29, 2016—(US) Notice of Allowance—U.S. Appl. No. 14/226,411.
Dec. 24, 2015—(TW) Decision of Rejection—App 101110368—Eng Tran.
Feb. 5, 2016—(US) Non-Final Office Action—U.S. Appl. No. 13/240,322.
Mar. 30, 2012 (US) Office Action issued in U.S. Appl. No. 12/644,451.
Apr. 11, 2012 (PCT) International Preliminary Report on Patentability issued in PCT/JP2010/055310.
Apr. 11, 2012 (US) Office Action in U.S. Appl. No. 12/644,572.
May 8, 2012 (JP) Office Action issued in Japanese Patent Application No. 2009-086239.
May 10, 2012 (US) Office Action in U.S. Appl. No. 13/431,371.
May 22, 2012 (JP) Japanese Office Action issued in Japanese Patent Application No. 2010-041323.
Jun. 4, 2012 (US) Office Action in U.S. Appl. No. 13/431,350.
Jun. 6, 2012 (US) Office Action in U.S. Appl. No. 12/732,747.
Jun. 8, 2012 (US) Office Action in U.S. Appl. No. 13/431,277.
Jun. 12, 2012 (JP) Office Action issued in Japanese Patent Application No. 2009-086222.
Jun. 12, 2012 (JP) Office Action issued in Japanese Patent Application No. 2010-084499.
Jun. 12, 2012 (US) Office Action in U.S. Appl. No. 12/732,828.
Jun. 15, 2012 (US) Office Action in U.S. Appl. No. 12/732,404.
Jul. 3, 2012 (JP) Office Action issued in Japanese Patent Application No. 2010-084500.
Jul. 3, 2012 (JP) Office Action issued in Japanese Patent Application No. 2010-084501.
Jul. 3, 2012 (JP) Office Action issued in Japanese Patent Application No. 2010-084502.
Jul. 10, 2012 (PCT) International Preliminary Report on Patentability issued in PCT/JP2009/070971.
Jul. 13, 2012 (US) Office Action in U.S. Appl. No. 12/644,413.
Jul. 20, 2012 (US) Office Action in U.S. Appl. No. 12/817,556.
Jul. 30, 2012 (US) Final Office Action in U.S. Appl. No. 12/732,247.
Aug. 3, 2012 (US) Office Action in U.S. Appl. No. 12/644,373.
Aug. 14, 2012 (PCT) International Preliminary Report on Patentability issued in PCT/JP2009/071812.
Aug. 27, 2012 (US) Office Action in U.S. Appl. No. 12/644,572.
Aug. 28, 2012 (US) Office Action in U.S. Appl. No. 12/644,451.
Aug. 28, 2012 (US) Office Action in U.S. Appl. No. 12/732,257.
Aug. 28, 2012 (US) Office Action in U.S. Appl. No. 12/732,457.
Aug. 30, 2012 (US) Office Action in U.S. Appl. No. 12/732,647.
Sep. 6, 2012 (EP) European Communication issued in European Patent Application No. 10711477.9.
Sep. 11, 2012 (JP) Office Action issued in Japanese Patent Application No. 2009-086172.
Sep. 11, 2012 (JP) Office Action issued in Japanese Patent Application No. 2009-088449.
Sep. 28, 2012 (NZ) Examination Report issued in New Zealand Patent Application No. 596044.
Oct. 16, 2012 (US) Office Action in U.S. Appl. No. 12/873,633.
Oct. 23, 2012 (US) Office Action in U.S. Appl. No. 12/732,404.
Nov. 13, 2012 (JP) Office Action issued in Japanese Patent Application No. 2009-270056.
Nov. 13, 2012 (JP) Office Action issued in Japanese Patent Application No. 2009-297502.
Dec. 18, 2012 (JP) Office Action issued in Japanese Patent Application No. 2009-156369.
Nov. 22, 2013 (EP) Office Action issued in European Patent Application No. 10711776.4.
Nov. 26, 2013 (JP) Office Action issued in Japanese Patent Application No. 2011-507142.
Jan. 17, 2013 (US) Office Action in U.S. Appl. No. 12/732,747.
Jan. 22, 2013 (US) Office Action in U.S. Appl. No. 12/732,247.
Jan. 29, 2013 (JP) Office Action issued in Japanese Patent Application No. 2011-506968.
Jan. 30, 2013 (US) Office Action in U.S. Appl. No. 13/431,277.
Feb. 28, 2013 (US) Office Action in U.S. Appl. No. 12/817,556.
Mar. 3, 2013 (US) Office Action in U.S. Appl. No. 12/732,647.
Mar. 8, 2013 (CN) Office Action issued in Chinese Patent Application No. 200980158165.9.
Apr. 2, 2013 (JP) Office Action issued in Japanese Patent Application No., 2009-156399.
Apr. 2, 2013 (JP) Office Action issued in Japanese Patent Application No., 2009-156404.
Apr. 2, 2013 (JP) Office Action issued in Japanese Patent Application No. 2009-156281.
Apr. 2, 2013 (JP) Office Action issued in Japanese Patent Application No. 2009-156350.
Apr. 2, 2013 (JP) Office Action issued in Japanese Patent Application No. 2009-156355.
Office Action dated Sep. 22, 2023 received in related U.S. Appl. No. 17/538,254.
U.S. Appl. No. 12/644,373, filed Dec. 22, 2009, Abandoned.
U.S. Appl. No. 12/644,413, filed Dec. 22, 2009, Abandoned.
U.S. Appl. No. 12/644,451, filed Dec. 22, 2009, Patented.
U.S. Appl. No. 12/644,481, filed Dec. 22, 2009, Patented.
U.S. Appl. No. 12/644,525, filed Dec. 22, 2009, Patented.
U.S. Appl. No. 12/644,555, filed Dec. 22, 2009, Patented.
U.S. Appl. No. 12/644,572, filed Dec. 22, 2009, Patented.
U.S. Appl. No. 12/718,129, filed Mar. 5, 2010, Patented.
U.S. Appl. No. 12/732,247, filed Mar. 26, 2010, Abandoned.
U.S. Appl. No. 12/732,257, filed Mar. 26, 2010, Patented.
U.S. Appl. No. 12/732,404, filed Mar. 26, 2010, Patented.
U.S. Appl. No. 12/732,457, filed Mar. 26, 2010, Patented.
U.S. Appl. No. 12/732,647, filed Mar. 26, 2010, Patented.
U.S. Appl. No. 12/732,747, filed Mar. 26, 2010, Patented.
U.S. Appl. No. 12/732,828, filed Mar. 26, 2010, Patented.
U.S. Appl. No. 12/817,556, filed Jun. 17, 2010, Abandoned.
U.S. Appl. No. 12/873,633, filed Sep 1, 2010, Abandoned.
U.S. Appl. No. 13/240,216, filed Sep. 22, 2011, Patented.
U.S. Appl. No. 13/240,266, filed Sep. 22, 2011, Patented.
U.S. Appl. No. 13/240,322, filed Sep. 22, 2011, Patented.
U.S. Appl. No. 13/430,033, filed Mar. 26, 2012, Patented.
U.S. Appl. No. 13/430,080, filed Mar. 26, 2012, Abandoned.
U.S. Appl. No. 13/431,277, filed Mar. 27, 2012, Patented.
U.S. Appl. No. 13/431,350, filed Mar. 27, 2012, Patented.
U.S. Appl. No. 13/431,371, filed Mar. 27, 2012, Patented.
U.S. Appl. No. 13/755,174, filed Jan. 31, 2013, Patented.
U.S. Appl. No. 13/848,750, filed Mar. 22, 2013, Patented.
U.S. Appl. No. 13/934,512, filed Jul. 3, 2013, Patented.
U.S. Appl. No. 14/141,568, filed Dec. 27, 2013, Patented.
U.S. Appl. No. 14/141,576, filed Dec. 27, 2013, Patented.
U.S. Appl. No. 14/141,673, filed Dec. 27, 2013, Patented.
U.S. Appl. No. 14/226,165, filed Mar. 26, 2014, Patented.
U.S. Appl. No. 14/226,201, filed Mar. 26, 2014, Patented.
U.S. Appl. No. 14/226,256, filed Mar. 26, 2014, Patented.
U.S. Appl. No. 14/226,259, filed Mar. 26, 2014, Patented.
U.S. Appl. No. 14/226,262, filed Mar. 26, 2014, Patented.
U.S. Appl. No. 14/226,289, filed Mar. 26, 2014, Abandoned.
U.S. Appl. No. 14/226,325, filed Mar. 26, 2014, Patented.
U.S. Appl. No. 14/226,367, filed Mar. 26, 2014, Patented.
U.S. Appl. No. 14/226,373, filed Mar. 26, 2014, Patented.
U.S. Appl. No. 14/226,380, filed Mar. 26, 2014, Patented.
U.S. Appl. No. 14/226,386, filed Mar. 26, 2014, Patented.
U.S. Appl. No. 14/226,402, filed Mar. 26, 2014, Patented.
U.S. Appl. No. 14/226,411, filed Mar. 26, 2014, Patented.
U.S. Appl. No. 14/226,417, filed Mar. 26, 2014, Patented.
U.S. Appl. No. 14/226,424, filed Mar. 26, 2014, Abandoned.

(56) References Cited

OTHER PUBLICATIONS

U.S. Appl. No. 14/226,428, filed Mar. 26, 2014, Patented.
U.S. Appl. No. 14/416,681, filed Mar. 9, 2015, Patented.
U.S. Appl. No. 14/643,865, filed Mar. 10, 2015, Patented.
U.S. Appl. No. 14/742,077, filed Jun. 17, 2015, Patented.
U.S. Appl. No. 14/755,141, filed Jun. 30, 2015, Patented.
U.S. Appl. No. 14/867,877, filed Sep. 28, 2015, Patented.
U.S. Appl. No. 14/920,398, filed Oct. 22, 2015, Patented.
U.S. Appl. No. 15/130,109, filed Apr. 15, 2016, Patented.
U.S. Appl. No. 15/226,188, filed Aug. 2, 2016, Pending.
U.S. Appl. No. 15/250,310, filed Aug. 29, 2016, Patented.
U.S. Appl. No. 15/276,474, filed Sep. 26, 2016, Patented.
U.S. Appl. No. 15/276,599, filed Sep. 26, 2016, Patented.
U.S. Appl. No. 15/357,004, filed Nov. 21, 2016, Patented.
U.S. Appl. No. 15/389,497, filed Dec. 23, 2016, Patented.
U.S. Appl. No. 15/715,329, filed Sep. 26, 2017, Patented.
U.S. Appl. No. 15/832,531, filed Dec. 5, 2017, Patented.
U.S. Appl. No. 15/866,000, filed Jan. 9, 2018, Patented.
U.S. Appl. No. 15/981,465, filed May 16, 2018, Patented.
U.S. Appl. No. 16/160,343, filed Oct. 15, 2018, Patented.
U.S. Appl. No. 16/256,604, filed Jan. 24, 2019, Patented.
U.S. Appl. No. 16/286,132, filed Feb. 26, 2019, Patented.
U.S. Appl. No. 16/293,984, filed Mar. 6, 2019, Patented.
U.S. Appl. No. 16/782,368, filed Feb. 5, 2020, Patented.
U.S. Appl. No. 16/796,463, filed Feb. 20, 2020, Patented.
U.S. Appl. No. 16/866,950, filed May 5, 2020, Patented.
U.S. Appl. No. 16/923,690, filed Jul. 8, 2020, Patented.
U.S. Appl. No. 16/924,874, filed Jul. 9, 2020, Allowed.
U.S. Appl. No. 17/339,374, filed Jun. 4, 2021, Pending.
U.S. Appl. No. 17/464,761, filed Sep. 2, 2021, Pending.
U.S. Appl. No. 17/538,254, filed Nov. 30, 2021, Pending.
U.S. Appl. No. 17/570,849, filed Jan. 7, 2022, Pending.
U.S. Appl. No. 17/677,455, filed Feb. 22, 2022, Pending.
U.S. Appl. No. 17/878,471, filed Aug. 1, 2022, Pending.
U.S. Appl. No. 17/943,869, filed Sep. 13, 2022, Pending.
United States Office Action issued in U.S. Appl. No. 17/570,849 on Mar. 7, 2023.
United States Office Action issued in U.S. Appl. No. 17/464,761 on Dec. 1, 2023.
United States Office Action issued in U.S. Appl. No. 17/538,254 on Apr. 5, 2023.
Notice of Allowance issued in U.S. Appl. No. 17/570,849 on Sep. 15, 2023.
United States Office Action issued in U.S. Appl. No. 17/677,455 on Oct. 9, 2024.
United States Office Action issued in U.S. Appl. No. 17/677,455 on Apr. 24, 2024.
United States Office Action issued in U.S. Appl. No. 17/677,455 on Nov. 7, 2023.
United States Office Action issued in U.S. Appl. No. 17/677,455 on Apr. 25, 2023.
United States Office Action issued in U.S. Appl. No. 17/878,471 on Nov. 7, 2024.
United States Office Action issued in U.S. Appl. No. 17/878,471 on Aug. 1, 2024.
United States Office Action issued in U.S. Appl. No. 17/878,471 on Oct. 6, 2023.
United States Office Action issued in U.S. Appl. No. 17/878,471 on Apr. 28, 2023.
Notice of Allowance issued in U.S. Appl. No. 17/339,374 on Mar. 17, 2023.
Notice of Allowance issued in U.S. Appl. No. 18/211,412 on Nov. 6, 2024.
Notice of Allowance issued in U.S. Appl. No. 17/570,849 on Nov. 9, 2023.
Notice of Allowance issued in U.S. Appl. No. 17/570,849 on Jan. 5, 2024.
United States Office Action issued in U.S. Appl. No. 18/398,104 on Sep. 16, 2024.
Appeal documents issued in U.S. Appl. No. 17/538,254, Decision issued on Oct. 22, 2024.
Notice of Allowance issued in U.S. Appl. No. 17/538,254 on Nov. 21, 2024.
Notice of Allowance issued in U.S. Appl. No. 18/211,412 on Jul. 15, 2024.
Notice of Allowance issued in U.S. Appl. No. 17/464,761 on Jun. 10, 2024.
Notice of Allowance issued in U.S. Appl. No. 18/397,634 on Aug. 28, 2024.
Office Action Final issued in U.S. Appl. No. 17/538,254 on Sep. 22, 2023.

* cited by examiner

FIG. 28

510

| | LAMINATED | RECEPTOR | REMARKS | SW1 | SW2 | SW3 | SW4 | SW5 |
|---|---|---|---|---|---|---|---|---|
| 0 | | | ERROR1 | 0 | 0 | 0 | 0 | 0 |
| 1 | 9 | | | 0 | 1 | 0 | 0 | 0 |
| 2 | 12 | | | 1 | 0 | 0 | 0 | 0 |
| 3 | | SPARE | | 1 | 1 | 0 | 0 | 0 |
| 4 | 6 | | | 0 | 0 | 0 | 1 | 0 |
| 5 | 9 | | | 0 | 1 | 0 | 1 | 0 |
| 6 | 12 | | | 1 | 0 | 0 | 1 | 0 |
| 7 | | SPARE | | 1 | 1 | 0 | 1 | 0 |
| 8 | | 3.5 | | 1 | 1 | 1 | 0 | 0 |
| 9 | | 6 | | 0 | 0 | 1 | 0 | 0 |
| 10 | | 9 | | 0 | 1 | 1 | 0 | 0 |
| 11 | | 12 | | 1 | 0 | 1 | 0 | 0 |
| 12 | | 6 | | 0 | 0 | 1 | 1 | 0 |
| 13 | | 9 | | 0 | 1 | 1 | 1 | 0 |
| 14 | | 12 | | 1 | 0 | 1 | 1 | 0 |
| 15 | | | ERROR2 | 1 | 1 | 1 | 1 | 0 |
| 16 | 18 | | | 0 | 0 | 0 | 0 | 1 |
| 17 | 24 | | | 0 | 1 | 0 | 0 | 1 |
| 18 | 36 | | | 1 | 0 | 0 | 0 | 1 |
| 19 | | | SPARE | 1 | 1 | 0 | 0 | 1 |
| 20 | 18 | | | 0 | 0 | 0 | 1 | 1 |
| 21 | 24 | | | 0 | 1 | 0 | 1 | 1 |
| 22 | 36 | | | 1 | 0 | 0 | 1 | 1 |
| 23 | | | SPARE | 1 | 1 | 0 | 1 | 1 |
| 24 | | 18 | | 0 | 0 | 1 | 0 | 1 |
| 25 | | 24 | | 0 | 1 | 1 | 0 | 1 |
| 26 | | 36 | | 1 | 0 | 1 | 0 | 1 |
| 27 | | | SPARE | 1 | 1 | 1 | 0 | 1 |
| 28 | | 18 | | 0 | 0 | 1 | 1 | 1 |
| 29 | | 24 | | 0 | 1 | 1 | 1 | 1 |
| 30 | | 36 | | 1 | 0 | 1 | 1 | 1 |
| 31 | | | ERROR3 | 1 | 1 | 1 | 1 | 1 |

FIG. 32

520 521 522

| | T1 | T2 | T3 | T4 | T5 | FIRST COLOR TABLE | | SECOND COLOR TABLE | |
|---|---|---|---|---|---|---|---|---|---|
| | | | | | | TAPE COLOR 1 | INK COLOR 1 | TAPE COLOR 2 | INK COLOR 2 |
| 0 | 0 | 0 | 0 | 0 | 0 | WHITE | BLACK | | |
| 1 | 1 | 0 | 0 | 0 | 0 | TRANSPARENT MATT | BLACK | GOLD MATT | BLACK |
| 2 | 1 | 1 | 0 | 0 | 0 | TRANSPARENT | BLACK | SILVER MATT | BLACK |
| 3 | 0 | 0 | 0 | 1 | 0 | YELLOW | BLACK | PINK | BLUE |
| 4 | 1 | 0 | 0 | 1 | 0 | BLUE | BLACK | PINK | BLACK |
| 5 | 0 | 1 | 0 | 1 | 0 | SILVER | BLACK | PINK | RED |
| 6 | 1 | 1 | 0 | 1 | 0 | ORANGE | BLACK | GRAY | BLUE |
| 7 | 0 | 0 | 1 | 0 | 0 | RED | BLACK | GRAY | BLACK |
| 8 | 1 | 0 | 1 | 0 | 0 | GREEN | BLACK | GRAY | RED |
| 9 | 0 | 1 | 1 | 0 | 0 | GOLD | BLACK | | |
| 10 | 1 | 1 | 1 | 0 | 0 | WHITE | RED | | |
| 11 | 0 | 0 | 1 | 1 | 0 | TRANSPARENT | RED | | |
| 12 | 1 | 0 | 1 | 1 | 0 | YELLOW | RED | | |
| 13 | 0 | 1 | 1 | 1 | 0 | BLUE | RED | | |
| 14 | 1 | 1 | 1 | 1 | 0 | SILVER | RED | | |
| 15 | 0 | 0 | 0 | 0 | 1 | ORANGE | RED | | |
| 16 | 1 | 0 | 0 | 0 | 1 | RED | RED | | |
| 17 | 0 | 1 | 0 | 0 | 1 | GREEN | RED | | |
| 18 | 0 | 0 | 1 | 0 | 1 | GOLD | RED | | |
| 19 | 0 | 0 | 0 | 1 | 1 | WHITE | BLUE | | |
| 20 | 1 | 1 | 0 | 0 | 1 | TRANSPARENT | BLUE | | |
| 21 | 1 | 0 | 1 | 0 | 1 | YELLOW | BLUE | | |
| 22 | 1 | 0 | 0 | 1 | 1 | BLUE | BLUE | | |
| 23 | 0 | 1 | 1 | 0 | 1 | SILVER | BLUE | | |
| 24 | 0 | 1 | 0 | 1 | 1 | ORANGE | BLUE | | |
| 25 | 0 | 0 | 1 | 1 | 1 | RED | BLUE | | |
| 26 | 1 | 1 | 1 | 0 | 1 | GREEN | BLUE | | |
| 27 | 1 | 1 | 0 | 1 | 1 | GOLD | BLUE | | |
| 28 | 1 | 0 | 1 | 1 | 1 | WHITE | GOLD | | |
| 29 | 0 | 1 | 1 | 1 | 1 | TRANSPARENT | GOLD | | |
| 30 | 1 | 1 | 1 | 1 | 1 | BLACK | GOLD | | |
| 31 | | | | | | | | | |

TAPE CASSETTE

CROSS-REFERENCE TO RELATED APPLICATIONS

This application is a continuation of U.S. Ser. No. 16/924,874, filed on Jul. 9, 2020, which is a continuation of U.S. Ser. No. 15/981,465, filed May 16, 2018, now U.S. Pat. No. 10,744,798, issued on Aug. 18, 2020, which is a continuation of U.S. Ser. No. 15/276,474, filed Sep. 26, 2016, now U.S. Pat. No. 10,189,284, issued on Jan. 29, 2019, which is a continuation of U.S. Ser. No. 14/226,380, filed Mar. 26, 2014, now U.S. Pat. No. 9,649,861, issued on May 16, 2017, which is a continuation of U.S. Ser. No. 12/644,572, filed Dec. 22, 2009, now U.S. Pat. No. 9,493,016, issued on Nov. 15, 2016, which claims priority to Japanese Patent Application Nos. 2008-331634, 2008-331635, 2008-331638, 2008-331639, 2008-331641, 2008-331642 and 2008-331643, respectively filed on Dec. 25, 2008, and also claims priority to Japanese Patent Application Nos. 2009-088440, 2009-088441, 2009-088456, 2009-088460 and 2009-088468, respectively filed on Mar. 31, 2009, the entire contents of which are incorporated herein by reference.

BACKGROUND

The present invention relates to a tape cassette that is detachably installed in a tape printer.

A tape cassette has been known that, when installed in a housing portion of a tape printer, selectively presses down a plurality of detecting switches provided on the cassette housing portion to cause the tape printer to detect the type of a tape stored inside a cassette case (a tape width, a print mode, etc.). More specifically, a cassette detection portion is provided on a section of the bottom surface of the tape cassette, where through-holes are formed in a pattern corresponding to the type of the tape. When the tape cassette is installed m the cassette housing portion, the plurality of detecting switches, which are constantly urged in an upward direction, are selectively pressed in accordance with the pattern of the through-holes formed in the cassette detection portion. The tape printer detects the type of tape in the tape cassette installed in the cassette housing portion based on a combination of the pressed and non-pressed switches among the plurality of detecting switches.

SUMMARY

The pattern of through-holes formed in the cassette detection portion is basically only designed to allow the tape printer to detect the type of the tape. Accordingly, different patterns are allocated randomly in accordance with the type of the tape. In other words, the patterns of through-holes do are not formed in a pattern in accordance with rules to allow them to be identified from the outward appearance. Therefore, it is difficult for a person to visually identify the type of the tape. For that reason, for example, in a tape cassette manufacturing process, it may be difficult for a worker to visually identify the type of the tape that should be mounted inside the cassette case from the external appearance of the tape cassette.

An object of the present invention is to provide a tape cassette that allows a type of a tape to be identified by visually checking an external appearance of the tape cassette.

Exemplary embodiments of the present disclosure provide a tape cassette that includes a housing having a top surface, a bottom surface, a rear wall, a front wall, and a tape feed exit located on the front wall, a tape included at least partially within the housing and configured to be fed along a tape feed path extending to the tape feed exit, and a first indicator aperture positioned on the front wall and a second indicator aperture position on a rear portion of the bottom surface. A position of the first indicator aperture on the front wall indicates a type of the tape included within the housing. A position of the second indicator aperture indicates a color of characters. Other features are described in further detail below.

BRIEF DESCRIPTION OF THE DRAWINGS

Exemplary embodiments of the present invention will be described below in detail with reference to the accompanying drawings in which:

FIG. 28 is a diagram showing a data structure of a first identification table 510;

FIG. 32 is a diagram showing a data structure of a second identification table 520;

DETAILED DESCRIPTION OF EXEMPLARY EMBODIMENTS

Figure 1:
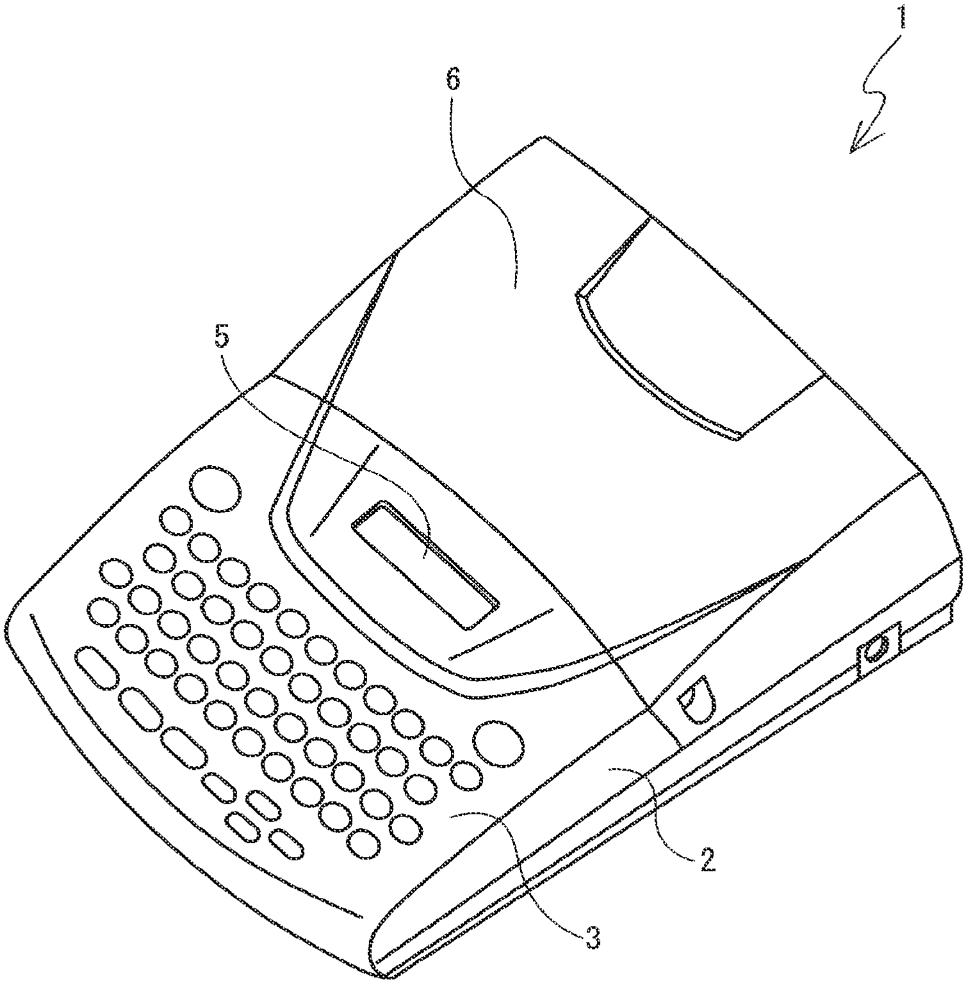
FIG. 1 is a perspective view of a tape printer 1 when a cassette cover 6 is closed.

Exemplary embodiments of the present invention will be explained below with reference to the figures. The configurations of the apparatus, the flowcharts of various processing and the like shown in the drawings are merely exemplary and do not intend to limit the present invention.

A tape printer 1 and a tape cassette 30 according to the present embodiment will be explained hereinafter with reference to FIG. 1 to FIG. 34. In the explanation of the present embodiment, the lower left side, the upper right side, the lower right side, and the upper left side in FIG. 1 are respectively defined as the front side, the rear side, the right side, and the left side of the tape printer 1. In addition, the lower right side, the upper left side, upper right side, and the lower left side in FIG. 2 are respectively defined as the front side, the rear side, the right side, and the left side of the tape cassette 30.

Figure 2:
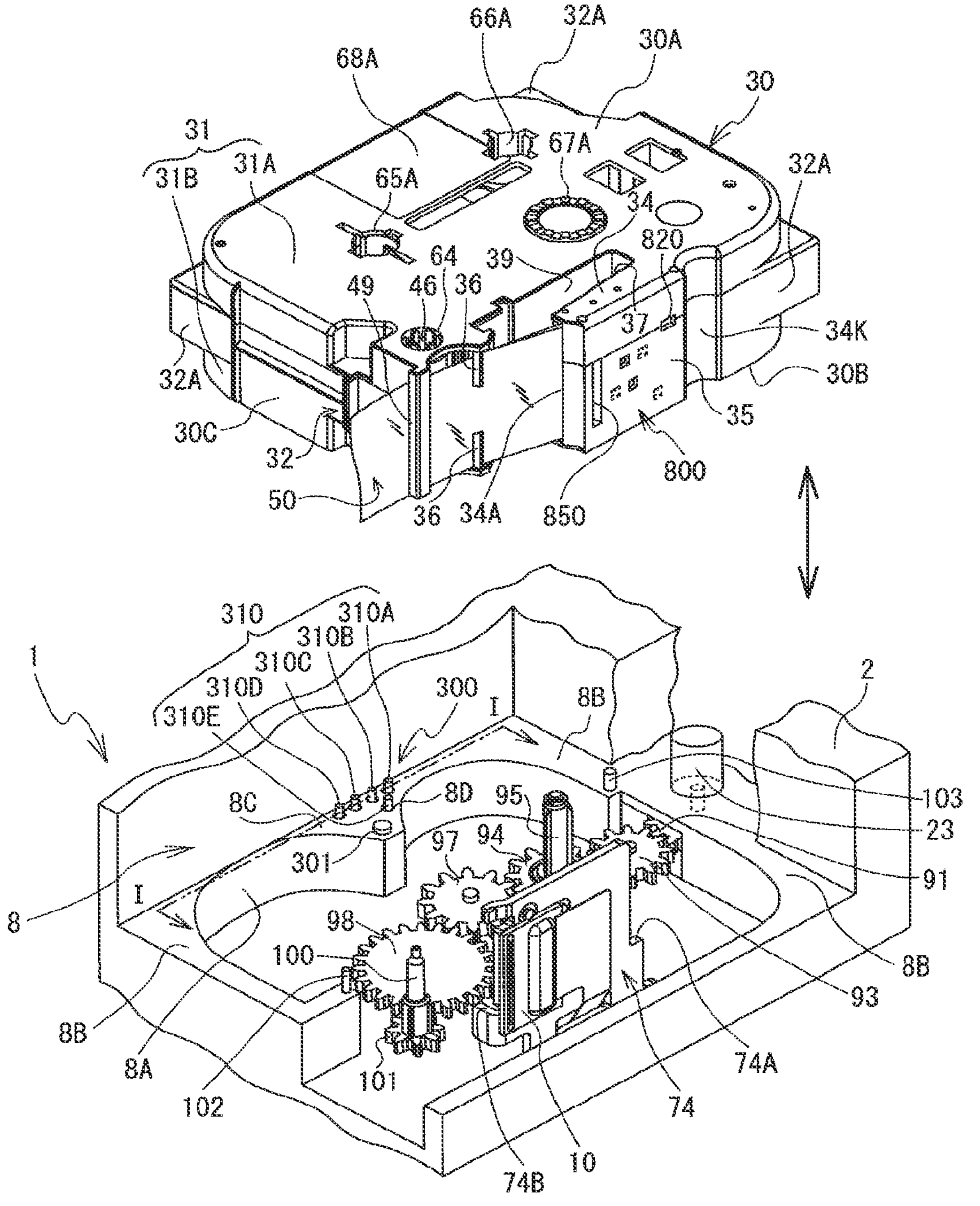
FIG. 2 is a perspective view illustrating a tape cassette 30 and a cassette housing portion 8.

In actuality, a group of gears, including gears 91, 93, 94, 97, 98 and 101 shown in FIG. 2, is covered and hidden by a bottom surface of a cavity 8A. However, for explanation purposes, the bottom surface of the cavity 8A is not shown in FIG. 2. Furthermore, in FIG. 2 to FIG. 6, side walls that form a periphery around a cassette housing portion 8 are shown schematically, but this is simply a schematic diagram, and the side wails shown in FIG. 2, for example, may be depicted as thicker than they are in actuality. Moreover, in FIG. 3 to FIG. 6, for ease of understanding, the states in which various types of the tape cassette 30 are installed in the cassette housing portion 8 are shown with a top case 31A removed.

First, an outline configuration of the tape printer 1 according to the present embodiment will be explained. Hereinafter, the tape printer 1 configured a as a general purpose device will be explained as an example. As the general purpose device, the tape printer 1 may commonly use a plurality of types of tape cassettes 30 with various types of tapes. The types of the tape cassettes 30 may include a thermal type tape cassette 30 that includes only a heat-sensitive paper tape, a receptor type tape cassette 30 that includes a print tape and an ink ribbon, and a laminated type tape cassette 30 that includes a double-sided adhesive tape, a film tape and an ink ribbon.

As shown in FIG. 1, the tape printer 1 is provided with a main unit cover 2 that has a rectangular shape in a plan view. A keyboard 3 is provided on the front side of the main unit cover 2. The keyboard 3 includes character keys for characters (letters, symbols, numerals, and so on), a variety of function keys, and so on. A display 5 is provided on the rear side of the keyboard 3. The display 5 displays input characters. A cassette cover 6 is provided on the rear side of the display 5. The cassette cover 6 may be opened and closed when the tape cassette 30 is replaced. Further, although not shown in the figures, a discharge slit is provided to the rear of the left side of the main unit cover 2, from which the printed tape is discharged to the outside. Also, a discharge window is formed on the left side of the cassette cover 6, such that, when the cassette cover 6 is in a closed state, the discharge slit is exposed to the outside.

Next, an internal configuration within the main unit cover 2 below the cassette cover 6 will be explained with reference to FIG. 2 to FIG. 9. As shown in FIG. 2, the cassette housing portion 8 is provided in the interior of the main unit cover 2 below the cassette cover 6. The cassette housing portion 8 is an area in which the tape cassette 30 can be installed or removed. The cassette housing portion 8 includes a cavity 8A and a cassette support portion 8B. The cavity 8A is formed as a depression that has a flat bottom surface, and the shape of the cavity 8A generally corresponds to the shape of a bottom surface 30B of a cassette case 31 (to be described later) when the tape cassette 30 is installed. The cassette support portion 8B is a flat portion extending horizontally from the outer edge of the cavity 8A.

The shape of the cassette support portion 8B in a plan view generally corresponds to the shape of the tape cassette 30 in a plan view, that is, a rectangle that is longer in the right-and-left direction. The rear edge of the cavity 8A has a shape in a plan view such that two arcs are lined up next to each other in the right-and-left direction. A part of the cassette support portion 8B that is positioned between the two arcs is referred to as a rear support portion 8C. The rear support portion 8C is a portion corresponding to a rear indentation 68C of the tape cassette 30 when the tape cassette 30 is installed in the cassette housing portion 8 (refer to FIG. 12). The remaining part of the cassette support portion 8B apart from the rear support portion 8C is a portion that opposes the lower surface of a common portion 32 (more specifically, corner portions 32A to be described later) of the tape cassette 30 when the tape cassette 30 is installed in the cassette housing portion 8.

A rear support pin 301 and a rear detection portion 300 are provided on the rear support portion 8C. The rear support pin 301 is a cylindrical shaped member that protrudes in an upward direction from the rear support portion 8C in the vicinity of a position where the two arcs are joined at the rear edge of the cavity 8A. When the tape cassette 30 is installed in the cassette housing portion 8, the rear support pin 301 supports from below a rear reception portion 910 of the tape cassette 30.

The rear detection portion 300 includes a plurality of detecting switches 310. Switch terminals 322 of the detecting switches 310 respectively protrude in the upward direction from through-holes 8D provided in the rear support portion 8C. In the present embodiment, the rear detection portion 300 includes five detecting switches 310A to 310E. Among the detecting switches 310A to 310E, four (the detecting switches 310A to 310D) are arranged in a single row from the right side (the left side in FIG. 7) in this order along the rear edge of the rear support portion 80. The remaining single detecting switch 310B is positioned to the front of the detecting switch 310B, which is second from the right. Hereinafter, the detecting switches 310 provided on the rear detection portion 300 will be referred to as the rear detecting switches 310.

Figure 7:
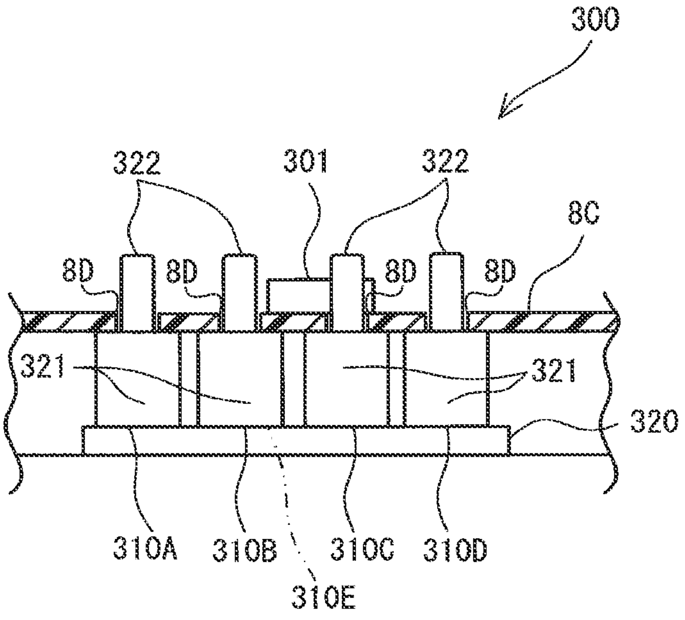
FIG. 7 is a view in which a cross-sectional view along a I-I line shown in FIG. 2 as seen in the direction of the arrows is rotated 180 degrees.

The structure of the rear detecting switches 310 will be explained in more detail with reference to FIG. 7. As shown in FIG. 7, each of the rear detecting switches 310 (the rear detecting switches 310A to 310E) includes a generally cylindrically shaped main unit 321 and a switch terminal 322. The main unit 321 is positioned underneath the rear support portion 8C, namely, in the interior of the main unit cover 2. The bar-shaped switch terminal 322 can extend and retract in the direction of an axis line from one end of the main unit 321. The other end of the main unit 321 of the rear detecting switch 310 is attached to a switch support plate 320 and positioned inside the main unit cover 2.

In addition, on the one end of the main units 321, the switch terminals 322 can extend and retract through the through-holes 8D formed in the rear support portion 8C. Each of the switch terminals 322 is constantly maintained in a state in which the switch terminal 322 extends from the main unit 321 due to a spring member provided inside the main unit 321 (not shown in the figures). When the switch terminal 322 is not pressed, the switch terminal 322 remains extended from the main unit 321 to be in an off state. On the other hand, when the switch terminal 322 is pressed, the switch terminal 322 is pushed back into the main unit 321 to be in an on state.

As shown in FIG. 2, when the tape cassette 30 is not installed in the cassette housing portion 8. the rear detecting switches 310 are separated from the tape cassette 30. Consequently, all the rear detecting switches 310 are in the off state. On the other hand, when the tape cassette 30 is installed in the cassette housing portion 8, the rear detecting switches 310 oppose a rear indicator portion 900 (to be described later) of the tape cassette 30, and the rear detecting switches 310 are selectively pressed by the rear indicator portion 900. Then, the type of the tape housed in the tape cassette 30 (hereinafter referred to as a tape type) is detected, based on a combination of the on and off states of the rear detecting switches 310. The support of the tape cassette 30 by the rear support pin 301 and the detection of the tape type by the rear detection portion 300 will be explained separately later.

As shown in FIG. 2, two positioning pins 102 and 103 are provided at two positions on the cassette support portion 8B. More specifically, the positioning pin 102 is provided on the left side of the cavity 8A and the positioning pin 103 is provided on the right side of the cavity 8A. The positioning pins 102 and 103 are provided at the positions that respectively oppose pin holes 62 and 63, when the tape cassette 30 is installed in the cassette housing portion 8. The pin holes 62 and 63 are two indentations formed in the bottom surface of the common portion 32 of the tape cassette 30 (refer to FIG. 12). When the tape cassette 30 is installed in the cassette housing portion 8, the positioning pins 102 and 103 are respectively inserted into the pin holes 62 and 63 to support the tape cassette 30 from underneath at the left and right positions of the peripheral portion of the tape cassette 30.

The cassette housing portion 8 is equipped with a feed mechanism, a print mechanism, and the like. The feed mechanism pulls out the tape from the tape cassette 30 and feeds the tape. The print mechanism prints characters on a surface of the tape. As shown in FIG. 2, a head holder 74 is fixed in the front part of the cassette housing portion 8, and a thermal head 10 that includes a heating element (not shown in the figures) is mounted on the head holder 74. Further, as shown in FIG. 3 to FIG. 6, an upstream support portion 74A and a downstream support portion 74B (hereinafter collectively referred to as head support portions 74A and 74B) are provided on both the right and left ends of the head holder 74. The head support portions 74A and 74B support the tape cassette 30 from underneath when the tape cassette 30 is installed in the tape printer 1. A cassette hook 75 is provided on the rear side of the head holder 74. The cassette hook 75 engages with the tape cassette 30 when the tape cassette 30 is installed in the cassette housing portion 8.

A tape feed motor 23 that is a stepping motor is provided outside of the cassette housing portion 8 (the upper right side in FIG. 2). A drive gear 91 is anchored to the lower end of a drive shaft of the tape feed motor 23. The drive gear 91 is meshed with a gear 93 through an opening, and the gear 93 is meshed with a gear 94. A ribbon take-up shaft 95 is standing upward on the upper surface of the gear 94. The ribbon take-up shaft 95 drives the rotation of a ribbon take-up spool 44, which will be described later. In addition, the gear 94 is meshed with a gear 97. The gear 97 is meshed with a gear 98, and the gear 98 is meshed with a gear 101. A tape drive shaft 100 is standing upward on the upper surface of the gear 101. The tape drive shaft 100 drives the rotation of a tape drive roller 46, which will be described later.

If the tape feed motor 23 is driven to rotate in the counterclockwise direction in a state where the tape cassette 30 is installed in the cassette housing portion 8, the ribbon take-up shaft 95 is driven to rotate in the counterclockwise direction via the drive gear 91, the gear 93 and the gear 94. The ribbon take-up shaft 95 causes the ribbon take-up spool 44, which is fitted with the ribbon take-up shaft 95, to rotate. Furthermore, the rotation of the gear 94 is transmitted to the tape drive shaft 100 via the gear 97, the gear 98 and the gear 101, to thereby drive the tape drive shaft 100 to rotate in the clockwise direction. The tape drive shaft 100 causes the tape drive roller 46, which is fitted with the tape drive shaft 100 by insertion, to rotate.

As shown in FIG. 3 to FIG. 6, on the front side of the head holder 74, an arm shaped platen holder 12 is pivotably supported around a support shaft 12A. A platen roller 15 and a movable feed roller 14 are both rotatably supported on the leading end of the platen holder 12. The platen roller 15 faces the thermal head 10, and may be moved close to and apart from the thermal head 10. The movable feed roller 14 faces the tape drive roller 46 that may be fitted with the tape drive shaft 100, and may be moved close to and apart from the tape drive roller 46.

A release lever (not shown in the figures), which moves in the right-and-left direction in response to the opening and closing of the cassette cover 6, is coupled to the platen holder 12. When the cassette cover 6 is opened, the release lever moves in the right direction, and the platen holder 12 moves toward the stand-by position shown in FIG. 3. Toward the stand-by position shown in FIG. 3, the platen holder 12 moves away from the cassette housing portion 8. Therefore, the tape cassette 30 can be installed into or detached from the cassette housing portion 8 when the platen holder 12 is at the stand-by position. The platen holder 12 is constantly elastically urged to remain in the stand-by position by a spiral spring that is not shown in the figures.

Figure 3:
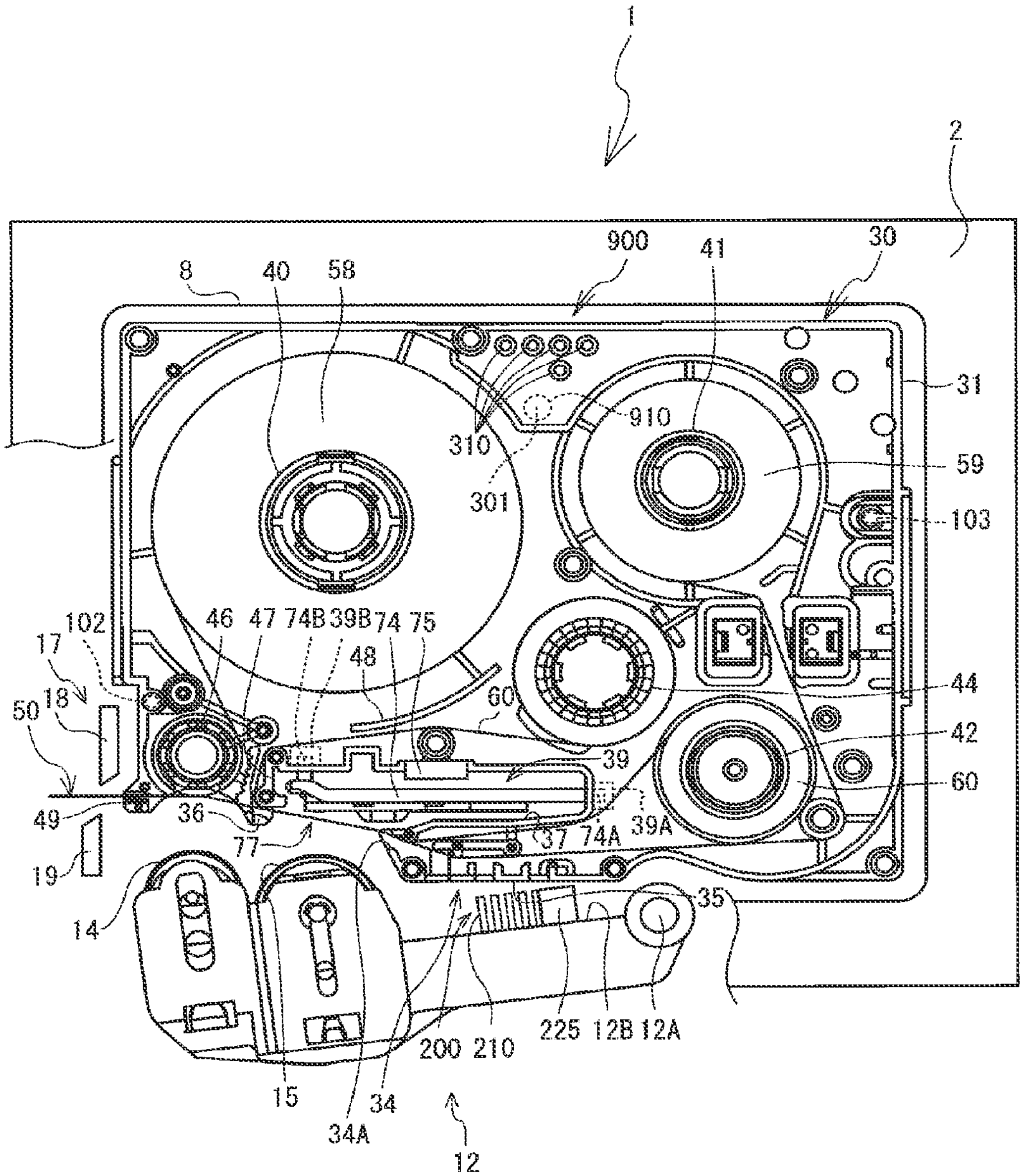
FIG. 3 is a plan view of the cassette housing portion 8 with a laminated type tape cassette 30 installed, when a platen holder 12 is at a standby position.
Figure 4:
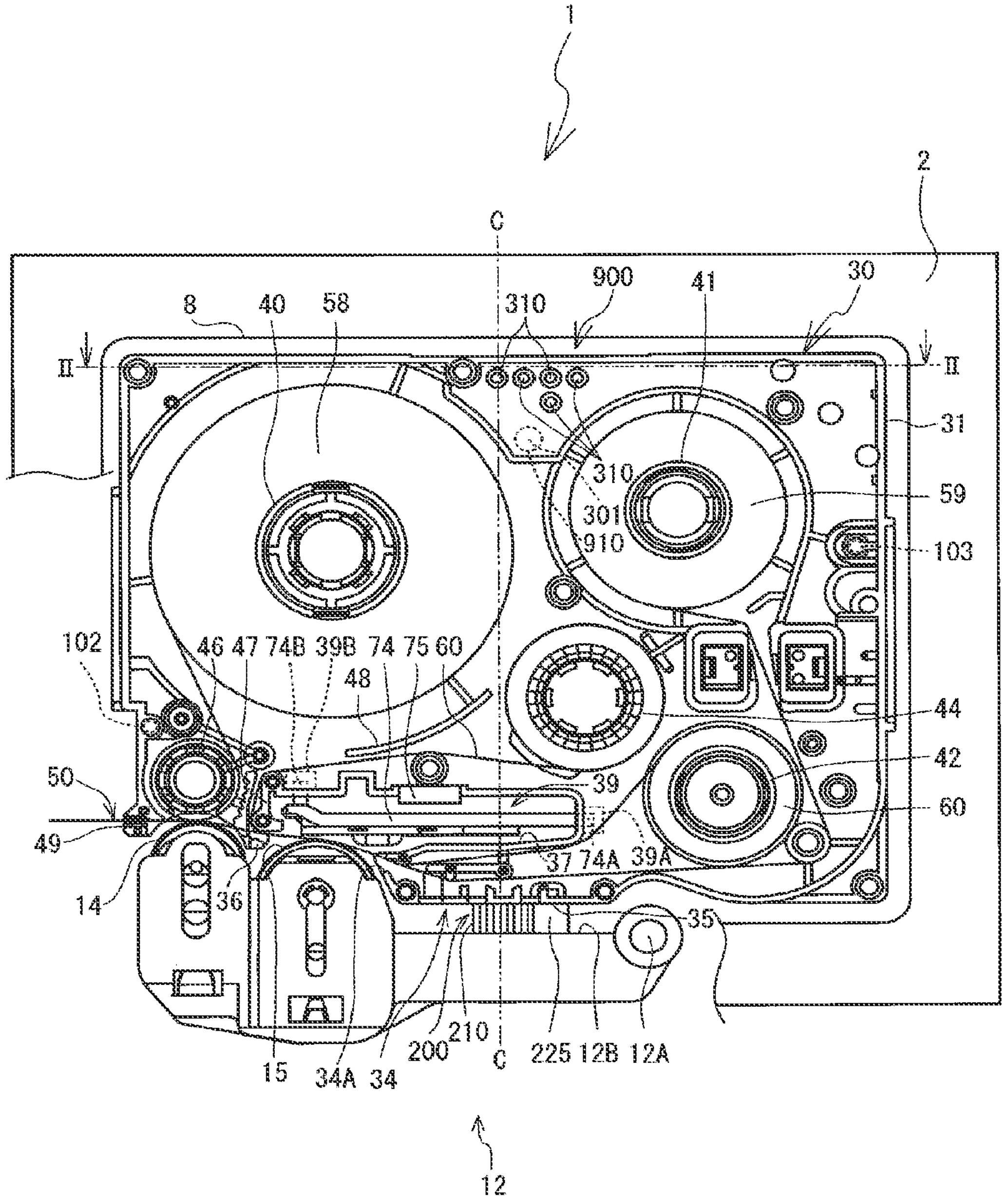
FIG. 4 is a plan view of the cassette housing portion 8 with the laminated type tape cassette 30 installed, when the platen holder 12 is at a print position.
Figure 5:
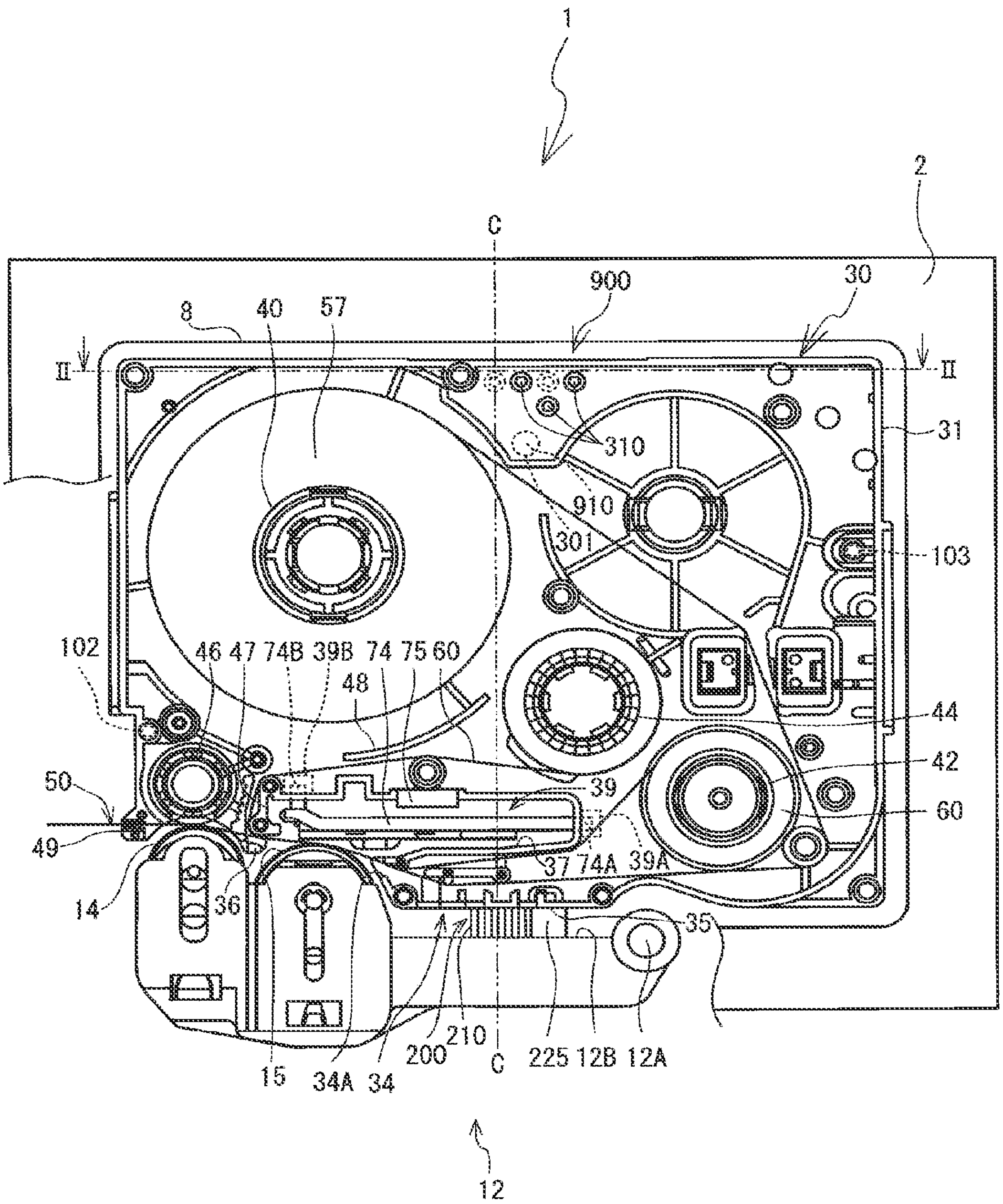
FIG. 5 is a plan view of the cassette housing portion 8 with a receptor type tape cassette 30 installed, when the platen holder 12 is at the print position.
Figure 6:
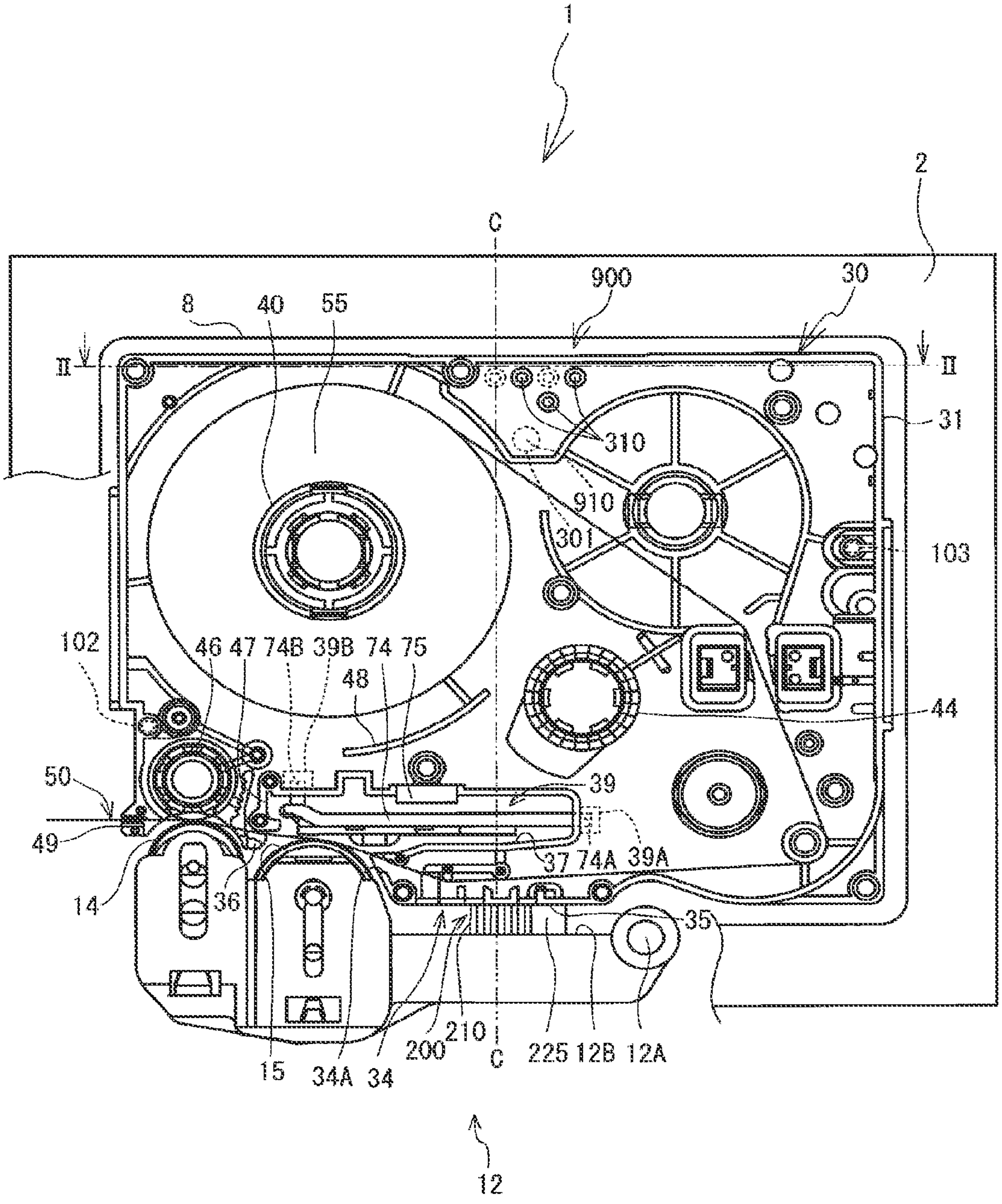
FIG. 6 is a plan view of the cassette housing portion 8 with a thermal type tape cassette 30 installed, when the platen holder 12 is at the print position.

On the other hand, when the cassette cover 6 is closed, the release lever moves in the left direction and the platen holder 12 moves toward the print position shown in FIG. 4 to FIG. 6. Toward the print position shown in FIG. 4 to FIG. 6, the platen holder 12 moves closer to the cassette housing portion 8. At the print position, as shown in FIG. 3 and FIG. 4, when the laminated type tape cassette 30 is installed in the cassette housing portion 8, the platen roller 15 presses the thermal head 10 via a film tape 59 and an ink ribbon 60. At the same time, the movable feed roller 14 presses the tape drive roller 46 via a double-sided adhesive tape 58 and the film tape 59.

In a similar way, as shown in FIG. 5, when the receptor type tape cassette 30 is installed in the cassette housing portion 8, the platen roller 15 presses the thermal head 10 via a print tape 57 and the ink ribbon 60, while the movable feed roller 14 presses the tape drive roller 46 via the print tape 57. Further, as shown in FIG. 6, when the thermal type tape cassette 30 is installed in the cassette housing portion 8, the platen roller 15 presses the thermal head 10 via u heat-sensitive paper tape 55, while the movable feed roller 14 presses the tape drive roller 46 via the heat-sensitive paper tape 55.

As described above, at the print position shown in FIG. 4 to FIG. 6, printing can be performed using the tape cassette 30 installed in the cassette housing portion 8. The heat-sensitive paper tape 55, the print tape 57, the double-sided adhesive tape 58, the film tape 59 and the ink ribbon 60 will be explained in more detail later.

As shown in FIG. 3, a feed path along which a printed tape 50 is fed extends from a tape discharge aperture 49 of the tape cassette 30 to a discharge slit (not shown in the figures) of the tape printer 1. A cutting mechanism 17 that cuts the printed tape 50 at a predetermined position is provided on the feed path. Note that the cutting mechanism 17 is not shown in FIG. 4 to FIG. 6. The cutting mechanism 17 includes a fixed blade 18 and a movable blade 19 that opposes the fixed blade 18 and that is supported such that it can move in the back-and-forth direction (in the up-and-down direction in FIG. 3). The movable blade 19 is moved in the back-and-forth direction by a cutter motor 24 (refer to FIG. 10).

As shown in FIG. 3 to FIG. 6, an arm detection portion 200 is provided on the rear side surface of the platen holder 12, namely, a surface on the side that opposes the thermal head 10 (hereinafter referred to as the cassette-facing surface 12B). The arm detection portion 200 is provided slightly to the right of a center position in the longitudinal direction of the cassette-facing surface 12B. The arm detection portion 200 includes a plurality of detecting switches 210. Switch terminals 222 of the detecting switches 210 (refer to FIG. 9) respectively protrude from the cassette-facing surface 12B toward the cassette housing portion 8 in a generally horizontal manner, in other words, the detecting switches 210 protrude in a direction that is generally perpendicular to a direction of insertion and removal (the up-and-down direction in FIG. 2) of the tape cassette 30 with respect to the cassette housing portion 8, such that the detecting switches 210 oppose the front surface (more specifically, an arm front surface 35 which will be described later) of the tape cassette 30 installed in the cassette housing portion 8.

When the tape cassette 30 is installed in the cassette housing portion 8 at a proper position, the detecting switches 210 are respectively positioned at a height facing an arm indicator portion 800. Hereinafter, the detecting switches 210 of the arm detection portion 200 will be referred to as arm detecting switches 210.

Figure 8:
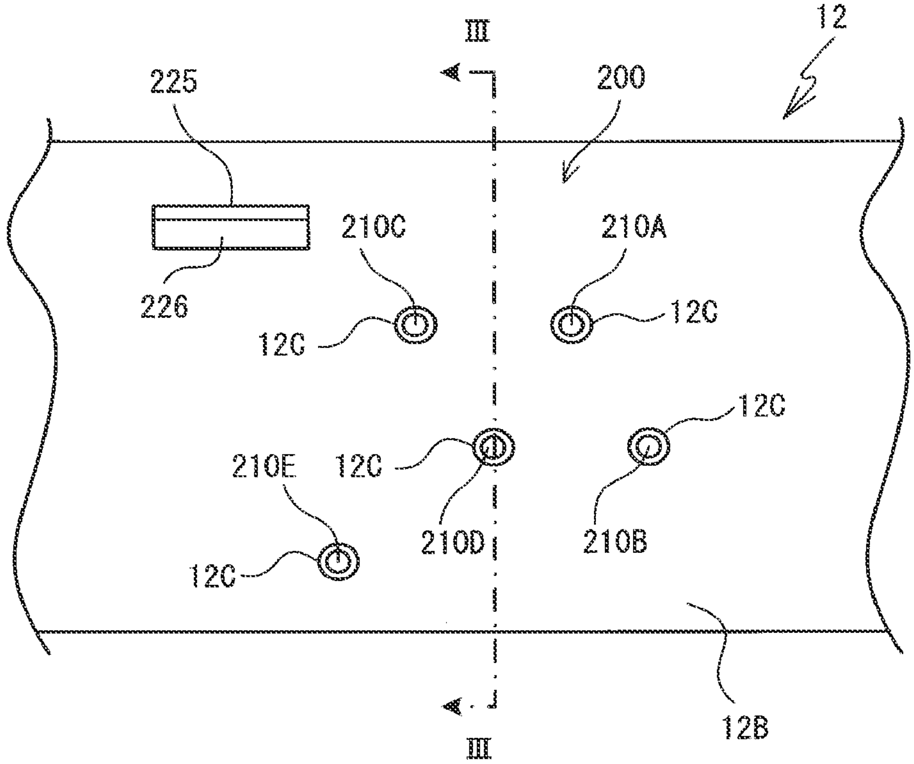
FIG. 8 is a partial enlarged view of a cassette-facing surface 12B on which is provided an arm detection portion 200.

The arrangement and structure of the arm detecting switches 210 in the platen holder 12 will be explained in more detail with reference to FIG. 8 and FIG. 9, As shown in FIG. 8, five through-holes 12C are formed in three rows in the vertical direction in the cassette-facing surface 12B of the platen holder 12. More specifically, the through-holes 12C are arranged such that two holes are arranged in an upper row, two holes are arranged in a middle row and one hole is arranged in a lower row.

Positions of the through-holes 12C are different from each other in the right-and-left direction. Specifically, the five through-holes 12C are arranged in a zigzag pattern from the right side of the cassette-facing surface 12B (the left side in FIG. 8), in the following order; the lower row, the right side of the upper row, the right side of the middle row, the left side of the upper tow, and then the left side of the middle row. The five arm detecting switches 210 are provided from the right side of the cassette-facing surface 12B in the order 210E, 210C, 210D, 210A, and 210B at positions corresponding to the five through-holes 12C.

Figure 9:
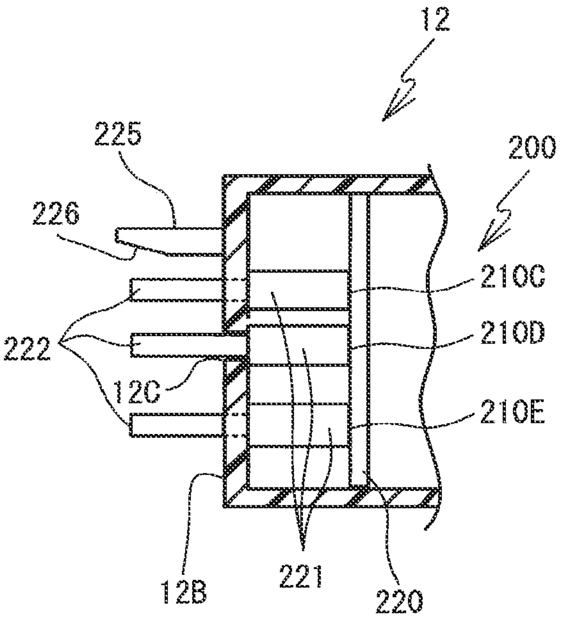
FIG. 9 is a cross-sectional view along a III-III line shown in FIG. 8 us seen in the direction of the arrows.

As shown in FIG. 9, each of the arm detecting switches 210 includes a generally cylindrically shaped main unit 221 and a switch terminal 222. The main unit 221 is positioned inside the platen holder 12. The bar-shaped switch terminal 222 can extend and retract in the direction of an axis line from one end of the main unit 221. The other end of the main unit 221 of the arm detecting switch 210 is attached to a switch support plate 220 and positioned inside the platen holder 12.

In addition, on the one end of the main units 221, the switch terminals 222 can extend and retract through the through-holes 12C formed in the cassette-facing surface 12B of the platen holder 12. Each of the switch terminals 222 is constantly maintained in a state in which the switch terminal 222 extends from the main unit 221 due to a spring member provided inside the main unit 221 (not shown in the figures). When the switch terminal 222 is not pressed, the switch terminal 222 remains extended from the main unit 221 to be in an off state. On the other hand, when the switch terminal 222 is pressed, the switch terminal 222 is pushed back into the main unit 221 to be in an on state.

If the platen holder 12 moves toward the stand-by position (refer to FIG. 3) in a state where the tape Cassette 30 is installed in the cassette housing portion 8, the arm detecting switches 210 are separated from the tape cassette 30. Consequently, all the arm detecting switches 210 are therefore in the off state. On the other hand, if the platen holder 12 moves toward the print position (refer to FIG. 4 to FIG. 6), the arm detecting switches 210 oppose the front surface (more specifically, the arm front surface 35 that will be described later) of the tape cassette 30 and the arm detecting switches 210 are selectively pressed by the arm indicator portion 800, which will be described later. The tape type is detected based on a combination of the on and off states of the arm detecting switches 210, as will be described in more detail later.

Further, as shown in FIG. 3 to FIG. 6, a latching piece 225 is provided on the cassette-facing surface 12B of the platen holder 12. The latching piece 225 is a plate-like protrusion that extends in the right-and-left direction. In a similar way to the switch terminals 222 of the arm detecting switches 210, the latching piece 225 protrudes from the cassette-facing surface 12B in a generally horizontal manner toward the cassette housing portion 8. In other words, the latching piece 225 protrudes such that the latching piece 225 opposes the front surface (more specifically, the arm front surface 35) of the tape cassette 30 installed in the cassette housing portion 8. When the tape cassette 30 is installed in the cassette housing portion 8 at the proper position, the latching piece 225 is positioned at a height facing a latching hole 820 formed in the arm front surface 35 of the tape cassette 30.

The position and structure of the latching piece 225 on the platen holder 12 will be explained in more detail with reference to FIG. 8 and FIG. 9. As shown in FIG. 8, on the cassette-facing surface 12B of the platen holder 12, the latching piece 225 is positioned above the arm detecting switches 210A and 210C in the upper row, and to the right side (the left side in FIG. 8) of the arm detecting switch 210E in the lower row.

As shown in FIG. 9, the latching piece 225 is integrally formed with the platen holder 12 such that the latching piece 225 protrudes from the cassette-facing surface 12B of the platen holder 12 in the rearward direction (the left side in FIG. 9). A length of protrusion of the latching piece 225 from the cassette-facing surface 12B is generally the same as, or slightly greater than, a length of protrusion of the switch terminals 222 of the arm detecting switches 210 from the cassette-facing surface 12B. Furthermore, an inclined portion 226, which is a horizontally inclined part of a lower surface of the latching piece 225, is formed on the latching piece 225 such that the thickness of the latching piece 225 becomes smaller toward the leading end (the left side in FIG. 9).

Figure 10:
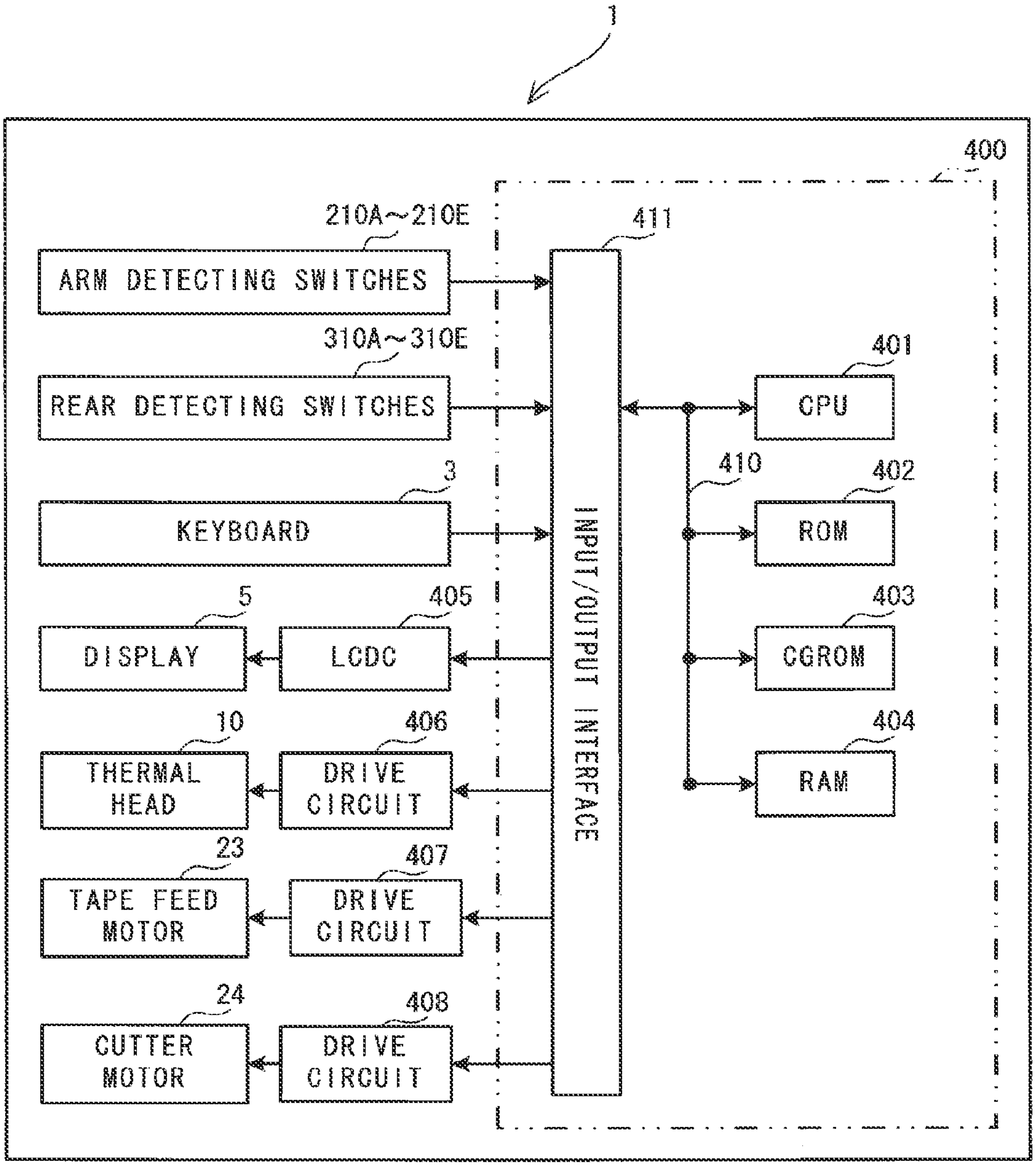
FIG. 10 is a block diagram showing an electrical configuration of the tape printer 1.

Next, the electrical configuration of the tape printer 1 will be explained with reference to FIG. 10. As shown in FIG. 10, the tape printer 1 includes a control circuit 400 formed on a control board. The control circuit 400 includes a CPU 401 that controls each instrument, a ROM 402, a CGROM 403 and a RAM 404 and an input/output interface 411, all of which are connected to the CPU 401 via a data bus 410.

ROM 402 stores various programs to control the tape printer 1, including a display drive control program, a print drive control program, a pulse number determination program, a cutting drive control program, and so on. The display drive control program controls a liquid crystal drive circuit (LCDC) 405 in association with code data of characters, such as letters, symbols, numerals and so on input from the keyboard 3. The print drive control program drives the thermal head 10 and the tape feed motor 23. The pulse number determination program determines the number of pulses to be applied corresponding to the amount of formation energy for each print dot. The cutting drive control program drives the cutting motor 24 to cut the printed tape 50 at the predetermined cutting position. The CPU 401 performs a variety of computations in accordance with each type of program.

The ROM 402 also stores various tables that are used to identify the tape type of the tape cassette 30 installed in the tape printer 1. The tables will be explained in more detail later.

The CGROM 403 stores print dot pattern data to be used to print, various characters. The print dot pattern data is associated with corresponding code data for the characters. The print dot pattern data is categorized by font (Gothic, Mincho, and so on), and the stored data for each font includes six print character sizes (dot sizes of 16, 24, 32, 48, 64 and 96, for example).

The RAM 404 includes a plurality of storage areas, including a text memory, a print buffer and so on. The text memory stores text data input from the keyboard 3. The print buffer stores dot pattern data, including the printing dot patterns for characters and the number of pulses to be applied that is the amount of formation energy for each dot, and so on. The thermal head 10 performs dot printing in accordance with the dot pattern data stored in the print buffer. Other storage areas store data obtained in various computations and so on.

The input/output interface 411 is connected, respectively, to the arm detecting switches 210A to 210E, the rear detecting switches 310A to 310E, the keyboard 3, the liquid crystal drive circuit (LCDC) 405 that has a video RAM (not shown in the figures) to output display data to the display (LCD) 5, a drive circuit 406 that drives the thermal head 10, a drive circuit 407 that drives the tape feed motor 23, a drive circuit 408 that drives the cutter motor 24, and so on.

The configuration of the tape cassette 30 according to the present embodiment will be explained below with reference to FIG. 2 to FIG. 6 and FIG. 11 to FIG. 22. Hereinafter, the tape cassette 30 configured as a general purpose cassette will be explained as an example. As the general purpose cassette, the tape cassette 30 may be assembled as the thermal type, the receptor type and the laminated type that have been explained above, by changing, as appropriate, the type of the tape to be mounted in the tape cassette 30 and by changing the presence or absence of the ink ribbon, and so on.

Figure 11:
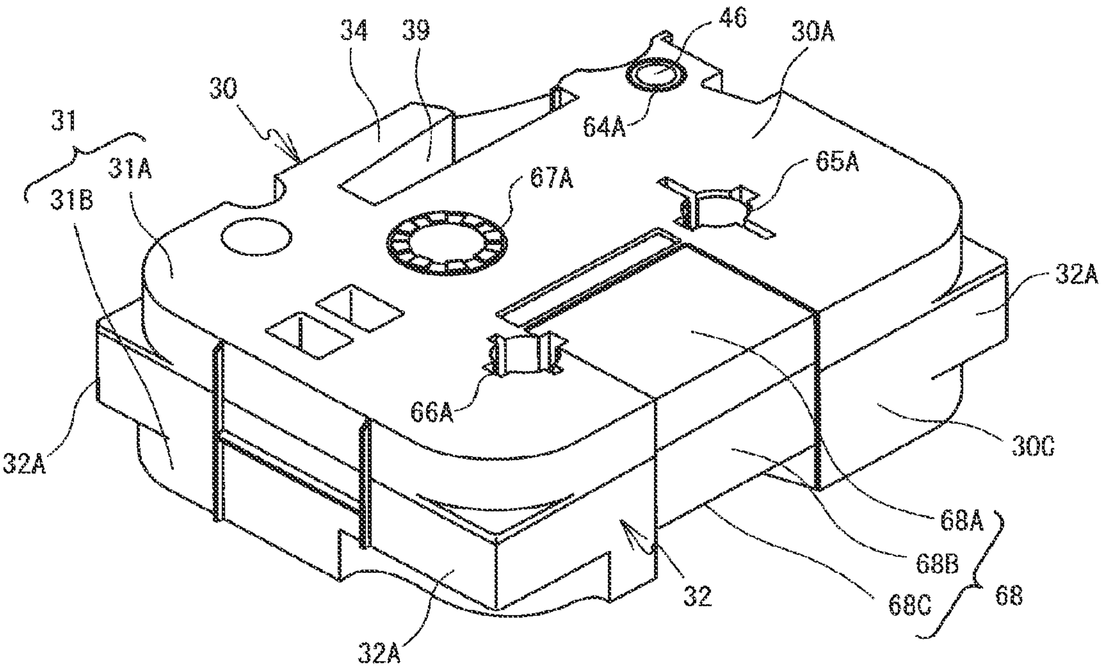
FIG. 11 is an external perspective view of the tape cassette 30 as seen from a top surface 30A.

FIG. 2 and FIG. 11 show the tape cassette 30 in a state where the label sheet 700, which will be described later, is not affixed thereto. FIG. 13 to FIG. 17 are figures relating to the tape cassette 30 in which a width of the tape (hereinafter referred to as a tape width) is equal to or greater than a predetermined width (18 mm, for example) (hereinafter referred to as a wide-width tape cassette 30). More specifically, the wide-width tape cassette 30 represented in FIG. 13 to FIG. 17 is assembled as the laminated type cassette (refer to FIG. 3 and FIG. 4) including the double-sided adhesive tape 58 with a white backing material, the film tape 59, and the ink ribbon 60 with a black ink color, and the width of the tape is 36 mm.

FIG. 18 to FIG. 22 are figures relating to the tape cassette 30 in which the tape width is less than the predetermined width (hereinafter referred to as the narrow-width tape cassette 30). More specifically, the narrow-width tape cassette 30 represented in FIG. 18 to FIG. 22 is assembled as the receptor type cassette (refer to FIG. 5) including the print tape 57 with a gray tape color and the ink ribbon 60 with a blue ink color, and the width of the tape is 12 mm.

As shown in FIG. 2 and FIG. 11, the tape cassette 30 includes a cassette case 31 that is a housing having a generally rectangular parallelepiped shape (box-like shape), with rounded corner portions in a plan view. The cassette case 31 includes a bottom case 31B that includes the bottom surface 30B of the cassette case 31 and the top case 31A that includes a top surface 30A of the cassette case 31. The top case 31A is fixed to an upper portion of the bottom case 31B.

When the top case 31A and the bottom case 31B are joined, a side surface 30C of a predetermined height is formed. The side surface 30C extends between the top surface 30A and the bottom surface 30B along the peripheries of the top surface 30A and the bottom surface 30B. In other words, the cassette case 31 is a box-shaped case that has the top surface 30A and the bottom surface 30B, which are a pair of rectangular flat surfaces opposing each other in a vertical direction, and the side surface 30C (in the present embodiment, formed by four surfaces of a front surface, a rear surface, a left side surface and a right side surface) that has a predetermined height and extends along the peripheries of the top surface 30A and the bottom surface 30B.

In the cassette case 31, the peripheries of the top surface 30A and the bottom surface 30B may not have to be completely surrounded by the side surface 30C. A part of the side surface 30C (the rear surface, for example) may include an aperture that exposes the interior of the cassette case 31 to the outside. Further, a boss that connects the top surface 30A and the bottom surface 30B may be provided in a position facing the aperture. In the explanation below, the distance from the bottom surface 30B to the top surface 30A (the length in the vertical direction) is referred to as the height of the tape cassette 30 or the height of the cassette case 31. In the present embodiment, the vertical direction of the cassette case 31 (namely, the direction in which the top surface 30A and the bottom surface 30B oppose each other) generally corresponds to the direction of insertion and removal of the tape cassette 30.

Figure 14:
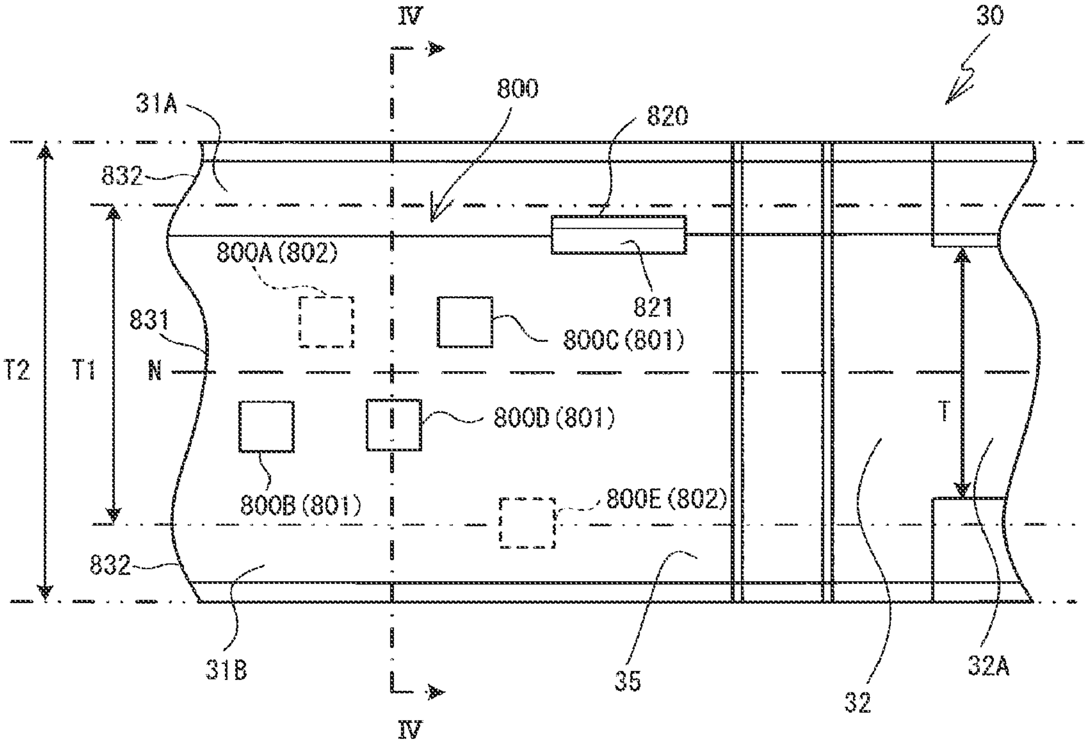
FIG. 14 is an enlarged front view of an arm front surface 35 of the wide-width tape cassette 30.
Figure 19:
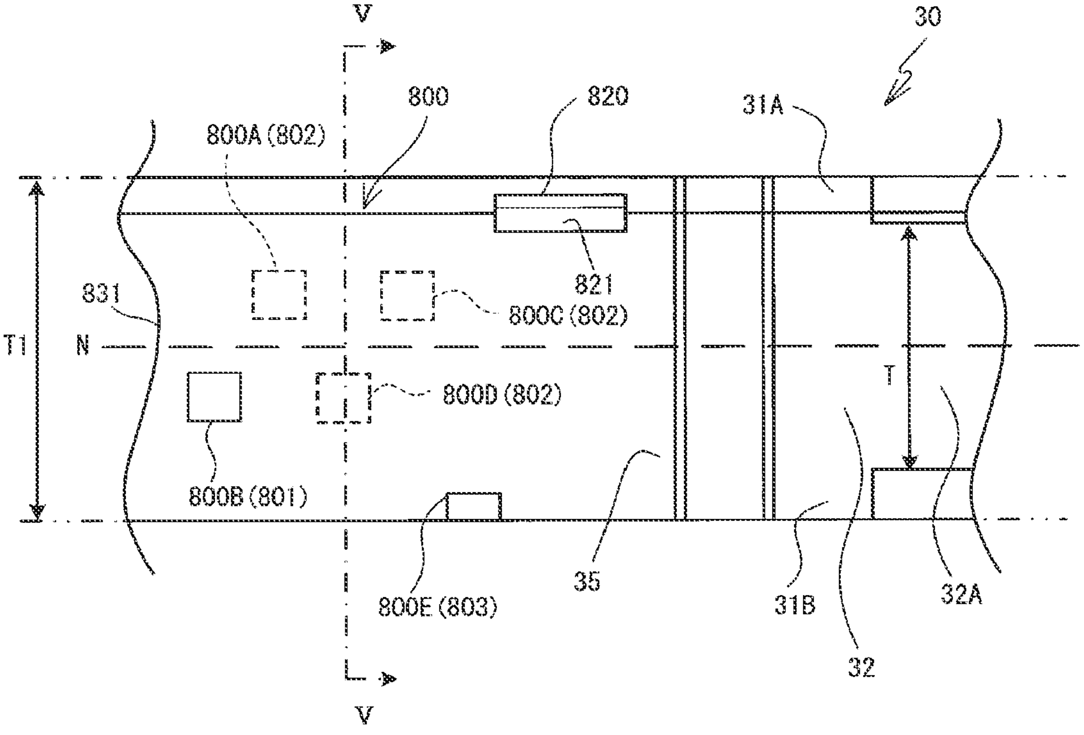
FIG. 19 is an enlarged front view of the arm front surface 35 of the narrow-width tape cassette 30.

As shown in FIG. 14 and FIG. 19, the cassette case 31 has the corner portions 32A that have the same width (the same length in the vertical direction), regardless of the type of the tape cassette 30. The corner portions 32A each protrude in an outward direction to form a right angle when seen in a plan view. However, the lower left corner portion 32A does not form a right angle in the plan view, as the tape discharge aperture 49 is provided in the corner. When the tape cassette 30 is installed in the cassette housing portion 8, the lower surface of the corner portions 32A opposes the above-described cassette support portion 8B inside the cassette housing portion 8.

The cassette case 31 includes a portion is called the common portion 32. The common portion 32 includes the corner portions 32A and encircles the cassette case 31 along the side surface 30C at the same position as the corner portions 32A in the vertical (height) direction of the cassette case 31 and also has the same width as the corner portions 32A. More specifically, the common portion 32 is a portion that has a symmetrical shape in the vertical direction with respect to a center line in the vertical (height) direction of the cassette case 31. The height of the tape cassette 30 differs depending on the width of the tape (the heat-sensitive paper tape 55, the print tape 57, the double-sided adhesive tape 58, the film tape 59 and so on) mounted in the cassette case 31. The height of the common portion 32 (a width T), however, is set to be the same, regardless of the width of the tape of the tape cassette For example, when the width T of the common portion 32 is 12 mm, as the width of the tape of the tape cassette 30 is larger (18 mm, 24 mm, 36 mm, for example), the height of the cassette case 31 becomes accordingly larger, but the width T of the common portion 32 remains constant. If the width of the tape of the tape cassette 30 is equal to or less than the width T of the common portion 32 (6 mm, 12 mm, for example), the height of the cassette case 31 is the width T of the common portion 32 (12 mm) plus a predetermined width. The height of the cassette case 31 is at its smallest in this case.

As shown in FIG. 2 and FIG. 11. the top case 31A and the bottom case 31B respectively have support holes 65A, 66A and 67A and support holes 65B, 66B and 67B (refer to FIG. 12) that rotatably support a first tape spool 40, a second tape spool 41 and the ribbon take-up spool 44, which will be explained later.

In the case of the laminated type tape cassette 30 shown in FIG. 3 and FIG. 4, three types of tape rolls are mouted in the cassette case 31, namely, the double-sided adhesive tape 58 wound on the first tape spool 40, the film tape 59 wound on the second tape spool 41 and the ink ribbon 60 wound on a ribbon spool 42.

The first tape spool 40, on which the double-sided adhesive tape 58 is wound with its release paper facing outward, is rotatably supported by the support holes 65A and 65B. When the cassette case 31 is divided into a left-side area and a right-side area along a center line C in the right-and-left direction (refer to FIG. 4), the support holes 65A and 65B are situated nearer to the rear than to the front of the cassette case 31 within the left-side area. Therefore, the center of rotation, namely, the barycenter, of the double-sided adhesive tape 58 wound on the first tape spool 40 is situated nearer to the rear within the left-side area.

The second tape spool 41, on which the film tape 59 is wound, is rotatably supported by the support holes 66A and 66B. When the cassette case 31 is divided into the left-side area and the right-side area along the center line C in the right-and-left direction, the support holes 66A and 66B are situated nearer to the rear than to the front of the cassette case 31 within the right-side area. Therefore, the center of rotation, namely, the barycenter, of the film tape 59 wound on the second tape spool 41 is positioned within the right-side area. Also, in a similar way to the double-sided adhesive tape 58, the barycenter of the film tape 59 is situated nearer to the rear of the cassette case 31.

The ink ribbon 60 that is wound on a ribbon spool 42 is rotatably provided within the same right-side area of the cassette case 31 as the film tape 59. The ink ribbon 60 is situated nearer to the front than to the rear of the cassette case 31. Therefore, the center of rotation, namely, the barycenter of the ink ribbon 60 is situated nearer to the front within the right-side area.

Between the first tape spool 40 and the ribbon spool 42 in the cassette case 31 the ribbon take-up spool 44 is rotatably supported by the support holes 67A and 67B. The ribbon take-up spool 44 pulls out the ink ribbon 60 from the ribbon spool 42 and takes up the ink ribbon 60 that has been used to print the characters. A clutch spring (not shown in the figures) is attached to a lower portion of the ribbon take-up spool 44 to prevent loosening of the taken up ink ribbon 60 due to a reverse rotation of the ribbon take-up spool 44.

In a case of the receptor type tape cassette 30 shown in FIG. 5, two types of tape rolls are mounted in the cassette case 31, namely, the print tape 57 wound on the first tape spool 40 and the ink ribbon 60 wound on the ribbon spool 42. The center of rotation, namely, the barycenter, of the print tape 57 wound on the first tape spool 40 is situated nearer to the rear than to the front within the left-side area. The center of rotation, namely, barycenter of the ink ribbon 60 is situated nearer to the front than to the rear within the right-side area. The receptor type tape cassette 30 does not include the second tape spool 41.

In the case of the thermal type tape cassette 30 shown in FIG. 6, a single tape roll is mounted in the cassette case 31, namely, the heat-sensitive paper tape 55 wound on the first tape spool 40. The center of rotation, namely, the barycenter, of the heat-sensitive paper tape 55 wound on the first tape spool 40 is situated nearer to the rear than to the front within the left-side area. The thermal type tape cassette 30 does not include the second tape spool 41 and the ribbon spool 42.

As shown in FIG. 2, a semi-circular groove 34K that has a semi-circular shape in a plan view is provided in the front surface of the cassette case 31, and extends over the height of the cassette case 31 (in other words, extends from the top surface 30A to the bottom surface 30B). The semi-circular groove 34K is a recess that serves to prevent an interference between the shaft support 12A and the cassette case 31 when the tape cassette 30 is installed in the cassette housing portion 8. The shaft support 12A is the center of rotation of the platen holder 12. Of the front surface of the cassette case 31, a section that stretches leftwards from the semi-circular groove 34K (more specifically, an external wall 34B to be described later) is referred to as the arm front surface 35. A part that is defined by the arm front surface 35 and an arm rear surface 37 and that extends leftwards from the right front portion of the tape cassette 30 is referred to as an arm portion 34. The arm rear surface 37 is separately provided at the rear of the arm front surface 35 and extends over the height of the cassette case 31.

The structure that guides a tape as a print medium (the heat-sensitive paper tape 55, the prim tape 57, the film tape 59, for example) and the ink ribbon 60 in the arm portion 34 will be explained with reference to FIG. 13. A part of the bottom case 31B that forms the arm portion 34 includes the external wall 34B, an internal wall 34C and a separating wall 34D. The external wail 34B forms a part of the arm front surface 35 of the bottom case 31B. The infernal wail 34C is higher than the external wall 34B and has approximately the same height as a width of the ink ribbon 60 (hereinafter referred to as a ribbon width). The internal wall 34C forms a part of the arm rear surface 37 of the bottom case 31B. The separating wall 34D stands between the external wall 34B and the internal wall 34C, and has the same height as the internal wall 34C.

A pair of guide regulating pieces 34E are formed on the lower edges of both sides of the separating wall 34D. A guide pin 34G is provided at the upstream side (the right side in FIG. 13) of the separating wall 34D in the arm portion 34 of the bottom case 31B. A guide regulating piece 34F is provided on the lower edge of the guide pin 340. A matching pair of guide regulating pieces 34H are provided in a part of the top case 31A that forms the arm portion 34, respectively corresponding to the pair of guide regulating pieces 34E provided on the lower edges of both sides of the separating wall 34D. The leading end of the arm front surface 35 is bent rearwards, and an exit 34A that extends in the vertical direction is formed at the left end of the arm front surface 35 and the arm rear surface 37.

When the top case 31A and the bottom case 31B are joined to form the cassette case 31, a tape feed path and a ribbon feed path are formed inside the arm portion 34. The tape feed path guides the tape that is the print medium (in FIG. 13, the film tape 59) with the external wall 34B, the separating waif 34D, and the guide pin 34G. The ribbon feed path guides the ink ribbon 60 with the internal wall 34C and the separating wall 34D.

While the lower edge of the film tape 59 is regulated by the guide regulating piece 34F, the direction of the film tape 59 is changed by the guide pin 34G. The film tape 59 is fed further while regulated in the tape width direction by each of the guide regulating pieces 34E on the lower edges of the separating wall 34D working in concert with each of the guide regulating pieces 34H of the top case 31A. In such a way, the film tape 59 is guided and fed between the external wall 34B and the separating wall 34D inside the arm portion 34.

The ink ribbon 60 is guided by the separating wall 34D and the internal wall 34C that has approximately the same height as the ribbon width, and is thus guided and fed between the internal wall 34C and the separating wall 34D inside the arm portion 34. In the arm portion 34, the ink ribbon 60 is regulated by the bottom surface of the top ease 31A and the top surface of the bottom case 31B in the ribbon width direction. Then, after the film tape 59 and the ink ribbon 60 are guided along each of the feed paths, the film tape 59 and the ink ribbon 60 are joined together at the exit 34A and discharged to a head insertion portion 39 (more specifically, an opening 77, which will be described later).

With the structure described above, the tape feed path and the ribbon feed path are formed as different feed paths separated by the separating wall 34D inside the arm portion 34. Therefore, the film tape 59 and the ink ribbon 60 may be reliably and independently guided within each of the feed paths that correspond to the respective tape width and ribbon width.

Inside the tape cassette 30, a thin plate-shaped separating wall 90 is formed between the above-described tape feed path and the arm front surface 35. The separating wall 90 extends from the top surface 30A to the bottom surface 30B of the cassette case 31 and is generally parallel to the print surface of the tape that is the print medium. The separating wall 90 prevents the arm detecting switch 210, which enters into the arm portion 34 through a non-pressing portion 801 that will be described later, from touching the print surface of the tape. Further, the separating wall 90 guides the tape smoothly along the tape feed path inside the arm portion 34.

Figure 13:
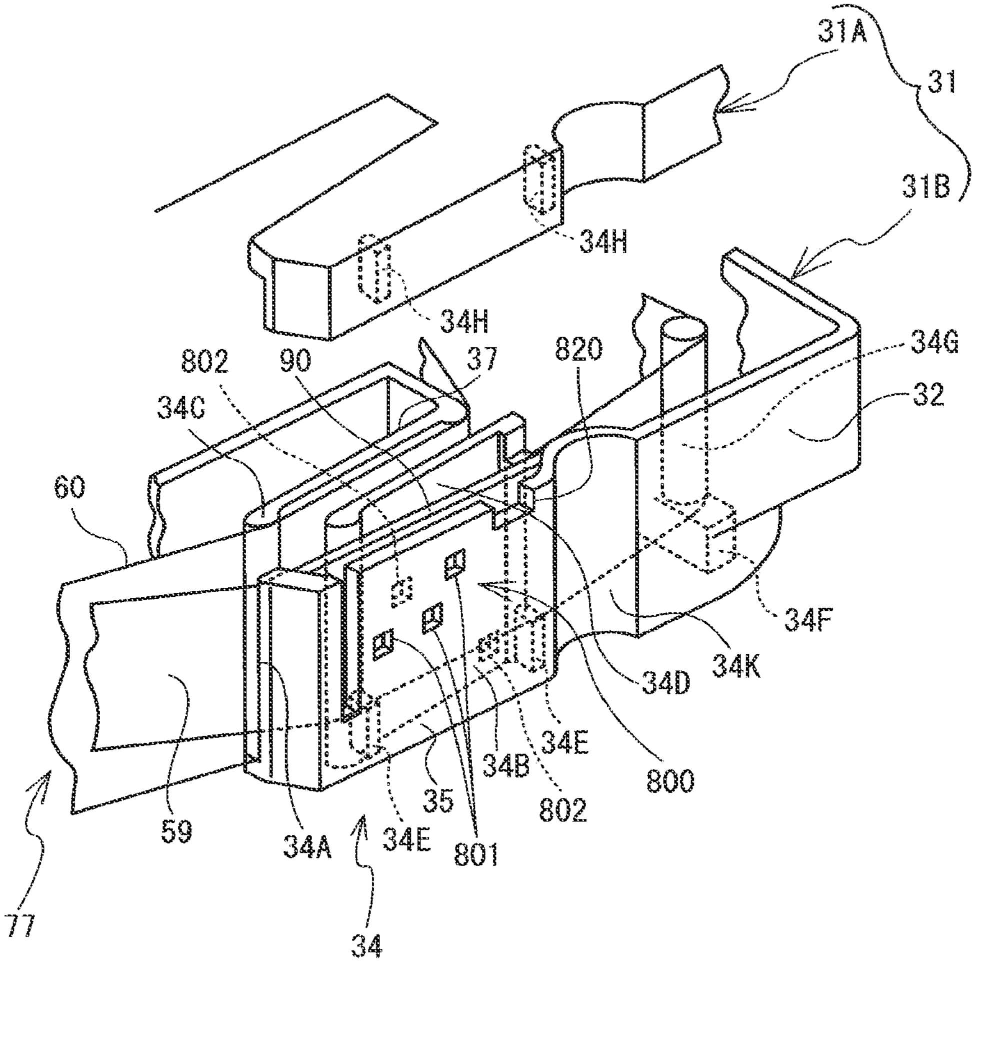
FIG. 13 is an enlarged and exploded perspective view of an arm portion 34 of a wide-width tape cassette 30.

Although FIG. 13 shows an example of the laminated type tape cassette 30 (refer to FIG. 3 and FIG. 4), the arm portion 34 of the other types of tape cassettes 30 is similar. Specifically, in the receptor type tape cassette 30 (refer to FIG. 5), the print tape 57 is guided and fed along the tape feed path, while the ink ribbon 60 is guided and fed along the ribbon feed path. In the thermal type tape cassette 30 (refer to FIG. 6), the heat-sensitive paper tape 55 is guided and fed along the tape feed path, while the ribbon feed path is not used.

As shown in FIG. 3 to FIG. 6, a space that is surrounded by the arm rear surface 37 and a peripheral wall surface that extends continuously from the arm rear surface 37 is the head insertion portion 39. The head insertion portion 39 is a generally rectangular shape in a plan view and extends through the tape cassette 30 in the vertical direction. The head insertion portion 39 is situated nearer to the front of the cassette case 31 (namely, situated nearer to the opposite side from the heat-sensitive paper tape 55, the print tape 57, the double-sided adhesive tape 58. and the film tape 59). The head insertion portion 39 is connected to the outside also at the front surface side of the tape cassette 30, through the opening 77 formed in the front surface of the tape cassette 30.

The head holder 74 that supports the thermal head 10 of the tape printer 1 may be inserted into the head insertion portion 39. The tape that is discharged from the exit 34A of the arm portion 34 (one of the heat-sensitive paper tape 55, the print tape 57 and the film tape 59) is exposed to the outside of the cassette case 31 at the opening 77, where printing is performed by the thermal head 10.

Support reception portions are provided at positions facing the head insertion portion 39 of the cassette case 31. The support reception portions are used to determine the position of the tape cassette 30 in the vertical direction when the tape cassette 30 is installed in the tape printer 1. In the present embodiment, an upstream reception portion 39A is provided on the upstream side of the insertion position of the thermal head 10 (more specifically, the print position) in the feed direction of the tape that is the print medium (the heat-sensitive paper tape 55, the print tape 57, the film tape 59), and a downstream reception portion 39B is provided on the downstream side. The support reception portions 39A and 39B are hereinafter collectively referred to as the head reception portions 39A and 39B. When the tape cassette 30 is installed in the cassette housing portion 8, the head reception portions 39A and 39B respectively contact with the head support portions 74A and 74B provided on the head holder 74 to be supported from underneath by the head support portions 74A and 74B.

In the bottom case 31B, a latch portion 38 is provided at a position between the upstream reception portion 39A and the downstream reception portion 39B, facing the head insertion portion 39. The latch portion 38 is an indentation with a generally rectangular shape in a bottom view (refer to FIG. 12). When the tape cassette 30 is installed in the cassette housing portion 8, the latch portion 38 serves as a portion with which the cassette hook 75 is engaged.

Figure 12:
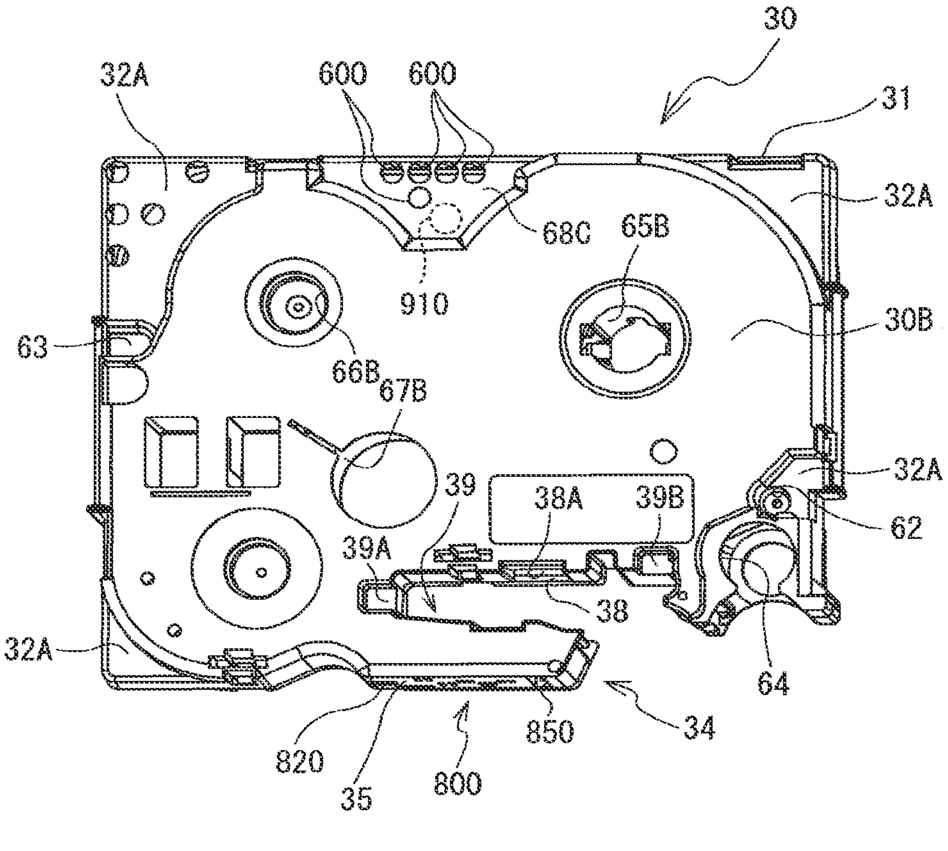
FIG. 12 is an external perspective view of the tape cassette 30 as seen from a bottom surface 30B.

Furthermore, as shown in FIG. 12, the pinholes 62 and 63 are provided at two positions on the lower surface of the corner portions 32A, corresponding to the above-described positioning pins 102 and 103 of the tape printer 1. More specifically, the pin hole 62, into which the positioning pin 102 is inserted, is an indentation provided in the lower surface of the corner portion 32A to the rear of a support hole 64 that is provided in the left front portion of the cassette case 31 (the lower right side in FIG. 12). Note that the tape drive roller 46 and some other components are not shown in FIG. 12. The pin hole 63, into which the positioning pin 103 is inserted, is an indentation provided in the lower surface of the corner portion 32A in the vicinity of a central portion of the right end of the cassette ease 31 (the left side in FIG. 12).

A distance in the vertical (height) direction of the tape cassette 30 between the position of the pin holes 62 and 63 and a center position in the vertical direction of the film tape 59 that is the print medium housed in the cassette case 31 is constant, regardless of the tape type (the tape width, for example) of the tape cassette 30. In other words, the distance remains constant even when the height of the tape cassette 30 is different.

When the tape cassette 30 is installed in the cassette housing portion 8 and the platen holder 12 moves toward the print position (refer to FIG. 4 to FIG. 6), the arm detection portion 200 and the latching piece 225 provided on the cassette-facing surface 12B oppose the arm front surface 35. As shown in FIG. 2, the arm indicator portion 800 and the latching hole 820 are provided on the arm front surface 35. The arm indicator portion 800 causes the tape printer 1 to detect the tape type by the selectively pressing the arm detecting switches 210. The latching piece 225 is inserted into the latching hole 820.

Figure 18:
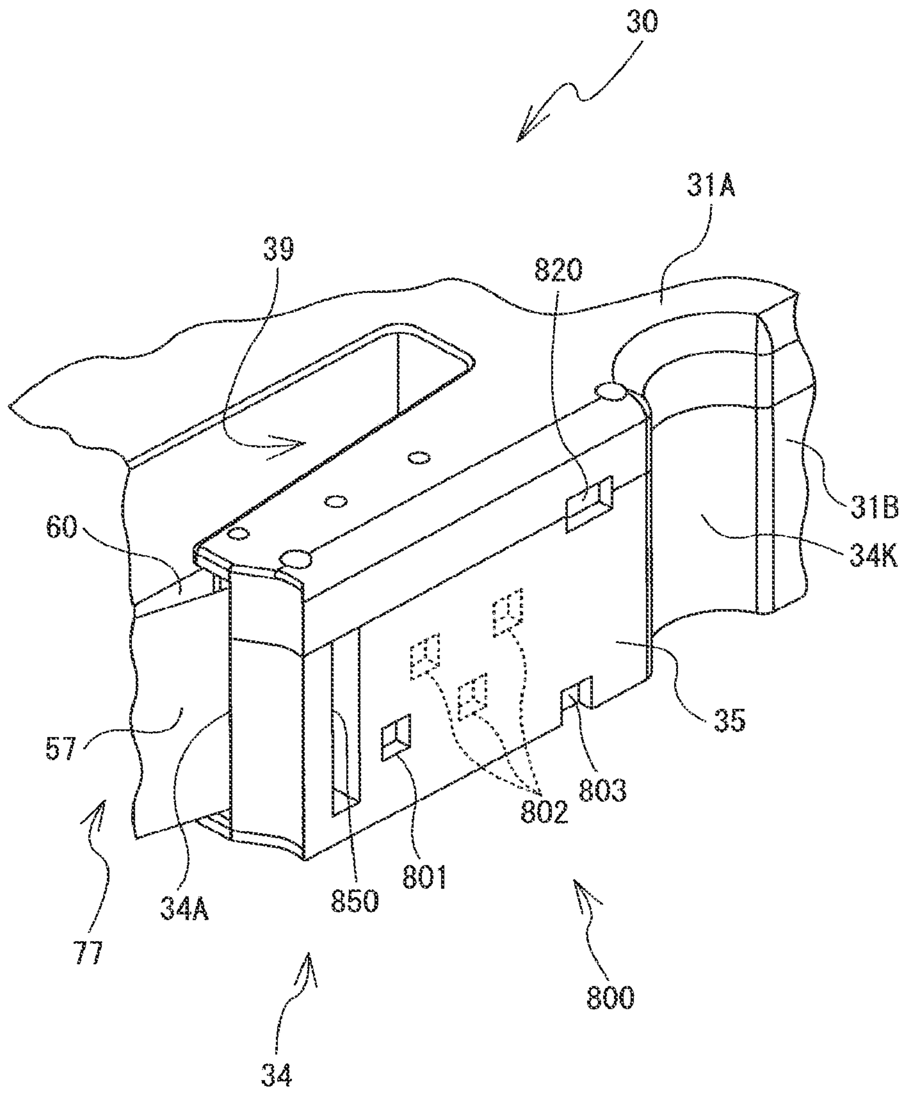
FIG. 18 is an enlarged perspective view of the arm portion 34 of a narrow-width tape cassette 30.

The structure of the arm indicator portion 800 and the latching hole 820 will be explained in detail with reference to FIG. 13, FIG. 14, FIG. 18 and FIG. 19. As described above, FIG. 13 and FIG. 14 show the arm portion 34 of the wide-width tape cassette 30 with the tape width of 36 mm. FIG. 18 and FIG. 19 show the arm portion 34 of the narrow-width tape cassette 30 with the tape width of 12 mm.

The arm indicator portion 800 includes a plurality of indicators. Each of the indicators is formed as one of the non-pressing portion 801 and the pressing portion 802 and provided at a position corresponding to each of the arm detecting switches 210. Specifically, the arm indicator portion 800 includes a combination of the non-pressing portion(s) 801 and the pressing portion(s) 802 arranged in a pattern that corresponds to print information. The print information, among the tape types of the tape cassette 30, is essential to perform correct printing in the tape printer 1. In the present embodiment, the arm indicator portion 800 includes five indicators 800A to 800E, each of which is formed as either the non-pressing portion 801 or the pressing portion 802, arranged at positions that respectively oppose the five arm detecting switches 210A to 210E when the tape cassette 30 is installed in the cassette housing portion 8.

The non-pressing portion 801 is a switch hole that is square shaped to a front view. The switch terminal 222 may be inserted into or removed from the non-pressing portion 801. The arm detecting switch 210 that opposes the non-pressing portion 801 remains in an off state, because the switch terminal 222 is inserted into the non-pressing portion 801. The pressing portion 802 is a surface portion that does not allow the insertion of the switch terminal 222. The arm detecting switch 210 that opposes the pressing portion 802 is changed to an on state, because the pressing portion 802 contacts with the switch terminal 222.

The arm indicator portion 800 is provided at a position adjacent to the exit 34A on the arm front surface 35 (a left portion of the arm front surface 35). In other words, the arm indicator portion 800 is provided adjacent to the opening 77 where the film tape 59 is exposed to the outside. In addition, an aperture formed as a through-hole that extends generally perpendicular to the arm front surface 35 (in other words, generally parallel to the top surface 30A and the bottom surface 30B) is the non-pressing portion 801. As a consequence, the direction of the formation of the non-pressing portion 801 generally intersects at right angles with the tape feed path inside the arm portion 34. The surface portion of the arm front surface 35 at which the non-pressing portion 801 is not formed functions as the pressing portion 802 that presses the switch terminal 222 when opposed to the arm detecting switch 210.

As described above, in the tape cassette 30, the tape feed path and the ribbon feed path are formed in a narrow area sandwiched between the external wall 34B and the internal wall 34C. Because the non-pressing portion 801 of the present embodiment is a through-hole formed in the external wall 34B of the arm portion 34, a member that forms an aperture to function as the non-pressing portion 801 is the external 34B only, and thus the aperture does not reach the internal wall 34C. In other words, the member that forms the aperture to function as the non-pressing portion 801 does not restrict the formation of the tape feed path and the ribbon feed path between the external wall 34B and the internal wall 34C. Therefore, the tape feed path and the ribbon feed path may be formed effectively in a limited area, and the aperture may be formed that functions as a switch hole, and also as an indicator with which a person can identify the tape type by visually checking as described later.

At least one of the indicators (the non-pressing portion(s) 801 and the pressing portion(s) 802) of the arm indicator portion 800 is provided within a predetermined height range T1 (hereinafter referred to as a predetermined height T1) of the arm front surface 35. The predetermined height T1 is the height of the tape cassette 30 for which the height of the cassette case 31 is smallest among the tape cassettes 30 with different tape widths. As described above, the predetermined height T1 is the width T of the common portion 32 plus a predetermined width.

An area within the range of the predetermined height T1 of the arm front surface 35 is referred to as a common indicator portion 831. Preferably, at least one of the indicators (the non-pressing portion (s) 801 and the pressing portion(s) 802) is provided within the common indicator portion 831 that is symmetrical in the vertical direction with respect to a center line N that indicates the center of the arm front surface 35 in the vertical (height) direction of the cassette case 31.

In the present embodiment, the positions of the respective indicators in the arm indicator portion 800 are different from each other in the right-and-left direction. In other words, none of the indicators line up with each other in the vertical direction, and the indicators are arranged in a zigzag pattern. Therefore, a line linking any one of the indicators with another intersects with the vertical direction of the tape cassette 30, which is the direction of the insertion and removal of the tape cassette 30. Detection of the tape type using the arm indicator portion 800 with such a structure will be explained in more detail later.

In the case of the wide-width tape cassette 30, indicators may also be provided either above or below the common indicator portion 831 within a predetermined height range T2 (hereinafter referred to as a predetermined height T2) of the arm front surface 35. Areas that are outside the common indicator portion 831 and that are within the predetermined height T2 of the arm front surface 35 are referred to as extension portions 832.

In the ease, for example, of the wide-width tape cassette 30 with the tape width of 36 mm shown in FIG. 13 and FIG. 14, the five indicators 800A to 800E that correspond, respectively, to the five arm detecting switches 210A to 210E (refer to FIG. 8) are provided in the arm indicator portion 800. More specifically, four indicators 800A to 800D that correspond to the arm detecting switches 210A to 210D are provided in two rows within the predetermined height T1 (namely, in the common indicator portion 831). An indicator 800E that corresponds to the arm detecting switch 210E is provided astride the common indicator portion 831 and the extension portion 832 below the common indicator portion 831.

Yet more specifically, in the upper row in the common indicator portion 831, the indicator 800A, which is the pressing portion 802, is provided cm the left side of the tape cassette 30, and the indicator 800C, which is the non-pressing portion 801, is provided to the right of the indicator 800A. In the lower row in the common indicator portion 831, the indicator 800B, which is the non-pressing portion 801, is provided on the left side of the tape cassette 30, and the indicator 800D, which is the non-pressing portion 801, is provided to the right of the indicator 800B. Further, the indicator 800E, which is the pressing portion 802, is provided astride the common indicator portion 831 and the extension portion 832 that occupies the area below the common indicator portion 831.

In such a way, in the wide-width tape cassette 30, the arm indicator portion 800 may be formed with a larger area that corresponds to the wider arm front surface 35. Consequently, the number of tape types and the number of corresponding patterns that can be defected by the tape printer 1 may be increased.

On the other hand, in the case of the narrow-width tape cassette 30, the indicators are provided only within the range of the predetermined height T1 (in other words, within the common indicator portion 831). As described above, the height of the narrow-width tape cassette 30 is equal to the predetermined height T1. For that, reason, when the tape printer 1 is a general purpose device that can commonly use both the narrow-width tape cassette 30 and the wide-width tape cassette 30, an upper edge portion or a lower edge portion of the cassette case 31 of the narrow-width tape cassette 30 may undesirably press the arm detecting switch 210 (in FIG. 8, the arm detecting switch 210E) that is supposed to oppose the indicator (in FIG. 14, the indicator 800E) that is provided astride the common indicator portion 831 and the extension portion 832 of the wide-width tape cassette 30.

In the present embodiment, to avoid such a situation, an escape hole 803 is formed as the indicator on the and front surface 35 of the narrow-width tape cassette 30, at a position that corresponds to the indicator that is provided astride the common indicator portion 831 and the extension portion 832 of the wide-width tape cassette 30. The escape hole 803 may be formed as a thorough-hole through which the arm detecting switch 210 that opposes the indicator is inserted without being pressed. Alternatively, in place of the escape hole 803, an escape steps may be provided that are formed by being bent stepwise toward the inside.

In the case of the narrow-width tape cassette 30 with the tape width of 12 mm shown in FIG. 18 and FIG. 19, for example, the four indicators 800A to 800D that respectively correspond to the four arm detecting switches 210A to 210D (refer to FIG. 8) opposing the common indicator portion 831 are provided in two rows in the common indicator portion 831. As shown in FIG. 19, the indicators 800A to 800D are, respectively, the pressing portion 802, the non-pressing portion 801, the pressing portion 802, and the pressing portion 802. Corresponding to the arm detecting switch 210E (refer to FIG. 8) that opposes astride the common indicator portion 831 and the extension portion 832, the escape hole 803 is formed as the indicator 800E on the lower edge of the arm front surface 35 (at a position corresponding to the indicator 800E, in the lowermost raw shown in FIG. 14).

In such a way, even when the narrow-width tape cassette 30 is used in the tape printer 1 that is provided with the arm detecting switch 210 that is supposed to oppose the extension portion 832 of the wide-width tape cassette 30, the arm detecting switch 210 in question may be prevented from being mistakenly pressed. Therefore, even when the narrow-width tape cassette 30 and the wide-width tape cassette 30 are both commonly used in the tape printer 1, mistaken detection of the tape type can be prevented.

In the example of the wide-width tape cassette 30 shown in FIG. 13 and FIG. 14, the indicator in the lowermost row (the pressing portion 802) is provided astride the common indicator portion 831 and the extension portion 832 below the common indicator portion 831. However, the indicator (the pressing portion 802) may be entirely included in the extension portion 832, without extending into the common indicator portion 831. In such a case, when the narrow-width tape cassette 30 shown in FIG. 18 and FIG. 19 is installed in the cassette housing portion 8, the lower edge of the arm front surface 35 is positioned above a height position that corresponds to the indicator in question. As a consequence, in this case, there may be no need to provide the escape hole 803 or the escape steps in the narrow-width tape cassette 30. In addition, the indicators) may be provided only in the extension portion 832 above the common indicator portion 831 of the wide-width tape cassette 30, or the indicators may be provided in both the extension portions 832 above and below the common indicator portion 831.

As described above, the arm indicator portion 800 includes a combination of the non-pressing portion(s) 801 and the pressing portion(s) 802 arranged in a pattern that corresponds to the print information of the tape cassette 30. However, in the arm indicator portion 800 according to the present embodiment, the following two patterns are not adopted. One is a pattern in which all of the indicators (the indicators 800A to 800E) are the non-pressing portions 801. The other is a pattern in which all of the indicators provided within the range of the common indicator portion 831 (the indicators 800A to 800D) are the pressing portions 802. In other words, the arm indicator portion 800 according to the present embodiment has a pattern in which at least one of the indicators (the indicators 800A to 800E) is the pressing portion 802, and at the same time, at least one of the indicators provided within the range of the common indicator portion 831 (the indicators 800A to 800D) is the non-pressing portion 801.

As shown in FIG. 2, FIG. 13, FIG. 18 and FIG. 19, the latching hole 820 is a slit-shaped through-hole that is longer in the right-and-left direction and that is provided on the upper right side of the arm indicator portion 800. When the tape cassette 30 is installed in the cassette housing portion 8, the latching hole 820 opposes the latching piece 225 such that the latching piece 225 can be freely inserted or removed. More specifically, the latching hole 820 extends over a joint portion between the top case 31A and the bottom case 31B, and is formed above the indicator positioned furthest to the right side in the arm indicator portion 800 (in FIG. 13 and FIG. 18, the lower row indicator 800E) such that the left edge of the latching hole 820 is positioned above the indicator. The latching hole 820 is a through-hole with a generally rectangular shape in a front view, with the long edges extending in the right-and-left direction. In addition, a part of a lower inner wall of the latching hole 820 is formed as an inclined portion 821 that inclines with respect to the horizontal direction such that an opening width of the latching hole 820 in the vertical direction is largest on the arm front surface 35, and gradually decreases toward the inside (refer to FIG. 23).

A through-hole 850 with an upright rectangular shape in a front view is provided in the arm front surface 35 of the bottom case 31B, to the left side of the arm indicator portion 800. The through-hole 850 is provided as a relief hole for a die to be used in a molding process of the cassette case 31, and does not have any particular function.

As shown in FIG. 3 to FIG. 6, along the tape feed path from the exit 34A of the arm portion 34 to the tape discharge aperture 49, the support holes 64 (refer to FIG. 12) are provided on the downstream side of the head insertion portion 39 in the tape feed direction. The tape drive roller 46 is rotatably supported inside the support holes 64. In a case where the laminated type tape cassette 30 shown in FIG. 3 and FIG. 4 is installed, the tape drive roller 46, by moving in concert with the opposing movable feed roller 14, pulls out the film tape 59 from the second tape spool 41. At the same time, the tape drive roller 46 pulls out the double-sided adhesive tape 58 from the first tape spool 40, then guides the double-sided adhesive tape 58 to the print surface of the film tape 59 and bond the double-sided adhesive tape 58 and the film tape 59 together.

A pair of regulating members 36 that match in the vertical direction are provided on the upstream side of the tape drive roller 46. The regulating members 36 regulate the printed film tape 59 on the downstream side of the thermal head 10 in the vertical direction (in the tape width direction), and guide the printed film tape 59 toward the tape discharge aperture 49. The regulating members 36 bond the film tape 59 and the double-sided adhesive tape 58 together appropriately without making any positional displacement.

A guide wall 47 is standing in the vicinity of the regulating members 36. The guide wall 47 separates the used ink ribbon 60 that has been fed via the head insertion portion 39 from the film tape 59, and guides the used ink ribbon 60 toward the ribbon take-up spool 44. A separating wall 48 is standing between the guide wall 47 and the ribbon take-up spool 44. The separating wall 48 prevents mutual contact between the used ink ribbon 60 that is guided along the guide wall 47 and the double-sided adhesive tape 58 that is wound on and supported by the first tape spool 40.

In a case where the receptor type tape cassette 30 shown in FIG. 5 is installed, the print tape 57 is pulled out from the first tape spool 40 by the tape drive toiler 46 moving in concert with the movable feed roller 14. On the downstream side of the thermal head 10, the printed print tape 57 is regulated in the vertical direction (in the tape width direction) by the regulating members 36, and is guided toward the tape discharge aperture 49. In addition, the used ink ribbon 60 that has been fed via the head insertion portion 39 is separated from the print tape 57 by the guide wall 47 and guided toward the ribbon take-up spool 44.

In a case where the thermal type tape cassette 30 shown in FIG. 6 is installed, the heat-sensitive paper tape 55 is pulled out from the first tape spool 40 by the tape drive roller 46 moving in concert with the movable feed roller 14. On the downstream side of the thermal head 10, the printed heat-sensitive paper tape 55 is regulated in the vertical direction (in the tape width direction) by the regulating members 36, and guided toward the tape discharge aperture 49.

As shown in FIG. 2 and FIG. 11, a label affixing portion 68 is provided on the surfaces of a rear portion of the cassette case 31. In the label affixing portion 68, the label sheet 700, which will be explained later, is affixed over three surfaces, namely, the top surface 30A, side surface 30C (more specifically, the rear surface) and the bottom surface 30B. More specifically, the label affixing portion 68 has a top surface affixing portion 68A, a rear surface affixing portion 68B, and the rear indentation 68C. The top surface affixing portion 68A has a rectangular shape in a plan view and is provided on a rear portion of the top surface 30A. The rear surface affixing portion 68B has a rectangular shape in a rear view and extends in the vertical direction on the side surface 30C. The rear indentation 68C has a generally triangular shape in a bottom view and is provided in a rear portion of the bottom surface 30B. The top surface affixing portion 68A, the rear surface affixing portion 68B and the rear indentation 68C have approximately the same width and are provided at a generally central position in the right-and-left direction of the rear portion of the cassette case 31, and form a continuous area that extends over the three surfaces of the top surface 30A, the side surface 30C and the bottom surface 30B.

The rear indentation 68C is a stepped portion formed at the rear of the cassette case 31 between a first tape (the double-sided adhesive tape 58, for example) wound on the first tape spool 40 and a second tape (the film tape 59, for example) wound on the second tape spool 41. In other words, the rear indentation 68C is provided between two areas that respectively house the first tape and the second tape inside the cassette case 31. More specifically, as shown in FIG. 12, the rear indentation 68C is formed as an indentation in the bottom surface 30B with a shape that generally corresponds to the shape of the rear support portion 8C shown in FIG. 2, and is generally on the same plane as the lower surface of the corner portions 32A.

A plurality of detection holes 600 are formed in the rear indentation 68C such that the detection holes 600 penetrate through the rear indentation 68C in the vertical direction. Each of the detection holes 600 has an opening width that freely allows the insertion and removal of the switch terminal 322 of the rear detecting switch 310 (refer to FIG. 7). The detection holes 600 are formed at positions that respectively oppose the rear detecting switches 310 when the tape cassette 30 is installed in the cassette housing portion 8. In the present embodiment, as described above, the rear detection portion 800 includes the five rear detecting switches 310A to 310E. Accordingly, five corresponding detection holes 600 are formed in the rear indentation 68C. More specifically, four of the detection holes 600 are arranged in a single row along the rear edge of the rear indentation 68C, and the remaining one detection hole 600 is formed to the front of and in line with the second detection hole 600 from the right (in FIG. 12, the second detection hole 600 from the left).

The rear indicator portion 900 and the rear reception portion 910 are provided in the rear indentation 68C. The rear indicator portion 900 is the portion that causes the tape printer 1 to detect the tape type by selectively pressing the rear detecting switches 310. The rear reception portion 910 is the portion supported by the rear support pin 301. The rear indicator portion 900 and the rear support pin 301 will be described in more detail later.

As described above, the common portion 32 is formed to be symmetrical in the vertical direction with respect to the center line in the vertical (height) direction of the cassette case 31, and the height T of the common portion 32 is set to be constant, regardless of the tape width of the tape cassette 30. Therefore, as with the common portion 32, a distance from the center line in the vertical (height) direction of the cassette case 31 to the rear indentation 68C is constant, regardless of the tape width of the tape cassette 30.

The label sheet 700 that is affixed to the label affixing portion 68 of the cassette case 31, and affixing modes of the label sheet 700 with respect to the tape cassette 30 will be explained with reference to FIG. 15 to FIG. 17 and FIG. 20 to FIG. 22.

Figure 15:
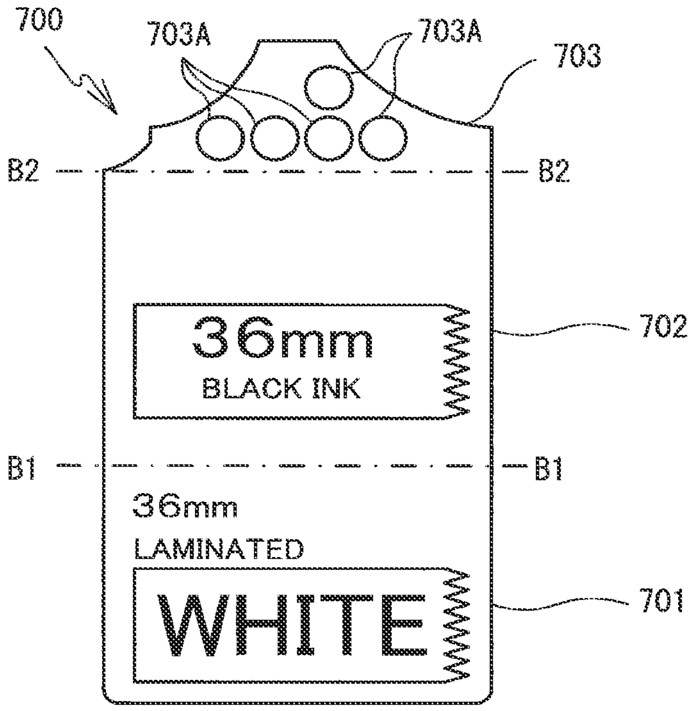
FIG. 15 is a plan view of a label sheet 700 to be used on the wide-width tape cassette 30.
Figure 20:
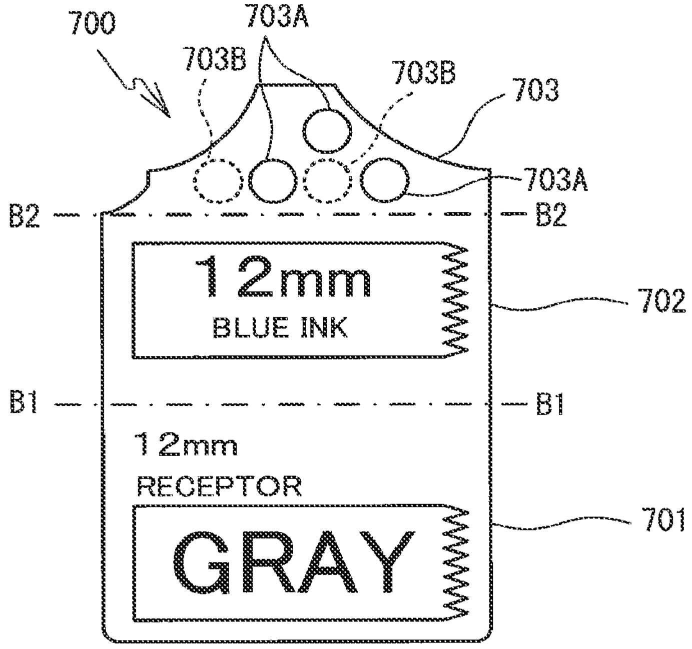
FIG. 20 is a plan view of a label sheet 700 to be used on the narrow-width tape cassette 30.

As shown in FIG. 15 and FIG. 20, the label sheet 700 is a vinyl tape that has flexibility allowing it to be maintained in a state in which it is bent at an angle of at least 90 degrees. A print layer is formed on a front surface of the label sheet 700 on which characters can be printed, and a release paper is affixed to a rear surface via an adhesive layer. A first notation portion 701, a second notation portion 702 and a detection setting portion 703 are continuously provided in the vertical direction (the up-and-down direction in FIG. 15 and FIG. 20) on the label sheet 700. The first notation portion 701, the second notation portion 702 and the detection setting portion 703 have a shape and size that generally match the shape and the size of the top surface affixing portion 68A, the rear surface affixing portion 68B and the rear indentation 68C, respectively.

The label sheet 700 can be bent along a fold line B1 that extends in the right-and-left direction (the right-and-left direction in FIG. 15 and FIG. 20) to divide the first notation portion 701 and the second notation portion 702. The label sheet 700 can also be bent along a fold line B2 that extends in the right-and-left direction to divide the second notation portion 702 and the detection setting portion 703. The fold lines B1 and B2 may be clearly printed in advance, or perforations or notches and the like may be formed in advance along the fold lines B1 and B2, so that the label sheet 700 may easily bent along the fold lines B1 and B2.

When an worker affixes the label sheet 700 onto the label affixing portion 68 (refer to FIG. 11), the worker may remove the release paper from the rear surface of the label sheet 700. Then, while bending the label sheet 700 along the fold lines B1 and B2, the worker may affix the first notation portion 701, the second notation portion 702 and the detection setting portion 703 so as to match the top surface affixing portion 68A, the rear surface affixing portion 68B and the rear indentation 68C, respectively. When the label sheet 700 is affixed to the label affixing portion 68 in such a way, the label sheet 700 adheres to the three surfaces at the rear of the cassette case 31, as shown in FIG. 16, FIG. 17, FIG. 21 and FIG. 22.

The first notation portion 701 and the second notation portion 702 are portions on which is indicated the tape type of the tape cassette 30 to which the label sheet 700 is affixed. Examples of the tape types may include the tape color, the print mode, the tape width, and a color of the characters (hereinafter referred to as a character color). In the present embodiment, the tape color, the print mode, and the tape width of the tape cassette 30 are indicated on the first notation portion 701. The tape color of the tape cassette 30 corresponds to the color of the heat-sensitive paper tape 55, the print tape 57, or the double-sided adhesive tape 58. The print mode indicates one of a normal image printing mode (so-called "receptor") and a mirror image printing mode (so-called "laminated"). The tape width and the character color of the tape cassette 30 are indicated on the second notation portion 702. The character color corresponds to the print color of the heat-sensitive paper tape 55 or the character color of the ink ribbon 60.

In the defection setting portion 703, hole(s) 703A or blocking portion(s) 703B (refer to FIG. 15 and FIG. 20) are formed corresponding to the tape color and character color of the tape cassette 30, from among the tape types of the tape cassette 30 to which the label sheet 700 is affixed. More specifically, the holes 703A and the blocking portions 703B are formed at positions that respectively oppose the detection holes 600 formed penetratingly through the rear indentation 68C when the detection setting portion 703 is affixed to the rear indentation 68C. In the present embodiment, corresponding to each of the five detection holes 600 formed in the rear indentation 68C as described above, either the hole 703A or the blocking portion 703B is formed at five positions.

The hole 703A is a circular hole that has a slightly larger opening width than the detection hole 600. When the label sheet 700 is affixed, the detection hole 600 that opposes the holes 703A is exposed through the hole 703A. Consequently, the switch terminal 322 of the rear detecting switch 310 can therefore be freely inserted and removed. The rear detecting switch 310 that opposes the detection hole 600 exposed through the hole 703A remains in the off state, as the switch terminal 322 is inserted into the defection hole 600.

As the holes 703A each have a larger opening width than the detection holes 600, even if the affixed position of the detection setting portion 703 is slightly misaligned with respect to the rear indentation 68C, the detection holes 600 opposed to the holes 703A are reliably exposed. In such a way, some misalignment in the affixed position of the detection sewing portion 703 may be tolerated, and the operation to affix the label sheet 700 can be made easier.

The blocking portion 703B is a surface portion in which the holes 703A is not formed. When the label sheet 700 is affixed, the detection hole 600 that opposes the blocking portion 703B is covered by the blocking portion 703B. Consequently, the switch terminal 322 of the rear detecting switch 310 cannot be inserted. The rear detecting switch 310 that opposes the detection hole 600 covered by the blocking portion 703B is changed to the on state, as the switch terminal 322 is not inserted into the detection hole 600 and contacts with the blocking portion 703B.

Figure 16:
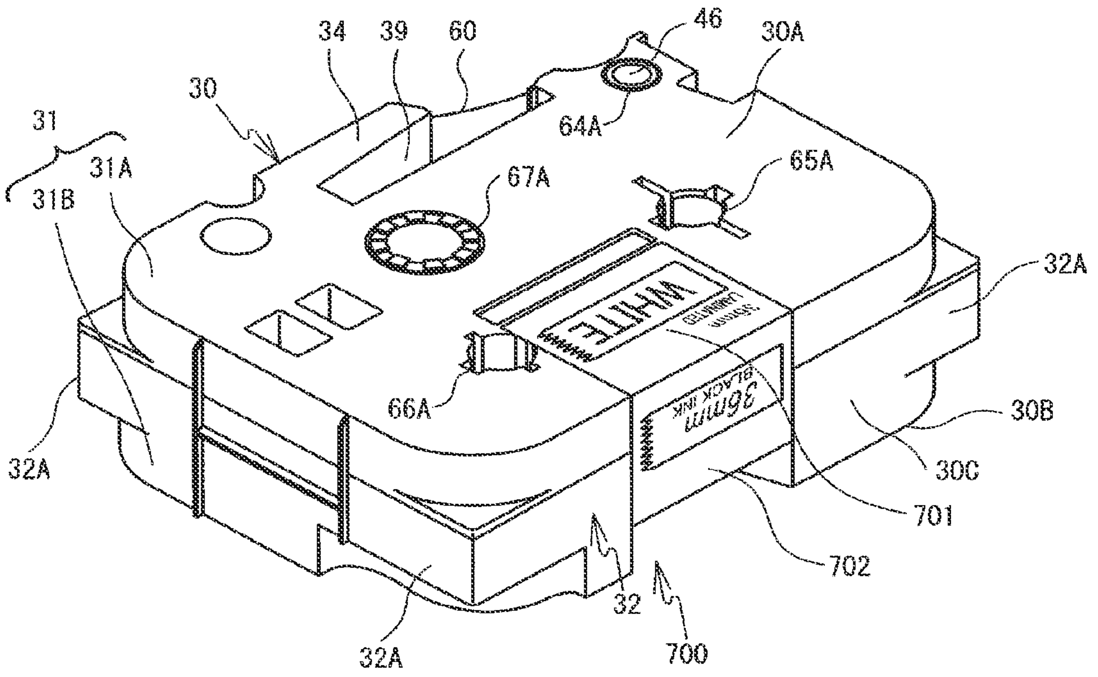
FIG. 16 is an external perspective view of the wide-width tape cassette 30 to which the label sheet 700 shown in FIG. 15 is affixed, as seen from the top surface 30A.

The label sheet 700 shown in FIG. 15 is an example that is to be affixed to the wide-width tape cassette 30 with a tape width of 36 mm, a white tape color, and a black character color, and for which the print mode is the mirror image printing mode (laminated). Therefore, the first notation portion 701 shows the notation "36 mm" for the tape width, "WHITE" for the tape color, and "LAMINATED" for the print mode. The second notation portion 702 shows the notation "36 mm" for the tape width and "BLACK." for the character color. As a result, as shown in FIG. 16, with the tape cassette 30 to which the label sheet 700 described here is affixed, the above-described tape type can be identified by visually-checking the notation portions 701 and 702.

Further, on the detection setting portion 703 of the label sheet 700 shown in FIG. 15, the holes 703A are formed at all of the five positions corresponding to the five detection holes 600, in accordance with the tape color white and the character color black of the tape cassette 30. As a result, as shown in FIG. 17, with the tape cassette 30 to which the label sheet 700 described here is affixed, all of the five detection holes 600 are exposed such that the switch terminals 322 can be inserted and removed through each of the holes 703A.

Figure 21:
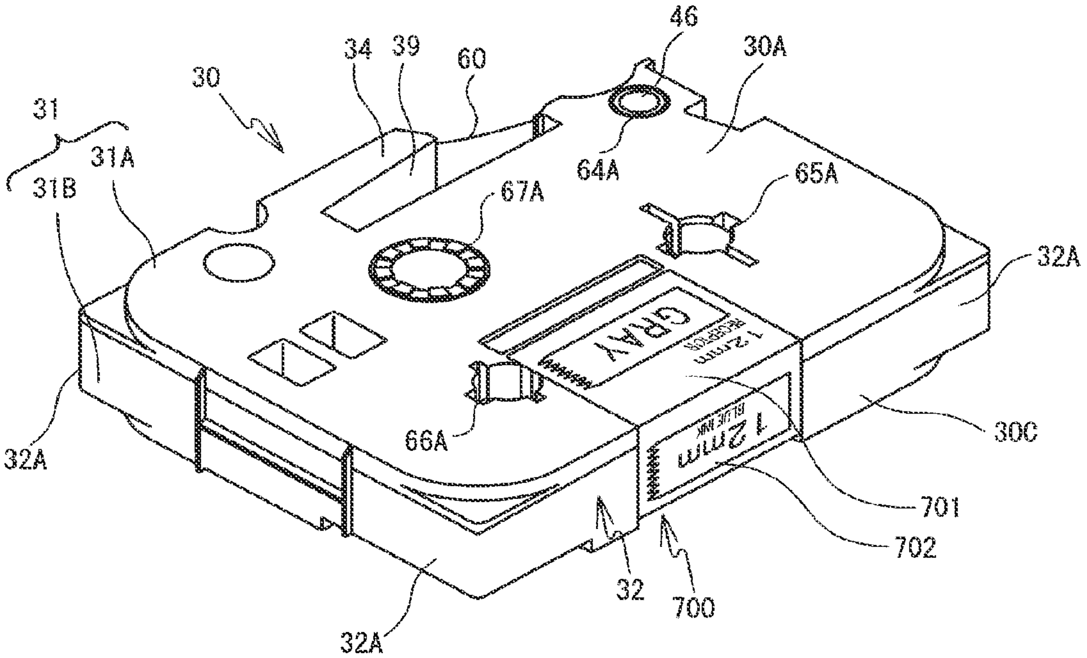
FIG. 21 is an external perspective view of the narrow-width tape cassette 30 to which the label sheet 700 shown in FIG. 20 is affixed, as seen from the top surface 30A.

The label sheet 700 shown in FIG. 20 is an example that is to be affixed to the narrow-width tape cassette 30 with a tape width of 12 mm, a gray tape color, and a blue character color, and for which the print mode is the normal image printing mode (receptor). Therefore, the first notation portion 701 shows the notation "12 mm" for the tape width, "GRAY" for the tape color, and "RECEPTOR" for the print mode. The second notation portion 702 shows the notation "12 mm" for the tape width and "BLUE" for the character color. As a result, as shown in FIG. 21, with the tape cassette 30 to which the label sheet 700 described here is affixed, the above-described tape type can be identified by visually checking the notation portions 701 and 702.

Further, on the detection setting portion 703 of the label sheet 700 shown in FIG. 20, three holes 703A are formed at three of the five positions corresponding to the five detection holes 600, in accordance with the tape color gray and the character color blue of the tape cassette 30. More specifically, the three holes 703A are formed corresponding to the second and fourth detection holes 600 from the right in the first row of the four detection holes 600 (the second and fourth detection holes 600 from the left in FIG. 20), and corresponding to the detection hole 600 that is not arranged in the first row. In addition, the two blocking portions 703B are provided corresponding to the remaining two detection holes 600. As a result, as shown in FIG. 22, with the tape cassette 30 to which the label sheet 700 described here is affixed, three of the detection holes 600 are exposed such that the switch terminals 322 can be inserted and removed through each of the holes 703A, and two of the detection holes 600 are covered respectively by the blocking portions 703B such that the switch terminals 322 cannot be inserted.

Figure 17:
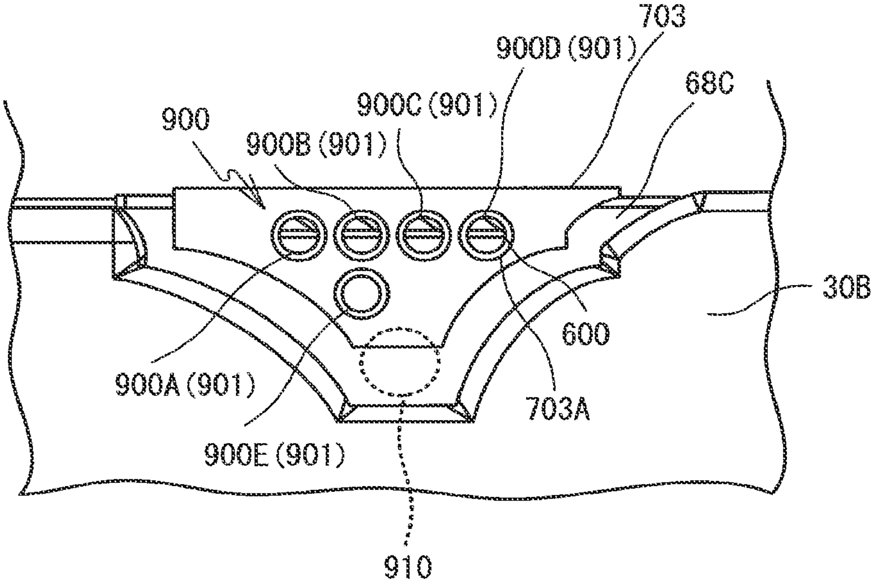
FIG. 17 is an enlarged bottom surface view of a rear indentation 68C of the wide-width tape cassette 30 to which the label sheet 700 shown in FIG. 15 is affixed.
Figure 22:
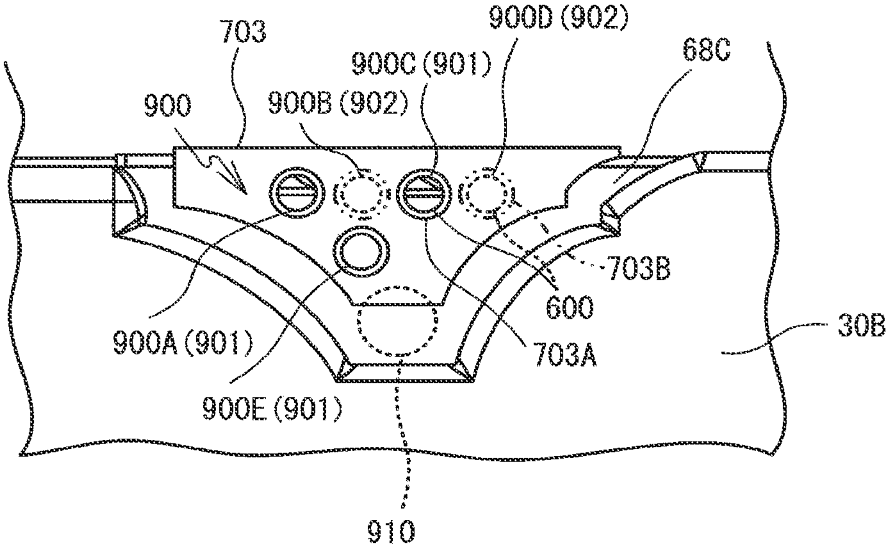
FIG. 22 is an enlarged bottom surface view of the rear indentation 68C of the narrow-width tape cassette 30 to which the label sheet 700 shown in FIG. 20 is affixed.

As shown in FIG. 17 and FIG. 22, in a state in which the label sheet 700 is affixed to the label affixing portion 68 (more specifically, in a state in which the detection setting portion 703 is affixed to the rear indentation 68C), the rear indicator portion 900 includes the detection holes 600 each of which is either exposed through the hole 703A or covered by the blocking portion 703B. When the tape cassette 30 is installed in the cassette housing portion 8, the rear indicator portion 900 causes the tape printer 1 to detect the tape type by selectively pressing the rear detecting switches 310.

The rear indicator portion 900 includes a plurality of indicators. Each of the indicators is formed as one of a non-pressing portion 901 and a pressing portion 902 and provided at a position corresponding to each of the rear detecting switches 310. Specifically, the rear indicator portion 900 includes a combination of the non-pressing portion (s) 901 and the pressing portion(s) 902 arranged in a pattern that corresponds to color information. The color information, among the tape types of the tape cassette 30, indicates the tape color and the character color of the tape cassette 30. In the present embodiment, the rear indicator portion 900 has five indicators 900A to 900E, each of which is formed as either the non-pressing portion 901 or the pressing portion 902, arranged at positions that respectively oppose the rear detecting switches 310A to 310E when the tape cassette 30 is installed in the cassette housing portion 8.

The non-pressing portion 901 is a switch hole through which the switch terminal 322 can be inserted and removed. The non-pressing portion 901 corresponds to the detection hole 600 that is exposed through the hole 703A of the label sheet 700. The rear detection switch 310 that opposes the non-pressing portions 901 remains in an off state, because the switch terminals 322 is inserted into the non-pressing portion 901. The pressing portion 902 is a surface portion that does not allow the insertion of the switch terminal 322. The pressing portion 902 corresponds to the detection hole 600 that is covered by the blocking portion 703B of the label sheet 700. The rear detection switch 310 that opposes the pressing portions 902 is changed to an on state, because the blocking portion 703B contacts the switch terminal 322.

In the example shown in FIG. 17, in the rear indicator portion 900 provided in the rear indentation 68C, all five of the indicators 900A to 900E corresponding to the five rear detecting switches 310A to 310E are formed as the non-pressing portions 901.

In the example shown in FIG. 22, in the rear indicator portion 900 provided in the rear indentation 68C, the four indicators 900A to 900D corresponding to the four rear detecting switches 310A to 310D are arranged in one row along the rear edge of the cassette case 31. More specifically, the four indicators 900A to 900D are respectively formed as in order from the right side (the left side in FIG. 22), the non-pressing portion 901, the pressing portion 902, the non-pressing portion 901 and the pressing portion 902. The indicator 900E formed by the non-pressing portion 901 is provided to the front of the indicator 900B, which is the second from the right (from the left in FIG. 22) in the row.

In such a way, the pattern of the indicators 900A to 900E provided on the rear indicator portion 900 (in other words, the combination of the non-pressing portion(s) 901 and the pressing portion(s) 902) can be varied simply by affixing the label sheet 700 to the label affixing portion 68 (refer to FIG. 11).

As shown in FIG. 2 and FIG. 11, in a state in which the label sheet 700 is not affixed to the tape cassette 30, all the detection holes 600 in the rear indicator portion 900 form the non-pressing portions 901. In other words, the rear indicator portion 900 in which all the indicators 900A to 900E are formed as the non-pressing portions 901 may be freely changed, by affixing the label sheet 700 to the label affixing portion 68, to the rear indicator portion 900 that includes the indicators 900A to 900E arranged in any pattern, namely, any combination of the non-pressing portion(s) 901 and the pressing portion(s) 902.

As shown in FIG. 12, FIG. 17 and FIG. 22, the rear reception portion 910 is provided to the front of the rear indicator portion 900 in the rear indentation 68C. When the tape cassette 30 is installed in the cassette housing portion 8, the rear reception portion 910 contacts with the rear support pin 301 that is provided on the rear support portion 8C of the tape printer 1. In other words, the rear reception portion 910 is supported from underneath by the rear support pin 301, and is a part of the bottom surface 30B that is included in the rear indentation 68C. In the present embodiment, in the rear indentation 68C, the rear reception portion 910 is positioned to the front of the indicators of the rear indicator portion 900. The arrangement of the indicators and the rear reception portion 910, however, may be changed as appropriate, as long as the indicators of the rear indicator portion 900 are within the area of the rear indentation 68C. Support by the rear support pin 301 will be described in more detail later.

The installing modes of the tape cassette 30 in the tape printer 1 according to the present embodiment will be explained below with reference to FIG. 2 to FIG. 6 and FIG. 12.

The support of the head reception portions 39A and 39B by the head support portions 74A and 74B will be explained with reference to FIG. 2 to FIG. 6. When the tape cassette 30 is installed in the cassette housing portion 8, the tape cassette 30 is inserted vertically from above such that the bottom surface 30B of the tape cassette 30 opposes the bottom surface of the cavity 8A. The head holder 74, the ribbon take-up shaft 95 and the tape drive shaft 100 protrude from the bottom surface of the cavity 8A (not shown in the figures). A user therefore respectively inserts the above members into the head insertion portion 39, the ribbon take-up spool 44 and a shaft hole of the tape drive roller 46 to fit the tape cassette 30 into the cassette housing portion 8.

As described above, the upstream support 74A and the downstream support 74B are respectively provided on the right end and the left end of the head holder 74. The upstream reception portion 39A and the downstream reception portion 39B are provided at positions on the tape cassette 30 that correspond to the positions of the upstream support 74A and the downstream support 74B. In other words, the upstream reception portion 39A and the downstream reception portion 39B are respectively provided at the positions on the right side and the left rear side of the head insertion portion 39 facing the head insertion portion 39.

Therefore, when the user pushes the inserted tape cassette 30 downwards, the upstream reception portion 39A of the tape cassette 30 comes into contact with the upstream support 74A provided on the head holder 74, and the movement of the upstream reception portion 39A beyond that point in the downward direction is restricted. Further, the downstream reception portion 39B of the tape cassette 30 comes into contact with the downstream support 74B provided on the head holder 74, and the movement of the downstream reception portion 39B beyond that point in the downward direction is restricted. Then, the tape cassette 30 is held in a state in which the head reception portions 39A and 39B are supported from underneath by the head support portions 74A and 74B.

in such a way, with the tape cassette 30 and the tape printer 1 according to the present embodiment, the positioning of the tape cassette 30 in the vertical direction may be accurately performed at a position in the vicinity of the thermal head 10 that performs printing on the tape as the print medium (the heat-sensitive paper tape 55, the print tape 57, or the film tape 59). Then, the center position of printing by the thermal head 10 in the vertical direction may be accurately matched with the center position of the film tape 59 in the tape width direction. In particular, in the feed direction of the tape as the print medium, the tape cassette 30 is supported on both the upstream and downstream sides with respect to the insertion position of the thermal head 10, more specifically, with respect to the print position. As a consequence, the positioning in the vertical direction may be particularly accurately performed. Thus, the center position of printing by the thermal head 10 in the vertical direction and the center position in the tape width direction may be particularly accurately matched with each other.

In addition, the upstream reception portion 39A and the downstream reception portion 39B of the tape cassette 30 according to the present embodiment surface the head insertion portion 39 from mutually orthogonally intersecting directions. Both the head reception portions 39A and 39B, which are indented portions, are supported by the head support portions 74A and 74B that extend in the mutually orthogonally intersecting directions. Consequently, the movement of the tape cassette 30 is restricted not only in the vertical direction, but also in the right-and-left direction and the back-and-forth direction. As a result, a proper positional relationship can be maintained between the thermal head 10 and the head insertion portion 39.

Next, the support of the tape cassette 30 by the rear support pin 301, and the detection of the tape type of the tape cassette 30 by the rear detection portion 300 will be explained with reference to FIG. 3 to FIG. 6 and FIG. 12. As described above, when the tape cassette 30 is inserted by the user into the cassette housing portion 8 from above and pushed downwards, the head support portions 74A and 74B come into contact with the head reception portions 39A and 39B of the tape cassette 30 and, at the same time, the rear reception portion 910 in the rear indentation 68C of the tape cassette 30 comes into contact with the top surface of the rear support pin 301. As a result, movement of the rear reception portion 910 in the downward direction beyond the contact point is restricted by the rear support pin 301. Then, the tape cassette 30 is held in a state in which the rear reception portion 910 is supported from underneath by the rear support pin 301.

Figure 24:
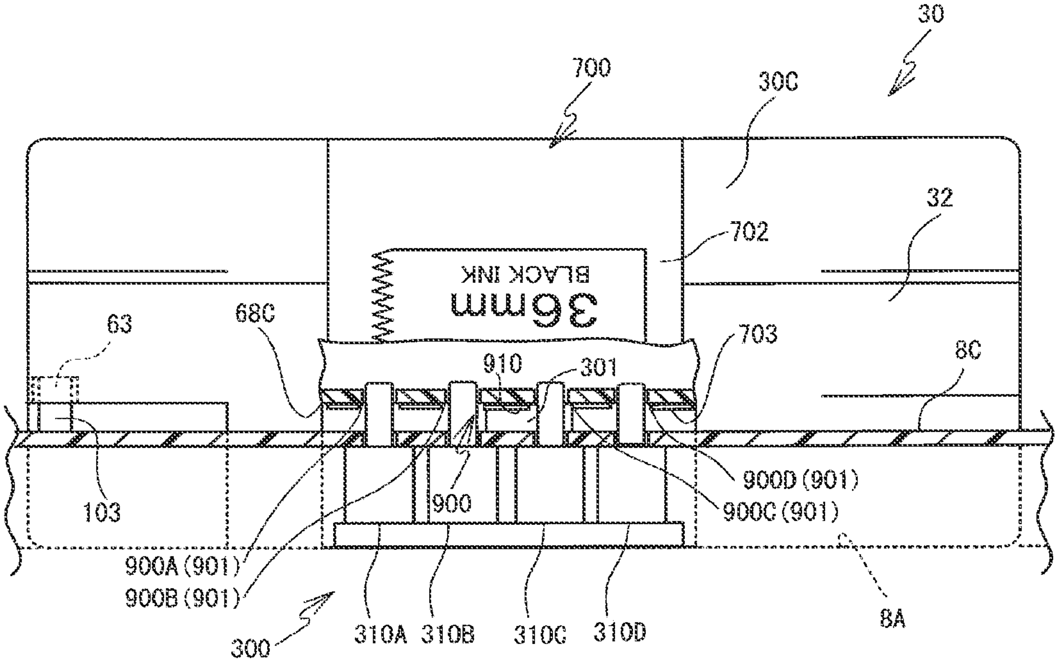
FIG. 24 is a view in which a cross-sectional view along a II-II line shown in FIG. 5 as seen in the direction of the arrows is rotated 180 degrees, when a rear support portion 8C shown in FIG. 7 is opposed to the narrow-width tape cassette 30 shown in FIG. 17.
Figure 26:
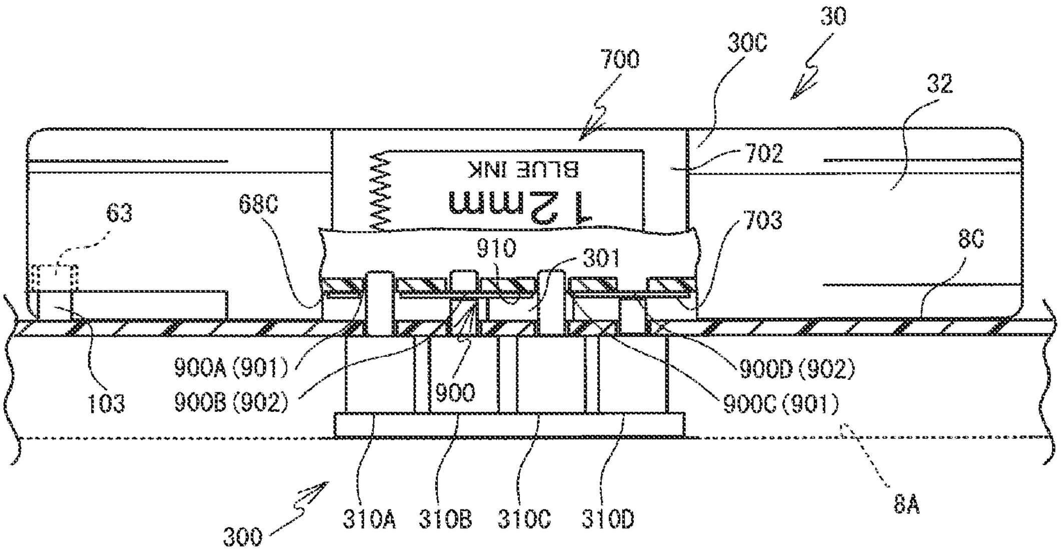
FIG. 26 is a view in which a cross-sectional view along a 12-11 line shown in FIG. 6 as seen in the direction of the arrows is rotated 180 degrees, when the rear support portion 8C, shown in FIG. 7 is opposed to the narrow-width tape cassette 30 shown in FIG. 22.

In addition, the positioning pins 102 and 103 provided on the cassette support portion 8B are inserted into the pin holes 62 and 63 provided on the peripheral portions of the tape cassette 30, and the tape cassette 30 is supported from underneath (refer also to FIG. 24 and FIG. 26).

In such a way, in addition to the above-described head reception portions 39A and 39B, the tape cassette 30 according to the present embodiment includes the rear reception portion 910, that is positioned between the storage areas that respectively house the tape (the double-sided adhesive tape 58, for example) wound on the first tape spool 40 and the tape (the film tape 59, for example) wound on the second tape spool 41, and to the rear of these tape rolls. In other words, the rape cassette 30 has support reception portions in at least two positions that sandwich the tapes having a significant weight.

Consequently, when the tape cassette 30 is being installed as described above, or after the tape cassette 30 has been installed, even if there is a tendency for the tape cassette 30 to tilt toward the rear where it is heavier, the rear reception portion 910 comes into contact with the rear support pin 301 that stands upward from the rear support portion 8C of the tape printer 1 and supports the tape cassette 30. Therefore, positioning in the vertical direction at the rear of the tape cassette 30 may be accurately performed, and also, when the tape cassette 30 is installed in the tape printer 1, a stable installed state of the tape cassette 30 may be maintained.

In addition, as shown in FIG. 3 to FIG. 6, when the tape cassette 30 is installed in the cassette housing portion 8, the cassette hook 75 engages with the latch portion 38. Consequently, after the tape cassette 30 is installed in the tape printer 1, any rising movement of the tape cassette 30, namely, a movement of the tape cassette 30 in the upward direction may be restricted, and tape feeding and printing may be stably performed.

Figure 23:
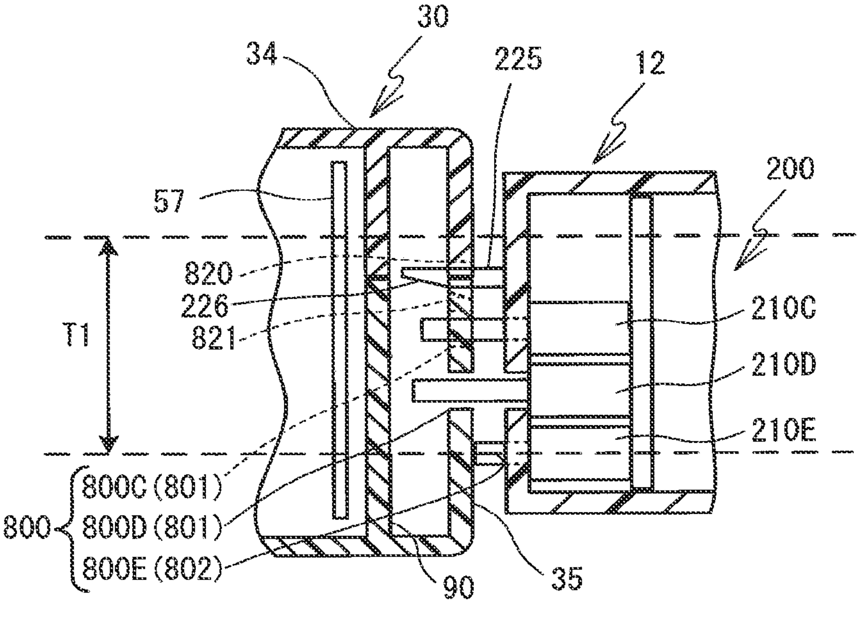
FIG. 23 is a cross-sectional view along a IV-IV line shown in FIG. 14 as seen in the direction of the arrows, when the platen holder 12 shown in FIG. 9 is opposed to the wide-width tape cassette 30 shown in FIG. 14.
Figure 25:
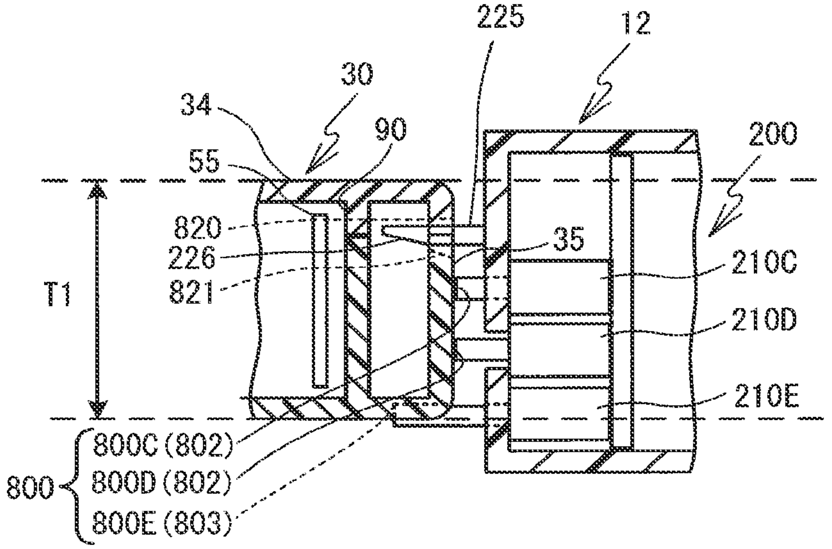
FIG. 25 is a cross-sectional view along a V-V line shown in FIG. 19 as seen in the direction of the arrows, when the platen holder 12 shown in FIG. 9 is opposed to the narrow-width tape cassette 30 shown in FIG. 19.

Next, modes of detecting the tape type of the tape cassette 30 by the tape printer 1 according to the present embodiment will be explained with reference to FIG. 3 to FIG. 6, and FIG. 21 to FIG. 24. FIG. 23 and FIG. 24 show a mode of detecting the tape type of the wide-width tape cassette 30 with the tape width of 36 mm shown in FIG. 13 to FIG. 17. FIG. 25 and FIG. 26 show a mode of detecting the tape type of the narrow-width tape cassette 30 with the tape width of 12 mm shown in FIG. 18 to FIG. 22.

Detection modes of the arm indicator portion 800 by the arm detection portion 200 will be explained with reference to FIG. 3 to FIG. 6 and FIG. 25. When the tape cassette 30 is installed in the cassette housing portion 8 at a proper position by the user and the cassette cover 6 is closed, the platen holder 12 moves from the stand-by position (refer to FIG. 3) to the print position (refer to FIG. 4 to FIG. 6). Then, the arm detection portion 200 and the latching piece 225 provided on the cassette-facing surface 12B of the platen holder 12 move to the positions that respectively oppose the arm indicator portion 800 and the latching hole 820 provided on the arm front surface 35 of the tape cassette 30.

In a case where the tape cassette 30 is installed in the cassette housing portion 8 at the proper position, the latching piece 225 is inserted into the latching hole 820. As a result, the latching piece 225 does not interfere with the tape cassette 30, and the switch terminals 222 of the arm detecting switches 210 that protrude from the cassette-facing surface 12B (refer to FIG. 9) oppose the indicators (the non-pressing portion(s) 801 and the pressing port ion (s) 802) that are provided at the corresponding positions in the arm indicator portion 800, and are selectively pressed. More specifically, the arm detecting switch 210 opposing the non-pressing portion 801 remains in the off state by being inserted into the switch hole that is the non-pressing portion 801. The arm detecting switch 210 opposing the pressing portion 802 is changed to the on state by being pressed by the surface portion of the arm front surface 35 that is the pressing portions 802.

In the case of the arm indicator portion 800 of the wide-width tape cassette 30 shown in FIG. 13 to FIG. 17, the four indicators 800A to 800D (the pressing portion 802, the non-pressing portion 801, the non-pressing portion 801, the non-pressing portion 801) are provided within the range of the common indicator portion 831, and the remaining one indicator 800E (the pressing portion 802) is provided astride the common indicator portion 831 and the extension portion 832 below the common indicator portion 831. As shown in FIG. 23, therefore, of the five arm detecting switches 210A to 210E, the two arm detecting switches 210A and 210E opposing the pressing portions 802 are in the on state, and the three arm detecting switches 210B, 210C, and 210D opposing the non-pressing portions 801 are in the off state.

In the case of the arm indicator portion 800 of the narrow-width tape cassette 30 shown in FIG. 18 to FIG. 22, the four indicators 800A to 800D (the pressing portion 802, the non-pressing portion 801, the pressing portion 802, the pressing portion 802) are provided within the range of the common indicator portion 831, and the escape hole 803 (the indicator 800E) is formed in the lower end part of the common indicator portion 831. As shown in FIG. 25, therefore, of the five arm detecting switches 210A to 210E, the three arm detecting switches 210A, 210C. and 210D opposing the pressing portions 802 are in the on state, and the two arm detecting switches 210B and 210E respectively opposing the non-pressing portion 801 and the escape hole 803 are in the off state.

In the tape printer 1, the print information of the tape cassette 30 is identified based on a detected pattern by the arm detection portion 200, namely, the combination of the on and off states of the five arm detecting switches 210A to 210E, and this will be explained in mote detail later.

In the present embodiment, the head reception portions 39A and 39B, which are used for positioning the tape cassette 30 in the vertical direction when the tape cassette 30 is installed in the tape printer 1, are provided at the positions facing the head insertion portion 39, namely, adjacent to the arm portion 34 on which the arm indicator portion 800 is provided. Therefore, when the tape cassette 30 is installed in the tape printer 1, a positional relationship between the arm detection portion 200 and the arm indicator portion 800 may be accurately maintained, and mistaken detection by the arm detecting switches 210 may be prevented.

Furthermore, in the case of the wide-width tape cassette 30, the indicators) (in FIG. 14, the indicator 800E) may be provided in a predetermined area of the arm front surface 35 that is extended from the common indicator portion 831 in the vertical direction of the tape cassette 30 (namely, the extension portion 832). In such a way the extension portion 832 provided on the arm front surface 35 may be effectively used, and even when the number of tape types that can be detected by the tape printer 1 and the detection patterns are increased, detection accuracy may be maintained. In particular, the print information that is identified based on the arm indicator portion 800 is information necessary for the tape printer 1 to perform correct printing. The number of detection patterns of the print information may be flexibly increased by adding the indicators) to the extension portion 832.

In the case of the narrow-width tape cassette 30, mistaken detection of the tape type may be prevented by providing the escape hole 803 that does not press the arm detecting switch 210 that opposes the extension portion 832 of the wide-width tape cassette 30 (in FIG. 8, the arm detecting switch 210E). By thus making it possible to commonly use both the narrow-width tape cassette 30 and the wide-width tape cassette 30 in the tape printer 1, the number of tape cassettes 30 that can be used by the tape printer 1 may be increased.

Further, as described above, the thickness of the latching piece 225 is reduced toward the leading end of the latching piece 225, due to the inclined portion 226 that is formed on the lower surface of the latching piece 225. The opening width of the latching hole 820 in the vertical direction is increased toward the arm front surface 35, due to the inclined portion 821 formed on the lower wall of the latching hole 820. As a consequence, if the position of the latching piece 225 is slightly misaligned with respect to the latching hole 820 in the downward direction (namely, if the cassette case 31 is slightly raised with respect to the proper position in the cassette housing portion 8), when the platen holder 12 moves toward the print position, the inclined portion 226 and the inclined portion 821 interact with each other to guide the latching piece 225 into the latching hole 820. In such a way, even when the cassette case 31 is slightly raised with respect to the proper position in the cassette housing portion 8, the latching piece 225 may he properly installed into the latching hole 820, and the arm defection portion 200 may be accurately positioned to oppose the arm indicator portion 800.

The latching piece 225 according to the present embodiment is provided on the upstream side of the arm detection portion 200 in the insertion direction of the tape cassette 30, (in other words, above the arm detection portion 200). Therefore, when the tape cassette 30 is inserted, the latching piece 225 opposes the arm front surface 35 in advance of the arm detecting switches 210. In other words, unless the latching piece 225 is inserted into the latching hole 820, the arm detecting switches 210 do not contact with the arm front surface 35. In other words, unless the tape cassette 30 is installed at the proper position, none of the arm detecting switches 210 are not pressed (namely, the arm detecting switches 210 remain in the off state). Thus, the mistaken detection of the tape type may be even more reliably prevented.

The detection modes of the rear indicator portion 900 by the rear detection portion 300 will be explained with reference to FIG. 3 to FIG. 6, FIG. 24 and FIG. 26. When the tape cassette 30 is installed in the cassette housing portion 8 at the proper position by the user, the rear detection portion 300 provided on the rear support portion 8C of the tape printer 1 opposes the rear indicator portion 900 provided in the rear indentation 68C of the tape cassette 30. Then, the switch terminals 322 on the rear detecting switches 310 that protrude from the rear support portion 8C (refer to FIG. 7) oppose the indicators (the non-pressing portion(s) 901 and the pressing portion(s) 902) provided at the corresponding positions in the rear indicator portion 900, and are thus selectively pressed.

More specifically, the rear detecting switch 310 that opposes the non-pressing portion 901 is inserted into the non-pressing portion 901 (the detection hole 600 that is exposed through the hole 703A) and remains in the off state. The rear detecting switch 310 that opposes the pressing portion 902 is pressed by the pressing portion 902 (the detection hole 600 that is covered by the blocking portion 703B) and is changed to the on state.

In the case of the rear indicator portion 900 of the wide-width tape cassette 30 shown in FIG. 13 to FIG. 17, the five indicators 900A to 900B are all formed as the non-pressing portions 901. As a result, as shown in FIG. 24, all of the five rear detecting switches 310A to 310E are inserted through the non-pressing portions 901, respectively, and remain in the off state.

In the case of the rear indicator portion 900 of the narrow-width tape cassette 30 shown in FIG. 18 to FIG. 22, the five indicators 900A to 900E are respectively formed as the non-pressing portion 901, the pressing portion 902, the non-pressing portion 901. the pressing portion 902 and the non-pressing portion 901. As a result, as shown in FIG. 26, of the five rear detecting switches 310A to 310E, the two rear detecting switches 310B and 310D that oppose the pressing portions 902 are changed to the on state, and the three rear detecting switches 310A, 310C, and 310E that oppose the non-pressing portions 901 remain in the off state.

In the tape printer 1, the color information of the tape cassette 30 is identified based on the detection pattern of the rear detection portion 300 (namely, the combination of the on and off states of the five rear detecting switches 310A to 310B) and this will be explained in more detail later.

As described above, in the tape cassette 30 according to the present embodiment, the rear indicator portion 900 is provided adjacent to the rear support portion 910 that is supported by the rear support pin 301. As a consequence, detection of the tape type of the tape cassette 30 may be accurately performed by the rear detection portion 300 in a state in which the tape cassette 30 is correctly positioned in the vertical direction.

Figure 27:
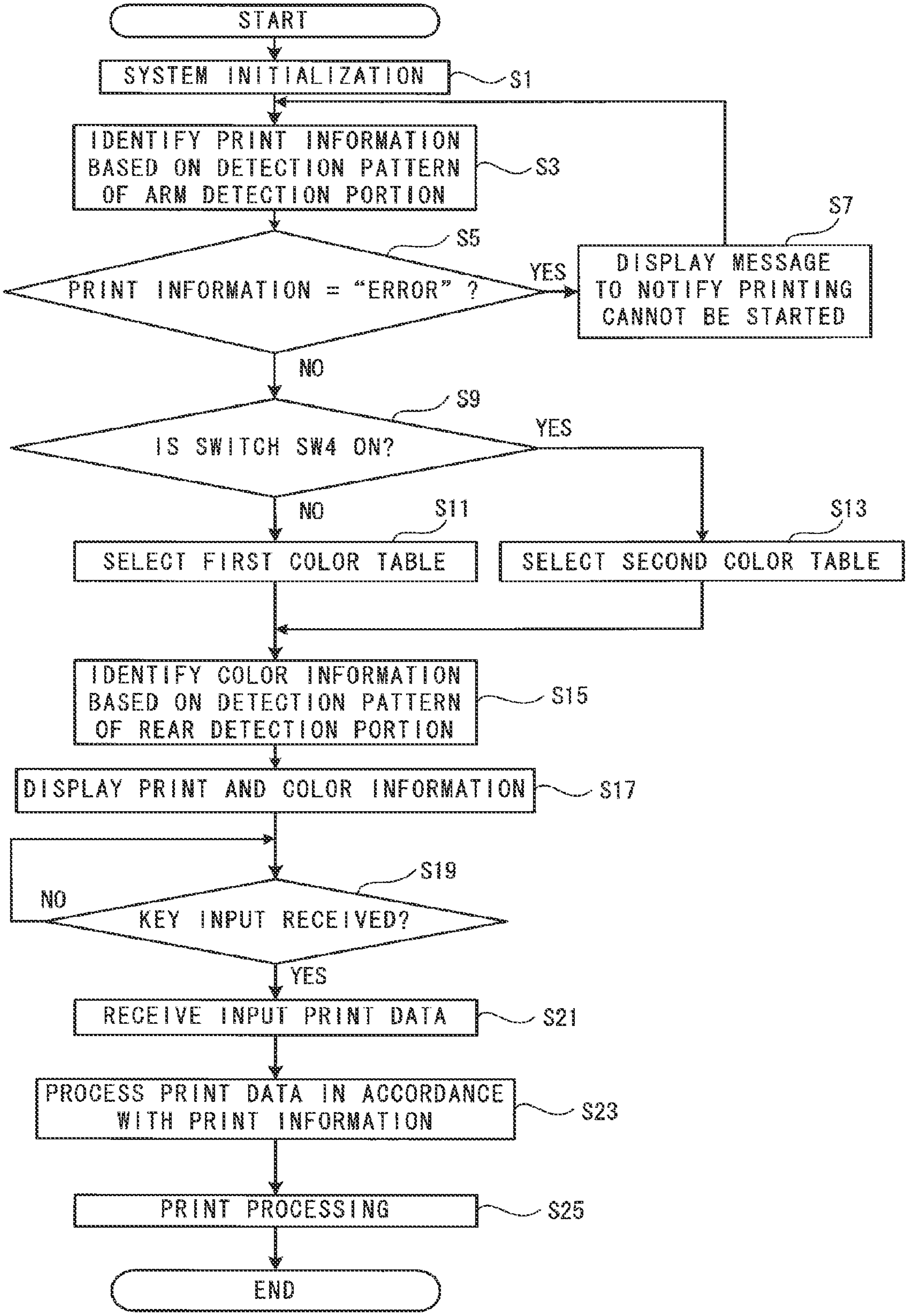
FIG. 27 is a flowchart showing a main processing of the tape printer 1.

Next, main processing of the tape printer 1 according to the present embodiment will be explained with reference to FIG. 27. The main processing shown in FIG. 27 is performed by the CPU 401 according to a program stored in the ROM 402 when the power source of the tape printer 1 is switched on. More specifically, in the tape printer 1, each time an instruction to perform processing relating to printing is input via the keyboard 3 or the like, the CPU 401 performs the main processing. In other words, the main processing described below describes the flow of the processing relating to a single printing operation performed by the tape printer 1.

As shown in FIG. 27, in the main processing, first, system initialization of the tape printer 1 is performed (step S1). For example, in the system initialization performed at step S1, the text memory in the RAM 404 is cleared, a counter is initialized to a default value, and so on.

Next, the print information of the tape cassette 30 is identified based on the detection pattern of the arm detection portion 200 (namely, based on the combination of the on and off states of the arm detecting switches 210) (step S3). As described above, the print information is information essential for the tape printer 1 to perform correct printing. At step S3, with reference to a first identification table 510 stored in the ROM 402, the print information that corresponds to the combination of the on and off states of the arm detecting switches 210 is identified.

As shown in FIG. 28, the print information of the tape cassette 30 is defined in the first identification table 510, corresponding to the combination of the on and off states of the five arm detecting switches 210A to 210E. The print information of the present embodiment indicates the tape width (in the present embodiment, seven sizes from 3.5 mm to 36 mm) and the print mode (the minor image printing mode (laminated) and the normal image printing mode (receptor)) of the tape cassette 30. Additionally, the print information indicates an improper installed state of the tape cassette 30 in which the tape type cannot be correctly identified (namely, an error). In the first identification table 510 shown in FIG. 28, the arm detecting switches 210A to 210E respectively correspond to switches SW1 to SW5, and the off state (OFF) and on state (ON) of the arm detecting switches 210 respectively correspond to the values 0 (zero) and 1 (one).

With the first identification table 510 shown in FIG. 28, a maximum thirty-two sets of print information may be identified, that correspond to a maximum thirty-two detection patterns that is the number of combinations of the on and off states of a total of the five arm detecting switches 210A to 210E. In the example shown in FIG. 28, of the maximum thirty-two detection patterns, print information is set corresponding to each of the twenty-eight detection patterns, and "SPARE" is shown for each of the remaining four detection patterns, indicating a blank field.

Any selected print information may be newly added corresponding to the detection pattern shown as "SPARE". In addition, the print information that is recorded in the first identification table 510 may be deleted, the correspondence between each detection pattern and the print information may be changed, and the content of the print information corresponding to each detection pattern may be changed.

In a case where the wide-width tape cassette 30 shown in FIG. 13 to FIG. 17 is installed in the cassette housing portion 8 at the proper position, the arm detecting switches 210B, 210C, and 210D are in the off state, and the arm detecting switches 210A and 210E are in the on state (refer to FIG. 23). In such a case, the values that indicate the on and off states of the switches SW1 to SW5 corresponding to the arm detecting switches 210A to 210E are identified as 1, 0, 0, 0 and 1, respectively. Therefore, at step S3 in the main processing (refer to FIG. 27), the print information is identified as "tape width of 36 mm and the mirror image printing mode (laminated)", with reference to the first identification table 510.

In a case where the narrow-width tape cassette 30 shown in FIG. 18 to FIG. 22 is installed in the cassette housing portion 8 at the proper position, the arm detecting switches 210B and 210E are in the off state, and the arm detecting switches 210A. 210C, and 210D are in the on state (refer to FIG. 25). In such a case, the values that indicate the on and off states of the switches SW1 to SW5 corresponding to the and detecting switches 210A to 210E are identified as 1, 0, 1, 1 and 0, respectively. Therefore, at step S3 in the main processing (refer to FIG. 27), the print information is identified as "tape width of 12 mm and the normal image printing mode (receptor)", with reference to the first identification table 510.

As described above, when the tape cassette 30 is installed at the proper position, the tape width and the print mode of the tape cassette 30 are identified as the print information at step S3 in the main processing (refer to FIG. 27). On the other hand, when the tape cassette 30 is not installed at the proper position, an error indicating that the tape cassette 30 is not properly installed is identified at step S3. Examples will be given below in which an error is identified as the print information, along with improper installing modes of the tape cassette 30.

Figure 29:
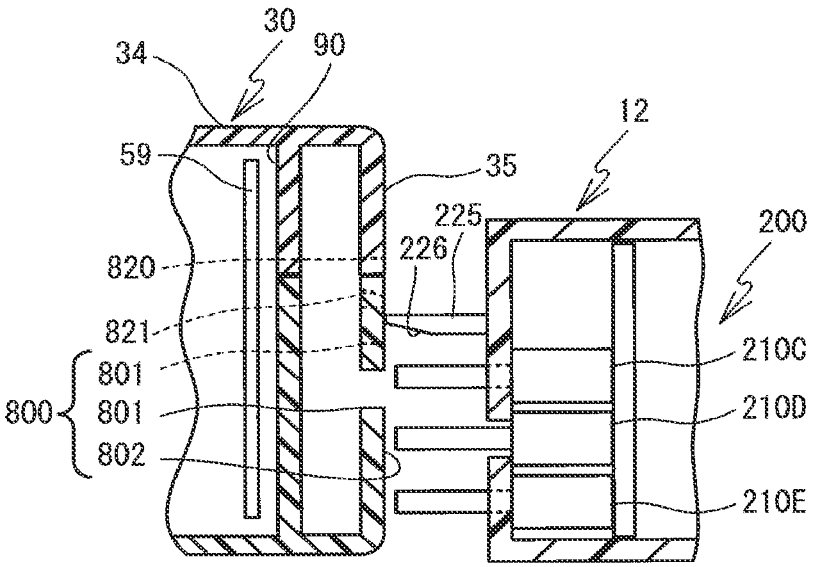
FIG. 29 is a first explanatory diagram showing a state in which the tape cassette 30 is opposed to the platen holder 12 when an error is detected by the tape printer 1.

As shown in FIG. 29, in a case where the tape cassette 30 is not sufficiently pushed in the downward direction, for example, the latching piece 225 is not inserted into the latching hole 820, and comes into contact with the surface portion of the arm front surface 35. As described above, the length of protrusion of the latching piece 225 is substantially the same as or greater than the length of protrusion of the switch terminals 222. As a result, when the latching piece 225 is in contact with the surface portion of the arm front surface 35, none of the switch terminals 222 are in contact with the arm front surface 35 (including the arm indicator portion 800).

As the latching piece 225 thus prevents a contact between the switch terminals 222 and the arm front surface 35, all the arm detecting switches 210A to 210B remain in the off state. Then, the switches SW1 to SW5 that correspond to the arm detecting switches 210A to 210E are identified as 0, 0, 0, 0 and 0, respectively. Consequently, with reference to the first identification table 510, the print information is identified as "ERROR 1" at step S3 in the main processing (refer to FIG. 27).

Figure 30:
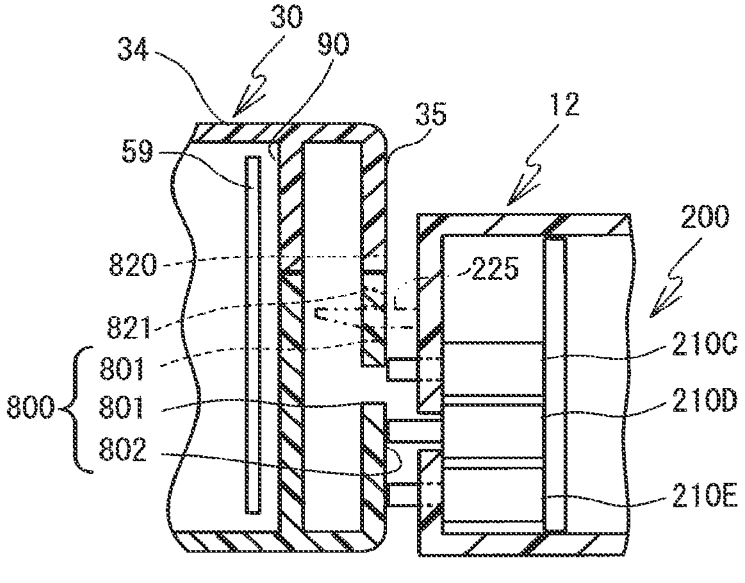
FIG. 30 is a second explanatory diagram showing a state in which the tape cassette 30 is opposed to the platen holder 12 when an error is detected by the tape printer 1.
Figure 31:
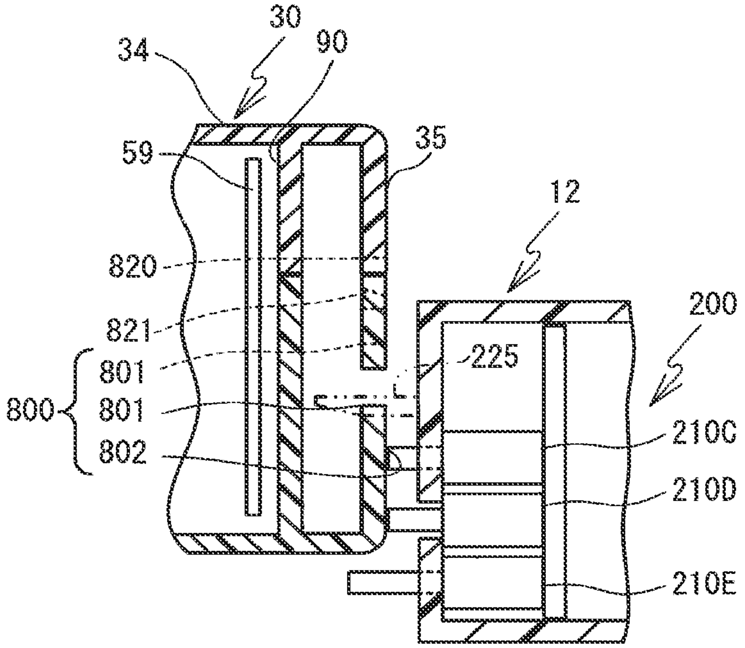
FIG. 31 is a third explanatory diagram showing a state in which the tape cassette 30 is opposed to the platen holder 12 when an error is detected by the tape printer 1.

As shown in FIG. 30 and FIG. 31, in a case where the tape cassette 30 does not have the latching piece 225 (in FIG. 30 and FIG. 31, the latching piece 225 is shown by a dashed-two dotted line), even if the tape cassette 30 is not installed at the proper position, if the arm detecting switches 210 oppose the surface portion of the arm front surface 35, the switch terminals 222 may be pressed (in oilier words, changed to the on state). As described above, the indicators 800A to 800E provided in the arm indicator portion 800 are arranged in a zigzag pattern, and thus none of the indicators 800A to 800E are at the same position in the right-and-left direction. Therefore, in a ease where the tape cassette 30 is misaligned in the vertical direction relative to the proper position in the cassette housing portion 8, an error may be detected in the following modes.

As shown in FIG. 30, in a case where the tape cassette 30 is slightly misaligned in the upward direction relative to the proper position in the cassette housing portion 8, the height position of the lower edge of the arm front surface 35 is below the arm detecting switch 210E that is in the lower row. All the arm detecting switches 210A to 210E therefore oppose the surface portions of the arm front surface 35 and thus all the arm detecting switches 210A to 210E are in the on state. Then, the values that indicate the on and off states of the switches SW1 to SW5 that correspond to the arm detecting switches 210A to 210E are identified as 1,1,1,1 and 1, respectively. Consequently, with reference to the first identification table 510, the print information is identified as "ERROR 3" at step S3 in the main processing (refer to FIG. 27).

As shown in FIG. 31, in a case where the tape cassette 30 is significantly misaligned in the upward direction relative to the proper position in the cassette housing portion 8, the height position of the lower edge of the arm front surface 35 is between the middle row that includes the aim detecting switches 210B and 210D and the lower row that includes the arm defecting switch 210E. The arm detecting switches 210A to 210D therefore oppose the surface portions of the arm front surface 35 and are in the on state, while the arm detecting switch 210E does not oppose the surface portion of the arm front surface 35 and is in the off state. Then, the values that indicate the on and off states of the switches SW1 to SW5 that correspond to the arm detecting switches 210A to 210E are identified as 1, 1, 1, 1 and 0, respectively. Consequently, with reference to the first identification table 510, the print information is identified as "ERROR 2" at step S3 in the main processing (refer to FIG. 27).

As described above, the arm indicator portion 800 according to the present embodiment is formed in a pattern in which at least one of the indicators (the indicators 800A to 800E) is the pressing portion 802, and, at the same time, at least one of the indicators provided within the range of the common indicator portion 831 (the indicators 800A to 800D) is the non-pressing portion 801. In other words, the arrangement patterns of the arm indicator portion 800 do not include a pattern in which all the indicators (the indicators 800A to 800E) are the non-pressing portions 801, nor a pattern in which all the indicators provided within the range of the common indicator portion 831 (the indicators 800A to 800D) are the pressing portions 802.

The reason for not employing the above-desert bed two patterns in the arm indicator portion 800 is that the combination of the on and off states of the arm detecting switches 210A to 210E resulting from the above-described patterns corresponds to any one of the above-described "ERROR 1", "ERROR 2", and "ERROR 3". Therefore, the tape printer 1 according to the present embodiment can detect not only the tape type of the tape cassette 30, but can also detect the installed state of the tape cassette 30 with respect, to the cassette housing portion 8.

As described above, the arm portion 34 is a portion that guides the film tape 59 pulled out from the second tape spool 41 and the ink ribbon 60 pulled out from the ribbon spool 42, causes the film tape 59 and the ink ribbon 60 to be joined at the exit 34A and then discharges them towards the head insertion portion 39 (more specifically, the opening 77). Therefore, the positional relationships in the height direction between the thermal head 10 inserted in the head insertion portion 39, the film tape 59 and the ink ribbon 60 are determined by the arm portion 34.

Therefore, if the tape cassette 30 is not properly installed in the cassette housing portion 8, an error may occur in the positional relationship with the thermal head 10, and printing may be performed at a misaligned position relative to the tape width direction (the height direction) of the film tape 59. This also applies to the print tape 57 and the heat-sensitive paper tape 55.

Considering this situation, in the present embodiment, the arm indicator portion 800 is provided on the arm front surface 35 of the arm portion 34, which is in the vicinity of the head insertion portion 39 into which the thermal head 10 is inserted. Thus, the arm portion 34 (more specifically, the arm front surface 35) forms the basis for easy detection of an error in the positional relationship with the thermal head 10, and, printing accuracy may be improved by determining whether or not the tape cassette 30 is installed in the cassette housing portion 8 at the proper position.

In the main processing (refer to FIG. 27), subsequent to step S3, it is determined whether the print information identified at step S3 is "ERROR" (step S5). If the print information is "ERROR" (yes at step S5), a message is displayed on the display 5 to notify that printing cannot be started (step S7). At step S7, a text message is displayed on the display 5 that reads, for example, "The tape cassette is not properly installed".

After step S7 is performed, the processing returns to step S3. Even when the tape cassette 30 is properly installed in the cassette housing portion 8, if the cassette cover 6 is open, the platen holder 12 is in the stand-by position (refer to FIG. 3). In such a case, the message indicating that printing cannot be started is displayed on the display 5 (step S7).

If the print information is not "ERROR" (no at step S5), it is determined whether the switch SW4, namely, the detecting switch 210D is in the on state (step S9). If the switch SW4 is in the on state (yes at step S9), a second color table 522 is selected from among color tables included in a second identification table 520 (refer to FIG. 32) stored in the ROM 402 (step S13). If the switch SW4 is in the off state (no at step S9), a first color table 521 is selected from among the color tables included in the second identification table 520 stored in the ROM 402 (step S11).

Then, based on the detection pattern of the rear detection portion 300, namely, the combination of the on and off states of the rear detecting switches 310, the color information of the tape cassette 30 is identified (step S15). As described above, the color information is information that indicates the tape color and the character color of the tape cassette 30. At step S15, with reference to the color table selected at step S11 or step S13, the color information corresponding to the combination of the on and off states of the rear detecting switches 310 is identified.

As shown in FIG. 32, in the second identification table 520, the color information of the tape cassette 30 is defined corresponding to the combination of the on and off states of the five rear detecting switches 310A to 310E. In the present embodiment, the color information indicates the tape color (11 patterns) and the character color (4 patterns) of the tape cassette 30. In the second identification table 520 shown in FIG. 32, the rear detecting switches 310A to 310E respectively correspond to switches T1 to T5 and the off state (OFF) and on state (ON) of the rear detecting switches 310 respectively correspond to the values 0 (zero) and 1 (one), The second identification table 520 includes a plurality of color tables to respectively identify different color information (the tape color and the character color) corresponding to the detection patterns of the rear detection portion 300 (the combination of the on and off states of the rear detecting switches 310A to 310E). In the present embodiment, corresponding to the combination of the on and off states of the rear detecting switches 310A to 310E, the second identification table 520 includes the first color table 521 to identify one set of color information, and the second color table 522 to identify another set of color information. In the present embodiment, the same color information is not included in the first color table 521 and the second color table 522, but the same color information may be included in each of the color tables 521 and 522.

As shown in FIG. 32, a maximum of thirty-two sets of color information can be identified in each of the color tables 521 and 522 included in the second identification table 520, corresponding to a maximum of thirty-two detection patterns that are the total number of combinations of the on and off states of the total of five rear detecting switches 310A to 310E. In the present embodiment, in the first color table 521, of the maximum thirty-two detection patterns, color information is set corresponding to each of the thirty-one detection patterns, and a blank field is set for the remaining one detection pattern. In the second color table 522, of the maximum thirty-two detection patterns, color information is set corresponding to each of the eight detection patterns, and blank fields are set for the remaining twenty-four detection patterns.

Any selected color information may be newly added corresponding to any of the blank fields. Further, in each of the color tables 521 and 522, the color information that is recorded may be deleted, the correspondence between each detection pattern and the color information may be changed, and the content of the color information corresponding to each detection pattern may be changed.

In a case where the wide-width tape cassette 30 shown in FIG. 13 to FIG. 17 is installed in the cassette housing portion 8 at the proper position, all the rear detecting switches 310A to 310E are in the off state, as described above (refer to FIG. 24). In such a case, the values that indicate the on and off states of the switches T1 to T5 corresponding to the rear detecting switches 310A to 310E are identified as 0, 0, 0, 0 and 0, respectively.

Furthermore, when the wide-width tape cassette 30 is installed, the value indicating the state of the switch SW4 is identified as 0 at step S3 in the main processing as described above (refer to FIG. 23). Consequently, the first color table 521 is selected from the second identification table 520 (step S11). Thus, at step S15, with reference to the first color table 521, the color information corresponding to the combination of the on and off states of the switches T1 to T5 is identified as "tape color: white; character color: black".

In a case where the narrow-width tape cassette 30 shown in FIG. 18 to FIG. 22 is installed in the cassette housing portion 8 at the proper position, the rear detecting switches 310A, 310C, and 310E are in the off state, and the rear detecting switches 310B and 310D are in the on state, as described above (refer to FIG. 26). In such a case, the values that indicate the on and off states of the switches T1 to T5 corresponding to the rear detecting switches 310A to 310E are identified as 0, 1, 0, 1 and 0, respectively.

In addition, when the narrow-width tape cassette 30 is installed, the value indicating the state of the switch SW4 is identified as 1 at step S3 in the main processing described above (refer to FIG. 25). Consequently, the second color table 522 is selected from the second identification table 520 (step S13). Thus, at step S15, with reference to the second color table 522, the color information corresponding to combination of the on and off states of the switches T1 to T5 is identified as "tape color: gray; character color: blue".

In such a way, in the present embodiment, the color table used to identify the color information of the tape cassette 30 is selected in accordance with the detected state of a specific arm detecting switch 210 (specifically, the on or off state of the arm detecting switch 210D). Therefore, the number of color information patterns that can be identified by the tape printer 1 can be increased without increasing the number of the rear detecting switches 310, in other words, without increasing the area occupied by the rear detection portion 300.

In the main processing (refer to FIG. 27), the print information identified at step S3 and the color information identified at step S15 are displayed on the display 5 as text information (step S17). In a case where the above-described wide-width tape cassette 30 is properly installed, at step S17, a massage, for example, "A 36 mm laminated-type tape cassette has been installed. The tape color is white, and the character color is black," is displayed on the display 5. In a case where the above-described narrow-width tape cassette 30 is properly installed, at step S17, the a message "A 12 mm receptor-type tape cassette has been installed. The tape color is gray, and the character color is blue," for example, is displayed on the display 5.

Next, it is determined whether there is any input from the keyboard 3 (step S19). if there is an input from the keyboard 3 (yes at step S19). the CPU 401 receives the characters input from the keyboard 3 as print data, and stores the print data (text data) in the text memory of the RAM 404 (step S21). If there is no input from the keyboard 3 (no at step S19), the process returns to step S19 and waits for an input from the keyboard 3.

Then, if there is an instruction to start printing from the keyboard 3, the print data stored in the text memory is processed in accordance with the print information identified at step S3 (step S23). For example, at step S23, the print data is processed such that a print range and a print size corresponding to the tape width identified at step S3, and a print position corresponding to the print mode (the mirror image printing mode or the normal image printing mode) identified at step S3 are incorporated. Based on the prim data processed at step S23, print processing is performed on the tape that is the print medium (step S25). After the print processing is performed at step S25, the main processing ends.

The above-described print processing (step S25) will be explained below more specifically. In a case where the laminated type tape cassette 30 shown in FIG. 3 and FIG. 4 is installed in the cassette housing portion 8, the tape drive roller 46, which is driven to rotate via the tape drive shaft 100, pulls out the film tape 59 from the second tape spool 41 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed.

The film tape 59 that has been pulled out from the second tape spool 41 passes the outer edge of the ribbon spool 42 and is fed along the feed path within the arm portion 34. Then, the film tape 59 is discharged from the exit 34A toward the head insertion portion 39 in a state in which the ink ribbon 60 is joined to the surface of the film tape 59. The film tape 59 is then fed between the thermal head 10 and the platen roller 15 of the tape printer 1. Then, characters are printed onto the print surface of the film tape 59 by the thermal head 10.

Following that, the used ink ribbon 60 is separated from the printed film tape 59 at the guide wall 47 and wound onto the ribbon take-up spool 44. Meanwhile, the double-sided adhesive tape 58 is pulled out from the first tape spool 40 by the tape drive roller 46 moving in concert with the movable feed roller 14. While being guided and caught between the tape drive roller 46 and the movable feed roller 14, the double-sided adhesive tape 58 is layered onto and affixed to the print surface of the printed film tape 59. The printed film tape 59 to which the double-sided adhesive tape 58 has been affixed (namely, the printed tape 50) is then fed toward the tape discharge aperture 49 and is cut by the cutting mechanism 17.

In a case where the receptor type tape cassette 30 shown in FIG. 5 is installed, the tape drive roller 46. which is driven to rotate via the tape drive shaft 100, pulls out the print tape 57 from the first tape spool 40 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed.

The print tape 57 that has been pulled out from the first tape spool 40 is bent in the leftward direction in the right front portion of the cassette case 31, and fed along the feed path within the arm portion 34. Then, the print tape 57 is discharged from the exit 34A toward the head insertion portion 39 in a state in which the ink ribbon 60 is joined to the surface of the print tape 57. The print tape 57 is then fed between the thermal head 10 and the platen roller 15 of the tape printer 1. Then, characters are printed onto the print surface of the print tape 57 by the thermal head 10.

Following that, the used ink ribbon 60 is separated from the printed print tape 57 at the guide wall 47 and wound onto the ribbon take-up spool 44. Meanwhile, the printed print tape 57 (in other words, the printed tape 50) is then fed toward the tape discharge aperture 49 and is cut by the cutting mechanism 17.

In a case where the thermal type tape cassette 30 shown in FIG. 6 is installed, the tape feed roller 46, which is driven to rotate via the tape drive shaft 100, pulls out the heat-sensitive paper tape 55 from the first tape spool 40 by moving in concert with the movable feed roller 14. The heat-sensitive paper tape 55 that has been pulled out from the first tape spool 40 is bent in the leftward direction in the right front portion of the cassette case 31, and fed along the feed path within the arm portion 34. Then, the heat-sensitive paper tape 55 is discharged from the exit 34A of the arm portion 34 toward the opening 77 and is then fed between the thermal head 10 and the platen roller 15. Then, characters are printed onto the print surface of the heat-sensitive paper tape 55 by the thermal head 10.

Following that, the printed heat-sensitive paper tape 55 (namely, the printed tape 50) is further fed toward the tape discharge aperture 49 by the tape drive roller 46 moving in concert with the movable feed roller 14, and is cut by the cutting mechanism 17.

When printing is being performed with the thermal type tape cassette 30, the ribbon take-up spool 44 is also driven to rotate via the ribbon take-up shaft 95. However, there is no ribbon spool housed in the thermal type tape cassette 30. For that reason, the ribbon take-up spool 44 does not pull out the unused ink ribbon 60. nor does it wind the used ink ribbon 60. In other words, even when the thermal type tape cassette 30 is used in the tape printer 1 that is equipped with the ribbon take-up shaft 95, the rotation drive of the ribbon take-up shaft 95 does not have an influence on the printing operation of the heat-sensitive paper tape 55 and printing can be correctly performed. In the thermal type tape cassette 30, the ribbon take-up spool 44 may not be provided, and the ribbon take-up shaft 95 may perform idle running inside the support holes 67A and 67B in a similar way.

In the above-described print processing (step S25), in a case where the laminated type tape cassette 30 is installed, mirror image printing is performed. In mirror image printing, the ink of the ink ribbon 60 is transferred onto the film tape 59 such that the characters are shown as a mirror image. In a case where the receptor type tape cassette 30 is installed, normal image printing is performed. In normal image printing, the ink of the ink ribbon 60 is transferred onto the print tape 57 such that the characters are shown as a normal image. In a case where the thermal type tape cassette 30 is installed, thermal type normal printing is performed on the heat-sensitive paper tape 55 such that the characters are shown as a normal image.

In the present embodiment, the "laminated" print mode is applied to the tape cassette 30 with which mirror image printing is performed, while the "receptor" print mode is applied to the tape cassette 30 with which normal image printing is performed. Therefore, the "receptor" print mode is applied not only to the receptor type tape cassette 30 shown in FIG. 5, but also to the thermal type tape cassette 30 shown in FIG. 6.

Through the above-described main processing (refer to FIG. 27), the tape type of the tape cassette 30 installed in the cassette housing portion 8 is identified by the tape printer 1 based on the detection patterns of the arm detection portion 200 and the detection patterns of the rear detection portion 300. More specifically, the arm detecting switches 210A to 210E on the arm detection portion 200 are selectively pressed by the arm indicator portion 800 provided on the arm front surface 35, and the print information of the tape cassette 30 is thus identified. Furthermore, the rear detecting switches 310A to 310E of the rear detection portion 300 are selectively pressed by the rear indicator portion 900 provided on the bottom surface 30B of the tape cassette 30 (more specifically, the rear indentation 68C), and the color information of the tape cassette 30 is thus identified.

In the present embodiment, the indicator portions (the arm indicator portion 800 and the rear indicator portion 900) are provided on the plurality of surfaces of the tape cassette 30, while the detection devices (the arm detection portion 200 and the rear detection portion 300) that detect each of the indicator portions from respective different directions are provided in the tape printer 1. As a result, the following effects may be achieved.

A conventional tape printer has a cassette detection device that includes a plurality of detecting switches that protrude from underneath toward the bottom surface of the tape cassette. The detecting switches are concentrated at a location in a specified area such that the cassette detection device does not have a negative impact on the print mechanism and the feed mechanism and so on. In a case where there is a large number of tape types and the patterns to be detected from the tape cassette, a large number of detecting switches in the cassette detection device may be required. In such a case, the specified area in the cassette housing that is occupied by the cassette detection device may become large, resulting in restrictions on the design of the cassette detection device, and an increase in the size of the tape printer.

Further, a conventional tape cassette has a cassette indicator portion that includes a plurality of indicators corresponding to the above-described plurality of detecting switches. The indicators are concentrated at a location in a specified area on the bottom surface of the cassette case such that the indicators do not have a negative impact on a storage area of the print tape and the feed paths and so on. In a case where there is a large number of tape types and the patterns to be detected from the tape cassette, the specified area on the bottom surface of the cassette case that is occupied by the cassette indicator portion becomes large with the increase in the number of the detecting switches. As a result, there may be restrictions on the design of the cassette indicator portion, and an increase in the size of the tape cassette.

In contrast, in the tape printer 1 according to the present embodiment, the cassette detection devices (the arm detection portion 200 and the rear detection portion 300) are dispersed at different locations in a plurality of directions, and thus the individual cassette detection devices may be unitized and compactly designed. Therefore, the degree of freedom in the design of the cassette detection devices may be improved, and even if the number of tape types and the patterns increases, an increase in the size of the tape printer 1 may be inhibited.

Moreover, with the tape cassette 30 according to the present embodiment, the cassette indicator portions (the arm indicator portion 800 and the rear indicator portion 900) are dispersed at different locations on a plurality of surfaces of the cassette case 31, and thus the individual cassette indicator portions may be made smaller. Therefore, the cassette indicator portions may be freely and efficiently formed, and even if the number of tape types and the patterns increases, an increase in the size of the tape cassette 30 may be inhibited.

In addition, in the present embodiment, the cassette detection devices (the arm detection portion 200 and the rear detection portion 300) each detect different elements of the tape type (print information and color information), based on the cassette indicator portions (the arm indicator portion 800 and the rear indicator portion 900) that respectively oppose the cassette detection devices. In other words, as the cassette detection portions can each detect the different elements of the tape type, the tape printer 1 may selectively identify only the necessary element among the elements of the tape type.

The tape printer 1 according to the present embodiment may perform the correct printing operation if the tape printer 1 identifies the print information of the tape cassette 30. Therefore, by providing only the arm defection portion 200 that detects the print information indicated by the arm indicator portion 800, costs may be reduced and the inexpensive tape printer 1 may be offered. On the other hand, by providing both the arm detection portion 200 and the rear detection portion 300, the high function tape printer 1 may be offered that identifies not only the print information, but also the color information from the tape cassette 30, as described above.

The tape cassette 30 according to the present embodiment is configured such that the tape cassette 30 not only enables the tape printer 1 to identify the print information indicated by the arm indicator portion 800, but also enables a person to visually check the arm indicator portion 800 and identify the print information of the tape cassette 30. Methods of identifying the print information by a visual check of the arm indicator portion 800 and the effects will be explained below, with reference to FIG. 2, FIG. 13, FIG. 14, FIG. 18, FIG. 19 and FIG. 28.

In the present embodiment, the tape cassette 30 is configured such that the tape printer 1 can defect different elements of the tape type in accordance with predetermined rules, based on the detection patterns of the arm defection portion 200 (the combination of the on and off states of the arm detecting switches 210). Table 1 to Table 3 below show the elements of the tape type that can be detected by the arm detecting switches 210A to 210E according to the present embodiment.

TABLE-US-00001 TABLE 1 Tape Width SW1 SW2 SW5 3.5 mm 1 1 0 6 mm 0 0 0 9 mm 0 1 0 12 mm 1 0 0 18 mm 0 0 1 24 mm 0 1 1 36 mm 1 0 1

TABLE-US-00002 TABLE 2 Print Mode SW3 Receptor (normal image printing mode) 1 Laminated (mirror image printing mode) 0

TABLE-US-00003 TABLE 3 Color table Selection SW4 First color table 0 Second color table 1

As shown in Table 1, the tape width or the print information is identified at the step S3 in the main processing (refer to FIG. 27) based on the combination of the on and off states of the switches SW1 (the arm detection switch 210A). SW2 (the arm detection switch 210B) and SW5 (the arm detection switch 210E), with reference to the first identification table 510 shown in FIG. 28. In other words, the tape printer 1 is configured such that the tape printer 1 can identify the tape width based on the on and off states of the switches SW1 SW2 and SW5 only, regardless of the on or off states of the other switches SW3 and SW4 and of the rear detection portion 300 (the rear detecting switches 310A to 310E). Therefore, a person can identify the tape width of the tape cassette 30 simply by visually checking the indicators 800A, 800B and 800E in the arm indicator portion 800 that correspond to the switches SW1 SW2 and SW5.

More specifically, the indicators 800A, 800B and 800E that indicate the tape width of the tape cassette 30 are arranged on the arm indicator portion 800 in accordance with predetermined rules. As shown in FIG. 13, FIG. 14, FIG. 18 and FIG. 19, the indicators 800A to 800E are arranged in three rows in the vertical direction in the arm indicator portion 800. More specifically, as seen in order from the downstream side in the tape feed direction, the indicators 800A and 800C are in the upper row, the indicators 800B and 800D are in the middle row, and the indicator 800E is in the lower row. Among these, the indicators 800A, 800B and 800B are the indicators that are provided furthest to the downstream side in the tape feed direction in the upper row, the middle row and the lower row, respectively. In other words, the indicators 800A, 800B, and 800E are closest in each of the rows, respectively, to the opening 77.

Among all the indicators 800A to 800E, the indicator 800E is furthest to the opening 77. As shown in Table 1, if the tape width is equal to or greater than the predetermined width (18 mm), the switch SW5 is in the on state, and so the indicator 800E is not a switch hole. In other words, the indicator 800E is formed as the pressing portion 802. On the other hand, if the tape width is less than the predetermined width (18 mm), the switch SW5 is in the off state. In other words, the indicator 800E is formed as the escape hole 803. Therefore, simply by visually checking whether or not the escape hole 803 is provided at the lower edge of the arm front surface 35, a person can identify whether the indicator 800E is either the pressing portion 802 or the escape hole 803, namely, whether the switch SW5 is to be in the on state or in the off state.

Expressed differently, the person may identify whether or not the tape width is equal to or more than the predetermined tape width (18 mm) by checking the presence or absence of the escape hole 803. In addition to this, if the person knows in advance the general height positions of the respective rows in which the indicators 800A and 800B are provided, simply by visually checking whether or not a switch hole is formed in the vicinity of the opening 77 of the arm front surface 35, the person can identify whether each of the indicators 800A and 800B is the non-pressing portion 801 and the pressing portion 802, (namely, whether each of the switch SW1 and the switch SW2 is to be in the on state or in the off state).

As shown in Table 1, regardless of whether the tape width is equal to or greater than the predetermined width, or is less than the predetermined width, the relationship between the relative sizes of the tape width can be identified by the combination of the non-pressing portion 801 and the pressing portion 802 with respect to the indicators 800A and 800B.

Specifically, if the indicators 800A and 800B are both the pressing portions 802 that do not have a hole, namely, both the switch SW1 and the switch SW2 are to be in the on state, this indicates the smallest tape width (in the example shown in Table 1, 3.5 mm) among all the tape widths. If the indicators 800A and 800B are both the non-pressing portions 801, (namely, both the switch SW1 and the switch SW2 are to be in the off state), within both the tape width ranges (equal to or greater than the predetermined width, and less than the predetermined width), this indicates a tape width that is larger than the tape width indicated by the indicators 800A and 800B being both the pressing portions 802 (in the example of Table 1, 6 mm or 18 mm).

If the indicator 800A is the non-pressing portion 801 and the indicator 800B is the pressing portion 802 (namely, the switch SW1 is to be in the off state and the switch SW2 is to be in the on state), within both the tape width ranges (equal to or greater than the predetermined width, and less than the predetermined width), this indicates a tape width that is larger than the tape width indicated by the indicators 800A and 800B being both the non-pressing portions 801 (in the example of Table 1, 9 mm or 24 mm). If the indicator 800A is the pressing portion 802 and the indicator 800B is the non-pressing portion 801 (namely, the switch SW1 is to be in the on state and the switch SW2 is to be in the off state), this indicates a tape width that is larger than the tape width indicated by the indicator 800A being the non-pressing portion 801 and the indicator 800B being the pressing portion 802. In other words, this indicates the largest tape width within both the tape width ranges (equal to or greater than the predetermined width, and less than the predetermined width) (in the example of Table 1, 12 mm or 36 mm).

The first identification table 510 according to the present embodiment does not include the arrangement pattern in which both the indicators 800A and 800B in the arm indicator portion 800 are the pressing portions 802 when the tape width of the tape cassette 30 is equal to or greater than 18 mm. Therefore, as a combination of the indicators 800A and 8008 to indicate any tape width that is equal to or greater than 18 mm, an arrangement pattern in which both the indicators 800A and 800B are the pressing portions 802 can also be included in the first identification table 510. For example, as an arrangement pattern to indicate a tape width between the 12 mm tape width and the 18 mm tape width (15 mm, for example), the arrangement pattern may be set such that both the indicators 800A and 800B are the pressing portions 802.

As described above, because the arm indicator portion 800 is configured in accordance with predetermined rules, a person can easily determine whether the tape width is equal to or greater than the predetermined width, or is less than the predetermined width by visually checking the indicator 800E. Moreover, the person can easily identify the tape width more specifically by visually checking the indicators 800A and 800B.

The above-described examples are explained based on the premise that the tape printer 1 can use both the wide-width tape cassette 30 and the narrow-width tape cassette 30. in a case where the tape printer 1 is a dedicated device that only uses the narrow-width tape cassette 30, the switch SW5 (the arm detecting switch 210E) opposing the extension portion 832 of the wide-width tape cassette 30 may not be necessary. Therefore, in the dedicated device tape printer 1 that uses only the narrow-width tape cassette 30, the tape width may be identified based on the on and off states of the switches SW1 and SW2, Meanwhile, the narrow-width tape cassette 30 that is only used in the dedicated device tape printer 1 may not need the escape hole 803. In such a case, a person may identify the tape width of the narrow-width tape cassette 30 by visually checking the two indicators in the vicinity of the opening 77 (namely, the indicators 800A and 800B). In other words, for the tape width of the tape cassette 30 to be identified by visual checking, the arm indicator portion 800 may include at least two indicators in the vicinity of the opening 77.

As shown in Table 2, the print mode of the print information is identified at step S3 in the main processing (refer to FIG. 27) based on the on or off state of the switch SW3 (the arm detecting switch 210C) with reference to the first identification table 510 shown in FIG. 28. In other words, the tape printer 1 is configured such that the tape printer 1 can identify the print mode based on the on or off state of the switch SW3 only, regardless of the on or off states of the other switches SW1, SW2, SW4 and SW5, and the rear detection portion 300 (the rear detecting switches 310A to 310F). Therefore, a person can also identify the print mode of the tape cassette 30 simply by visually checking the indicator 800C in the arm indicator portion 800.

More specifically, the indicator 800C that indicates the print mode of the tape cassette 30 is provided in the arm indicator portion 800 in accordance with predetermined rules. As shown in FIG. 13, FIG. 14. FIG. 18 and FIG. 19, the indicator 800C is furthest on the upstream side in the tape feed direction in the upper row in the arm indicator portion 800. Further, among all the indicators 800A to 800E, the indicator 800C is closest to the latching hole 820. Therefore, a person can identify whether the indicator 800C is the non-pressing portion 801 or the pressing portion 802 (namely, whether the switch SW3 is to be in the on state or in the off state) simply by visually checking whether or not a switch hole is formed at a position close to the latching hole 820.

If the print mode is “receptor” (normal image printing), the switch SW3 is to be in the on state, as shown in Table 2. Therefore, the indicator 800C does not have a switch hole. In other words, the indicator 800C is formed as the pressing portion 802. On the other hand, if the print mode is “laminated” (the mirror image printing mode), the switch SW3 is to be in the off state, and the indicator 800C has a switch hole. In other words, the indicator 800C is formed as the non-pressing portion 801.

Therefore, a person can identify the print mode as either “laminated” (the mirror image printing mode) or “receptor” (the normal image printing mode) simply by visually checking whether or not the switch hole is farmed close to the latching hole 820 (namely, the indicator 800C). As described above, the “receptor” print mode (the normal image printing mode) includes all types of printing except for mirror image printing, such as a type of printing in which the ink from the ink ribbon is transferred to the tape as the print medium, and a type of printing in which a heat-sensitive tape is color developed without use of an ink ribbon.

As shown in Table 3, the color table selection is identified at the step S3 in the main processing (refer to FIG. 27) based on the on or off state of the switch SW4 (the arm detecting switch 210D), with reference to the first identification table 510 shown in FIG. 28. In other words, the tape printer 1 is configured such that the tape printer 1 can select the color table based on the on or off state of the switch SW4 only, regardless of the on or off states of the other switches SW1 to SW3 and SW5 and the rear detection portion 300 (the rear detecting switches 310A to 310E). Therefore, a person can also identify which color table is to be used simply by visually checking the indicator 800D corresponding to the switch SW4 on the arm indicator portion 800.

As shown in Table 3, if the first color table 521 is to be used, the switch SW4 is to be in the off state, and the indicator 800D is a switch hole. In other words, the indicator 800D is formed as the non-pressing portion 801. On the other hand, if the second color table 522 is to be used, the switch SW4 is to be in the on state, and the indicator 800D is not a switch hole. In other words, the indicator 800D is formed as the pressing portion 802. As described above, in the main processing according to the present embodiment (refer to FIG. 27), either the first color table 521 or the second color table 522 is selected, based on the on or off state of the switch SW4 (step S9 to step S13).

The color table selection identified by the switch SW4 may be necessary information for the tape printer 1 to identify the color information of the tape cassette 30. However, the color information is not always necessary for the tape printer 1 to perform correct printing. Therefore, it may not be necessary for a person to identify the color table to be used by visually checking the indicator 800D. On the other hand, by identifying the color table selection based on the on or off state of the arm detecting switch 210D, the structure of the rear detection portion 300 (the rear detecting switches 310A to 310E) may be simplified, as described above, and the number of detectable color information patterns may also be increased.

As described above, based the detection results of each of the arm detecting switches 210, the tape printer 1 is able to identify different tape type elements in accordance with the predetermined rules. Consequently, the processing to identify individual elements included in the tape type may be simplified.

Furthermore, in the conventional tape printer, random combinations of on and off states of a plurality of detecting switches are associated with respective tape types. Therefore, if mistaken detection is made by one of the detecting switches, all the elements of the tape type may be mistakenly identified. In contrast, in the present embodiment, the tape type element to be identified based on the detection results of each of the arm detecting switches 210 is set in advance. As a result, if mistaken detection is made by one of the arm detecting switches 210, the element corresponding to that arm detecting switch 210 may be mistakenly identified, but the elements corresponding to the other arm detecting switches 210 may be correctly identified. Consequently, even when mistaken detection is made by some of the arm detecting switches 210, errors in identifying the tape type by the tape printer 1 may be kept to a minimum.

In the present embodiment, the tape printer 1 is configured such that the cassette detection devices (the arm detection portion 200 and the rear detection portion 300) each detect the different tape type elements. Therefore, if one of the tape type elements (print information and color information) of the tape cassette 30 is the same but the other elements are different for each of the tape cassettes 30, the cassette indicator portion (the arm indicator portion 800 or the rear indicator portion 900) that indicates the same element has a combination of holes arranged in the same pattern in each of the tape cassettes 30. Moreover, in the arm indicator portion 800, if a part of the print information is different in accordance with the predetermined rules, the presence or absence of a hole is different only for the indicator corresponding to that part.

Figure 33:
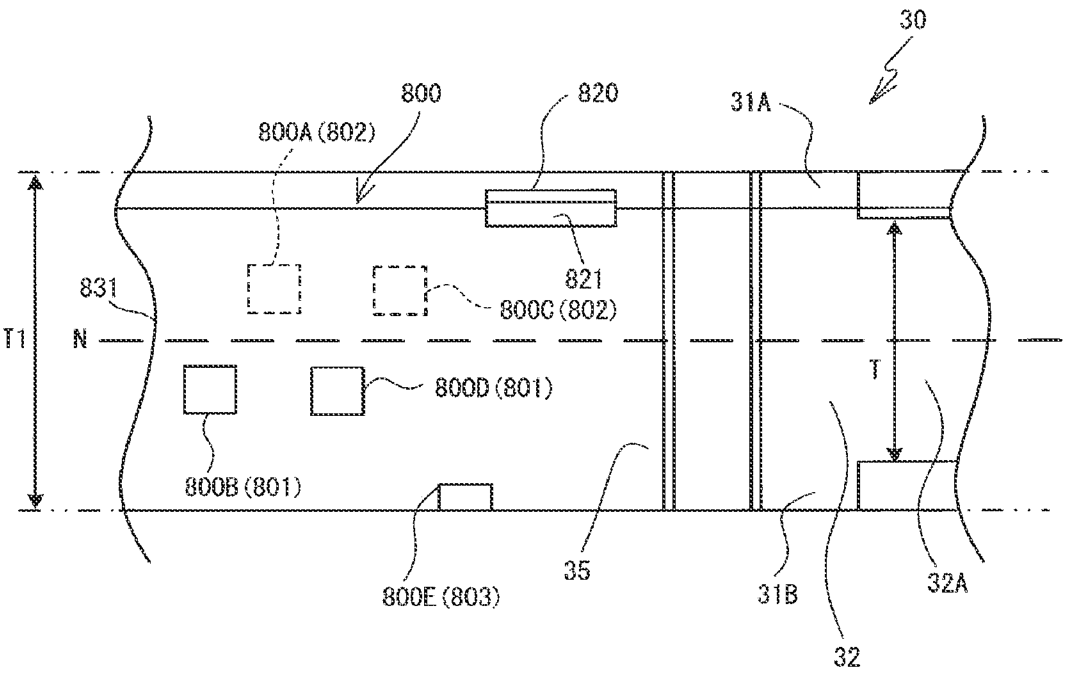
FIG. 33 is an enlarged front view of the arm front surface 35 of another of the narrow-width tape cassette 30.

For example, the tape cassette 30 shown in FIG. 33 is the thermal type tape cassette 30 (refer to FIG. 6) that houses the heat-sensitive paper tape 55 of which the backing material color is orange, the character color is black, and the tape width is 12 mm. As described above, normal image printing is performed with the thermal type tape cassette 30, and therefore the print mode is the same as for the receptor type tape cassette 30 (refer to FIG. 5). In other words, the tape cassette 30 shown in FIG. 33 matches the receptor type narrow-width tape cassette 30 shown in FIG. 18 to FIG. 22 in terms of the print information (tape width; 12 mm; print mode: receptor).

Therefore, in the arm indicator portion 800 shown in FIG. 33, the indicators 800A to 800C and 800E are formed as the pressing portion 802, the non-pressing portion 801, the pressing portion 802 and the escape hole 803, respectively, in the same way as in FIG. 19. However, in the tape cassette 30 shown in FIG. 33, the indicator 800D is formed as the non-pressing portion 801 so that the first, color table 521 is selected when the color information is identified by the tape printer 1.

If the tape cassette 30 shown in FIG. 33 is properly installed in the cassette housing portion 8, the values indicating the on and off states of the switches SW1 to SW5 that correspond to the arm detecting switches 210A to 210E, respectively, are identified as 1, 0, 1, 0 and 0, respectively. Thus, with reference to the first identification table 510, the print information is identified as "tape width: 12 mm; normal image printing mode (receptor)," at step S3 in the main processing. Furthermore, by visually checking the arm indicator portion 800 shown in FIG. 33, a person can identify the print information as "tape width: 12 mm; normal image printing (receptor)," as with as the arm indicator portion 800 shown in FIG. 19.

Figure 34:
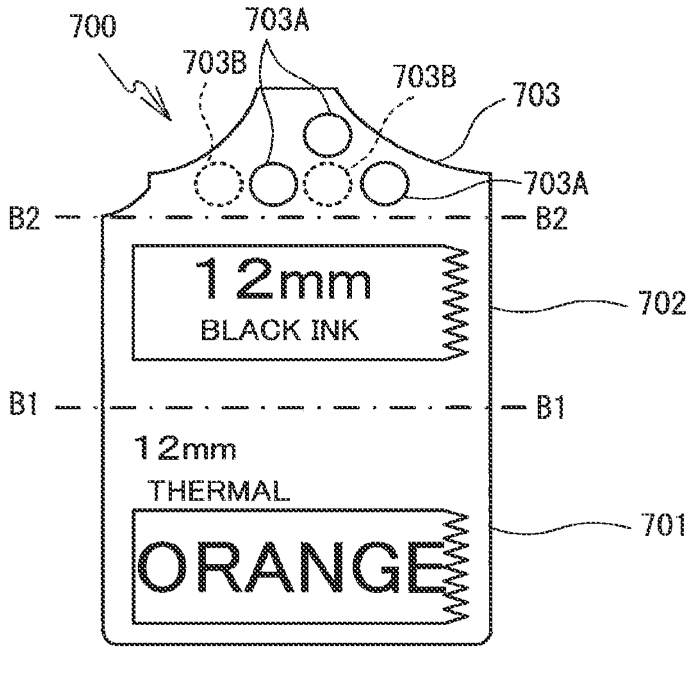
FIG. 34 is a plan view of the label sheet 700 to be used on the other narrow-width tape cassette 30.

The label sheet 700 shown in FIG. 34 is an example of the label sheet 700 that is to be affixed to the tape cassette 30 shown in FIG. 33. Therefore, the first notation portion 701 shows the notation "12 mm" for the tape width, "ORANGE" for the tape color, and "THERMAL" for the print mode. The second notation portion 702 shows the notation "12 mm" for the tape width and "BLACK" for the character color. As a result, with the tape cassette 30 to which the label sheet 700 described here is affixed, the above-described tape type can be identified by visually checking the notification portions 701 and 702.

In addition, the detection setting portion 703 of the label sheet 700 shown in FIG. 34 has three holes 703A and two blocking portions 703B, which is the same arrangement pattern as the detection setting portion 703 of the label sheet 700 shown in FIG. 20. As a result, on the tape cassette 30 to which the label sheet 700 described here is affixed, in the same way as FIG. 22, three of the detection holes 600 are each exposed through the holes 703A such that the switch terminals 322 can be inserted or removed, and two of the detection holes 600 are each covered by the blocking portions 703B such that the switch terminals 322 cannot be inserted.

If the tape cassette 30 shown in FIG. 33 is properly installed in the cassette housing portion 8, the values indicating the on and off states of the switches T1 to T5 that correspond to the rear detecting switches 310A to 310E, respectively, are identified as 0, 1, 0, 1 and 0, respectively (refer to FIG. 26). Because the switch SW4 that corresponds to the arm detecting switch 210D is identified as 0, the tape color is identified as orange and the character color is identified as black at step S15 in the main processing (refer to FIG. 27), with reference to the first color table 521.

As described above, the tape cassette 30 according to the present embodiment is configured such that a person can identify the print information of the tape cassette 30 by visually checking the arm indicator portion 800. As a result, the following effects may be achieved.

In a conventional manufacturing method for tape cassettes, it is a general practice to house a tape as a print medium in a cassette case having the height (so-called case size) corresponding to of the print tape. In contrast to this, a tape cassette manufacturing method is proposed in which the tapes with differing tape widths are respectively housed in cassette cases with the same height (the same case size). With this type of tape cassette manufacturing method that uses a common case size, the following benefits may be expected.

First, conventionally, when transporting cassette cases of different case sizes corresponding to different tape widths from a parts manufacturing plant to an assembly plant, cassette cases are transported in different transportation containers each prepared for each of the case sizes. In contrast, by using a common case size, common transportation containers can be used when transporting the cassette cases from the parts manufacturing plant to the assembly plant. Consequently, transportation costs for the cassette cases may be reduced.

Second, if the case size is different for each tape width, when products are shipped from the assembly plant, it is necessary to use different package boxes each prepared for each case size. In contrast, by using a common case size, common package boxes can be used and a common packaging format can also be used when shipping the products. Consequently, packaging cost may also be reduced.

Third, if an ink ribbon with the same width is used for a tape with a narrow tape width, the width of the ink ribbon itself (the ribbon width) is narrow. In such a case, the ink ribbon may get cut during the printing operation. In contrast, by using a common case size that can maintain a ribbon width with an adequate strength, even if the width of the tape is narrow, the ink ribbon may be prevented from getting cut during the printing operation.

On the other hand, in the manufacture of the tape cassettes, if tapes with different tape widths are respectively mounted in the common size cassette cases, a tape with the a wrong tape width may be housed in the cassette case. For example, a worker may mistakenly mount a tape with a 6 mm or a 9 mm width in the cassette case intended to house a 12 mm tape. This may happen because the common size cassette case capable of housing the 12 mm tape has a rib height that allows housing a tape with a less than 12 mm width.

Furthermore, as described above, the print modes of the tape cassette include the so-called receptor type, with which normal image printing is performed directly onto the print tape, and the laminated type, with which, after mirror image printing is performed on a transparent tape, a double-sided adhesive tape is affixed to the print surface. The common size cassette cases have the same external appearance, and therefore, a wrong tape may be mounted in the cassette case in the wrong print mode. For example, a worker may mount a wrong tape in the cassette case to assemble the receptor type tape cassette, when the cassette case is intended for the laminated type tape cassette.

With the tape cassette 30 according to the present embodiment, however, a person can identify the print information of the tape cassette 30 simply by visually checking the arm indicator portion 800. In other words, the worker can ascertain the tape width of the tape that should be mounted in the cassette case 31, and the print mode that is intended for the cassette case 31. As a consequence, in the manufacturing process of the tape cassette 30, the worker can work while confirming the contents to be housed in the cassette case 31, and thus errors in the manufacture of the tape cassette 30 may be reduced.

Furthermore, when the tape cassette 30 is shipped from the plant, an inspector can verify whether the contents housed in the cassette case 31 are correct by simply visually checking the arm indicator portion 800. and therefore product inspection can be performed on the tape cassette 30. More specifically, the inspector can verify whether the tape exposed at the opening 77 of the manufactured tape cassette 30 matches the print information (namely, the tape width and the print mode) that can be identified from the arm indicator portion 800.

In particular, the arm indicator portion 800 according to the present embodiment is provided on the arm front surface 35 that is in the vicinity of the opening 77 at which the tape is exposed. Moreover, the arm front surface 35 is a portion that can be seen from the same direction as the tape that is exposed at the opening 77 (more specifically, from the front, of the tape cassette 30). In other words, the arm indicator portion 800 and the tape are in adjacent, positions and can be seen from the same direction, and thus the inspector can inspect the tape while verifying the arm indicator portion 800. As a consequence, working efficiency in the product inspection of the tape cassette 30 may be improved.

In addition, the arm indicator portion 800 has a simple structure formed of a combination of the presence or absence of switch holes (namely, a combination of the non-pressing portion(s) 801 and the pressing portion(s) 802). Therefore, the arm indicator portion 800 may be easily formed on the cassette case 31 in advance. Consequently, at the time of manufacture of the cassette case 31, there may be no need to print contents to be housed in each of the cassette cave 31, nor to affix labels to indicate the contents, and therefore errors in the manufacture of the tape cassette 30 can be reduced at a low cost.

In the manufacturing process of the tape cassette 30, the label sheet 700 corresponding to the contents to be housed in the cassette case 31 is affixed to the label affixing portion 68. At that time, the worker can first check the print information (the tape width and the print mode) indicated by the arm indicator portion 800, and can then affix the label sheet 700 of which the notation portions 701 and 702 indicate contents that match the print information onto the label affixing portion 68. Therefore, errors may be prevented when the worker affixes the label sheet 700.

In addition, when the label sheet 700 is affixed to the label affixing portion 68, the rear indicator portion 900 (the indicators 900A to 900E) is formed by the detection setting portion 703, such that the combination of the non-pressing portion(s) 901 and the pressing portion(s) 902 correspond to the color information (the tape color and the character color) according to the contents housed in the cassette case 31. As a result, defects may be prevented in which the actual color information of the tape cassette 30 does not match the detection pattern based on the rear indicator portion 900.

In the present embodiment, the arrangement pattern of the rear indicator portion 900 (the indicators 900A to 900E) can be changed by affixing the label sheet 700. Therefore, at the time of manufacture of the cassette case 31, the same number of detection holes 600 as the number of the rear detecting switches 310 may be formed uniformly, at positions opposing the respective rear detecting switches 310. As a result, the common cassette cases 31 may be further utilized, and the tape cassette 30 manufacturing costs may be reduced.

Moreover, in the present embodiment, the laminated type tape cassette 30 formed from the general purpose cassette is used in the general purpose tape printer 1, Therefore, a single tape printer 1 can be used with each type of the tape cassette 30, such as the thermal type, the receptor type, and the laminated type etc., and it may not be necessary to use the different tape printer 1 for each type. Furthermore, the tape cassette 30 is normally formed by injecting plastic into a plurality of combined dies. In the case of the tape cassette 30 that corresponds to the same tape width, common dies can be used, except for the die including the portion that forms the and indicator portion 800. Thus, costs may be significantly reduced.

In the present embodiment, as the arm indicator portion 800 is provided on the arm front surface 35 of the cassette case 31, the length of the arm indicator portion 800 in the vertical direction (namely, the height) is limited by the height of the cassette case 31. Therefore, when the height of the arm indicator portion 800 is small, if the switch holes (namely, the non-pressing portions 801) that maintain the arm detecting switches 210 in the off state are aligned in the vertical direction, the distance between the switch holes is small. In such a case, the strength of the cassette case 31 may be decreased. Thus, when the worker or the user holds or presses the arm portion 34 of the tape cassette 30, the arm front surface 35 of the cassette case 31 may be damaged.

To resolve this, in the arm indicator portion 800 according to the present embodiment, the switch holes (namely, the non-pressing portions 801) that maintain the arm detecting switches 210 in the off state are not aligned in the vertical direction, but the indicators 800A to 800E are each arranged at different positions in the right-and-left direction. Therefore, not only may the installed state of the tape cassette 30 be correctly detected, as described above, but the distance between the switch holes in the and indicator portion 800 can also be increased and the strength of the cassette case 31 may therefore be improved.

The tape cassette and the tape printer of the present invention are not limited to those in the above-described embodiment, and various modifications and alterations may of course be made insofar as they are within the scope of the present invention.

Figure 35:
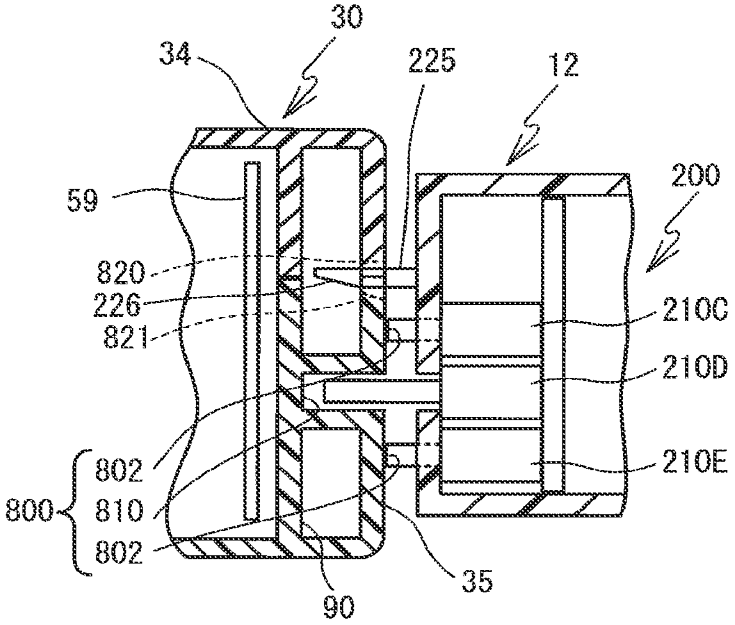
FIG. 35 is a cross-sectional view along a IV-IV line shown in FIG. 14 as seen in the direction of the arrows, when the platen holder 12 shown in FIG. 9 is opposed to the tape cassette 30 shown in FIG. 14 in a modified embodiment.

The shape, size, number and arrangement pattern of the non-pressing portion(s) 801 and 901 and the pressing portion(s) 802 and 902 of the arm indicator portion 800 and the rear indicator portion 900 are not limited to the examples represented in the above-described embodiment, but can be modified. For example, in the above-described embodiment, the non-pressing portion 801 of the arm indicator portion 800 is a through-hole with a square shape in a front view, and the non-pressing portions 901 of the rear indicator portion 900 is a through-hole with a circular shape in a front view. However, both the non-pressing portion 801 and the non-pressing portion 901 may have the same shape, or may have other differing shapes. Furthermore, the non-pressing portions 801 provided in the arm indicator portion 800 may not be a through-hole, but may be an indentation 810 formed on the arm front surface 35, as shown in FIG. 35. The indentation 810 extends to the separating wall 90, but does not reach the internal wall 34C. Therefore, a member that forms the indentation 810 may form an aperture that functions as a switch hole and also as an indicator that can be identified by a person by visually checking, without restricting the formation of the tape feed path and the ribbon feed path.

Figure 36:
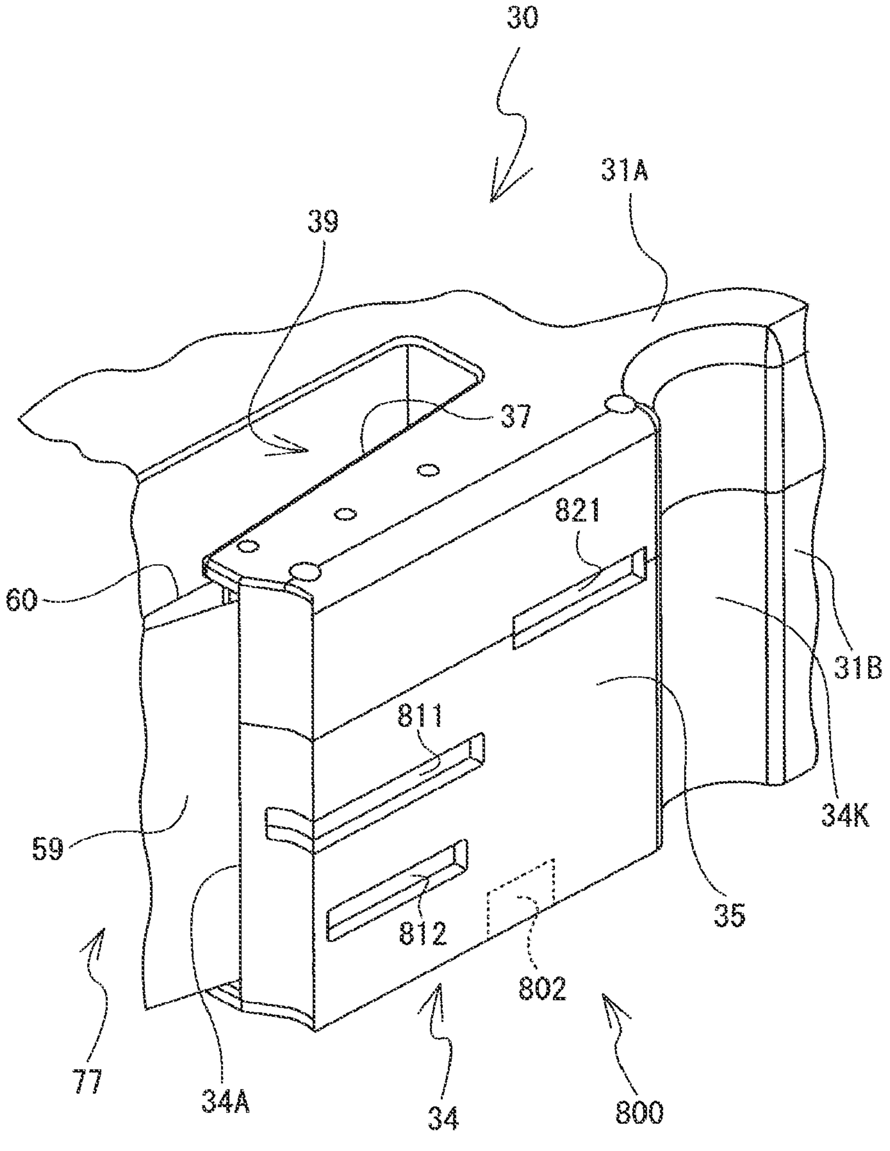
FIG. 36 is an enlarged perspective view of the arm portion 34 of the tape cassette 30 in another modified embodiment.
Figure 37:
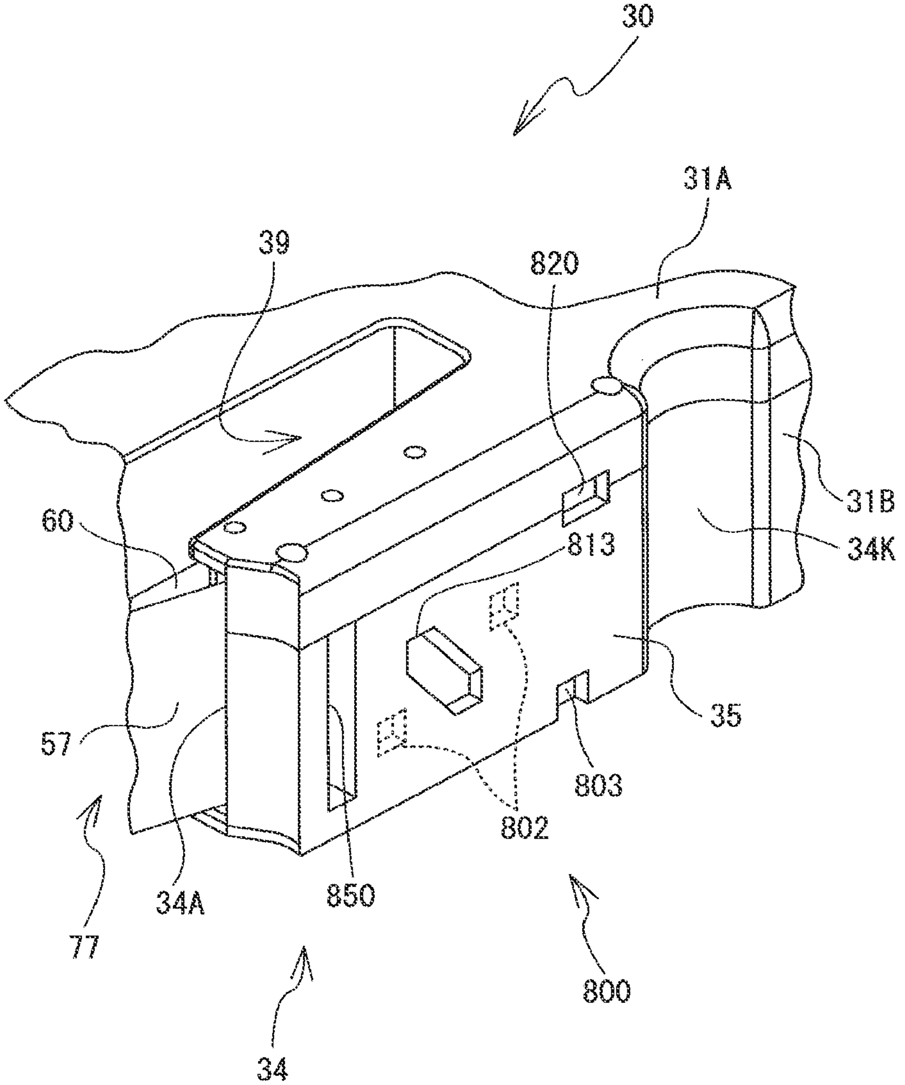
FIG. 37 is an enlarged perspective view of the arm portion 34 of the tape cassette 30 in yet another modified embodiment.
Figure 38:
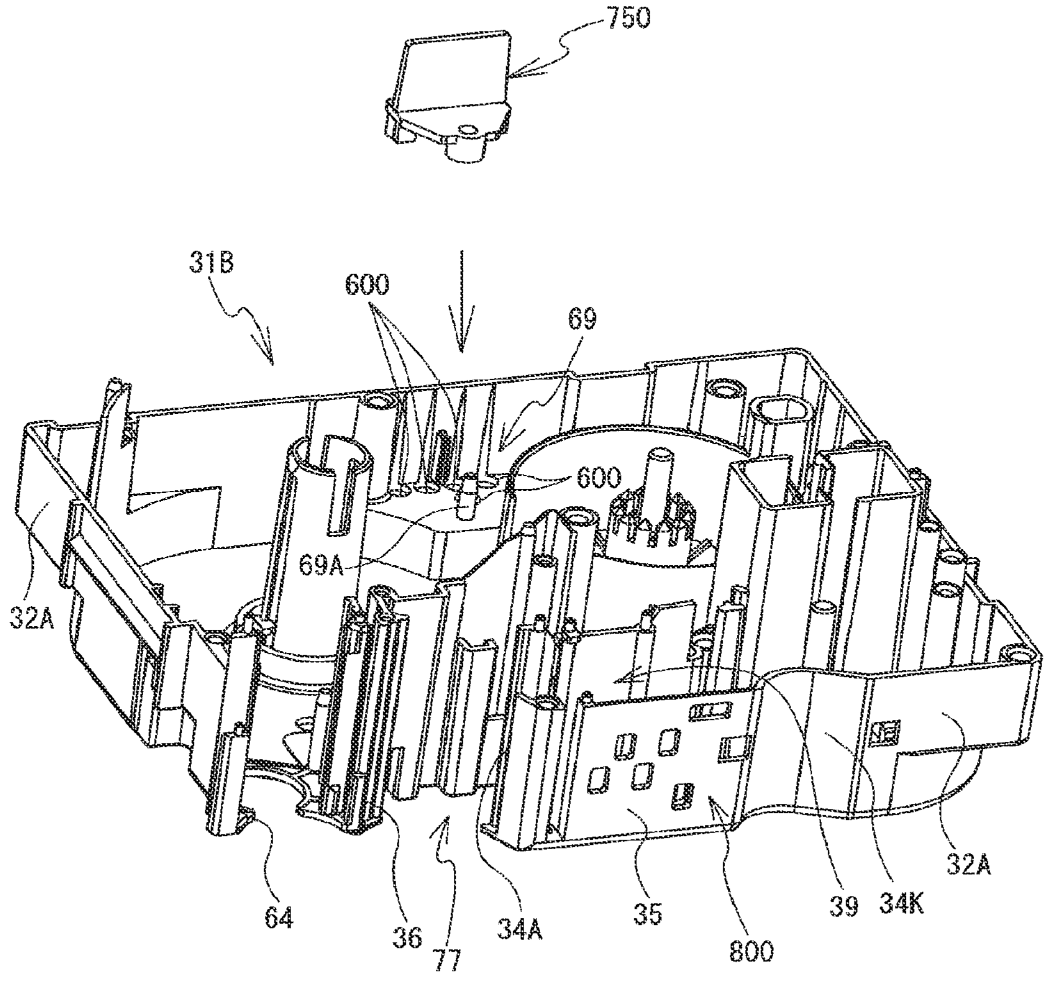
FIG. 38 is a perspective view illustrating a bottom case 31B and a sensor part 750.

In a case where a plurality of non-pressing portions that respectively oppose a plurality of arm detection switches 210 are provided in close proximity in the same row in the vertical direction in the arm indicator portion 800, the non-pressing portions may be connected with each other in the horizontal direction to form grooves 811 and 812, as shown in FIG. 36. In addition, as shown in FIG. 37, in the arm indicator portion 800, a groove 813 may be formed in which the non-pressing portions in close proximity are connected with each other. With the narrow-width tape cassette 30 shown in FIG. 37, the groove 813 is formed in a diagonal direction by connecting the two indicators 800A and 800D that are the non-pressing portions of the narrow-width tape cassette 30 shown in FIG. 19.

As described above, the indicators of the arm indicator portion 800 are not aligned in the vertical direction, and therefore, if a plurality of the grooves 811, 812, and 813 that connect the indicators are formed, the grooves 811, 812, and 813 are formed in the horizontal direction (refer to FIG. 36) or in a diagonal direction (refer to FIG. 37). The grooves 831, 812, and 813 may also be formed to connect to the escape hole 803 or the through-hole 850.

Furthermore, in the above-described embodiment, by affixing the label sheet 700 and thus exposing or covering the detection holes 600 that are formed in the rear indentation 68C, the arrangement pattern of the rear indicator portion 900 (the indicators 900A to 900E) can be changed in accordance with the tape type of the tape cassette 30, but the present invention is not limited to this example. For example, as shown in FIG. 38 to FIG. 41, the arrangement pattern of the rear indicator portion 900 (the indicators 900A to 900E) may be changed by attaching a sensor part 750 to the rear indentation 68C.

As shown in FIG. 38 to FIG. 41, in the interior of the bottom case 31B of the cassette case 31, a parts attachment portion 69 is formed in a rear portion where the rear indentation 68C is formed, and at the same height position as the common portion 32. The parts attachment portion 69 has a flat surface and has a triangular shape in a plan view that corresponds to the shape of the rear indentation 68C. The sensor part 750 can be freely attached to or removed from the flat surface of the parts attachment portion 69. The parts attachment portion 69 includes the detection holes 600 that are formed in the rear indentation 68C and face the interior of the bottom case 31B, and a latching pin 69A that protrudes in the upward direction at the front of the detection holes 600. The leading end of the latching pin 69A has a shape in which the diameter gradually decreases in the upward direction such that the latching pin 69A can be easily inserted into a shaft hole of a cylinder member 753, which will be described later.

Figure 39:
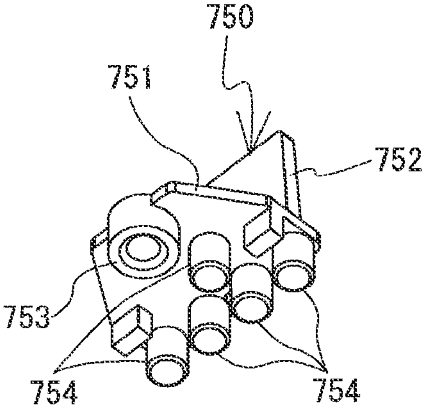
FIG. 39 is a perspective view as seen from diagonally below the sensor part 750.

As shown in FIG. 39, the sensor part 750 has a base 751 that has a triangular shape in a plan view generally corresponding to the parts attachment portion 69, and a flat plate handle portion 752 that extends from the rear edge of the base 751 in the upward direction. Blocking pins 754 are formed on the lower surface of the base 751 at positions corresponding to at least some of the detection holes 600 and protrude in the downward direction. Each of the blocking pins 754 has a cylindrical shape and a diameter that is generally equal to the opening width of the detection holes 600. In the present embodiment, respectively corresponding to all the five detection holes 600, four of the blocking pins 754 are arranged in a single row along the rear edge of the base 751, and the remaining blocking pin is positioned to the front of the four blocking pins 754 arranged in the row. In the front portion of the base 751, the cylinder member 753 is provided, corresponding to the latching pin 69A shown in FIG. 38. The cylinder member 753 has a shaft hole that extends in the vertical direction, and the opening width of the shaft hole is generally the same with the diameter of the latching pin 69A.

Figure 40:
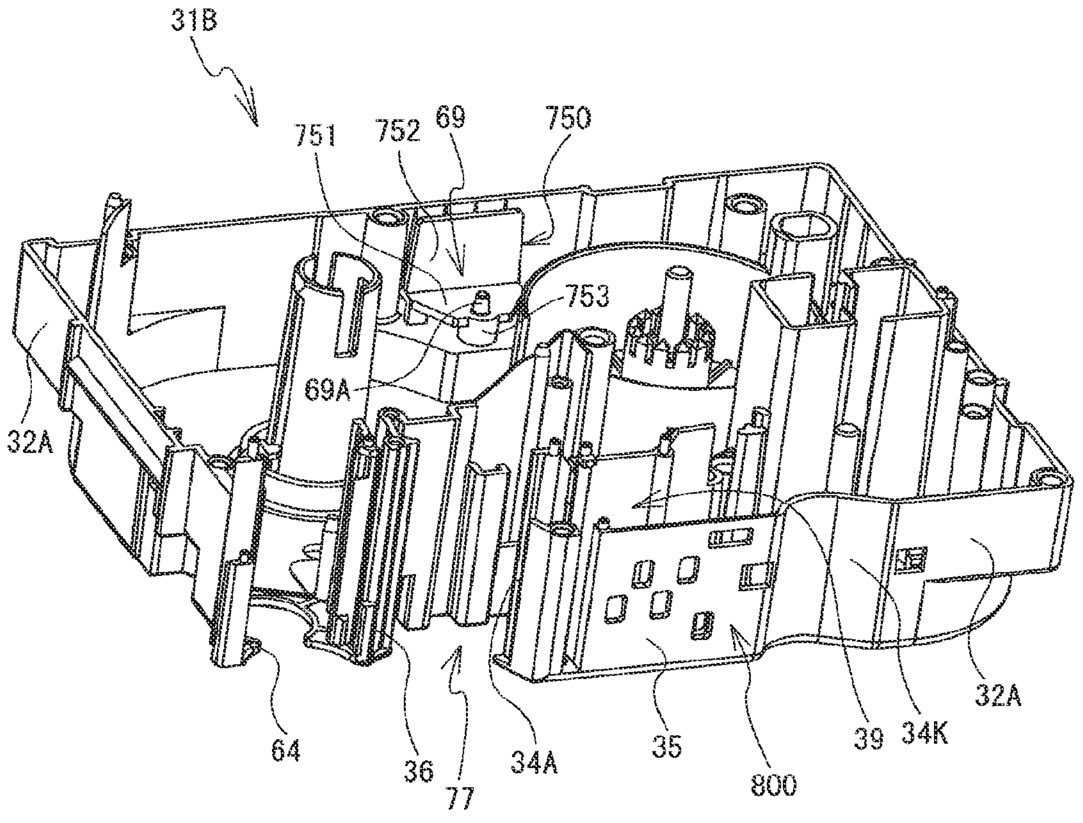
FIG. 40 is a perspective view as seen from diagonally above the bottom case 31B to which the sensor part 750 is attached.
Figure 41:
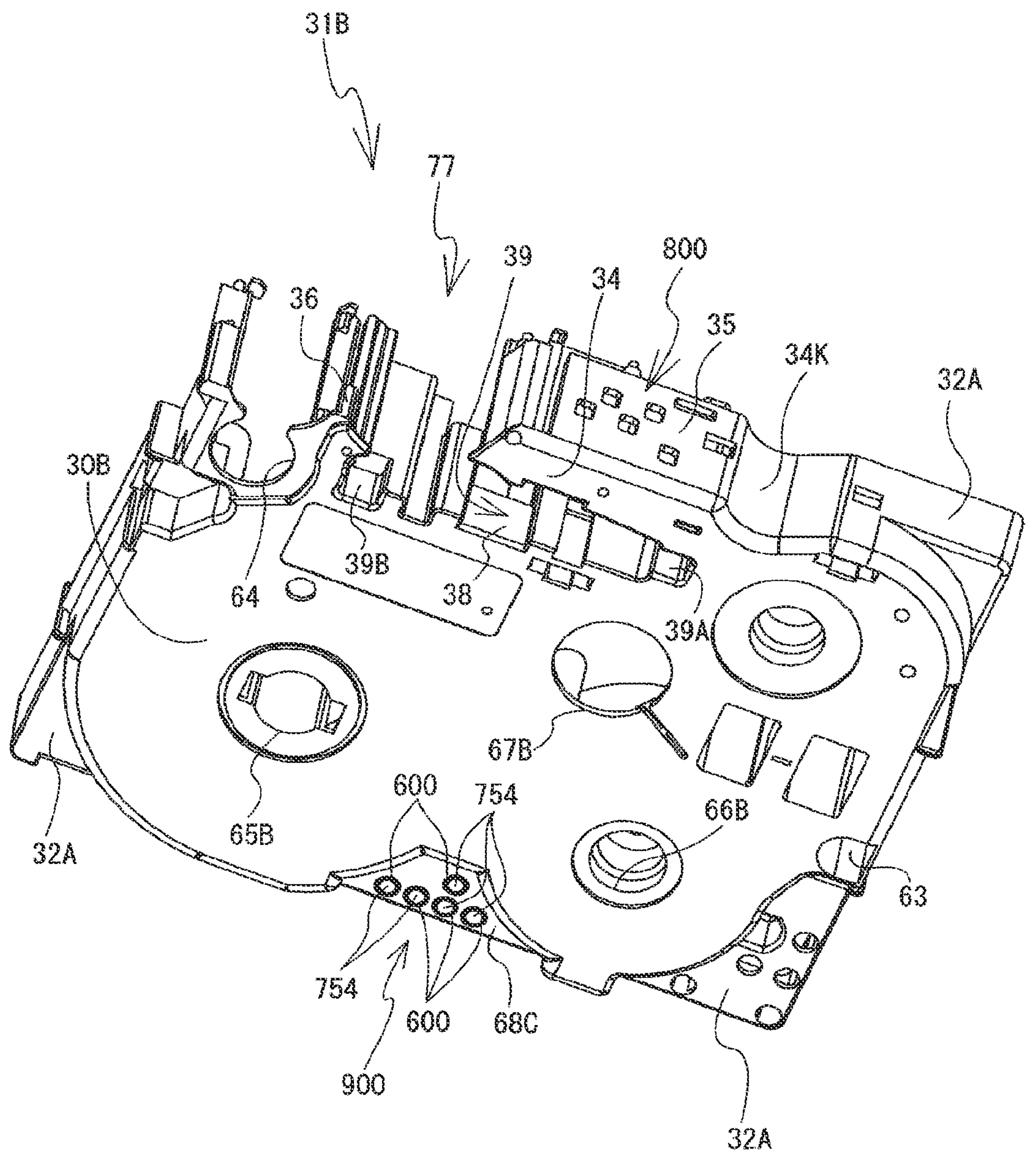
FIG. 41 is a perspective view as seen from diagonally below the bottom case 31B to which the sensor part 750 is attached.

When the sensor part 750 is attached to the parts attachment portion 69, the worker holds the handle portion 752 between the fingers and moves the sensor part 750 in the downward direction such that the latching pin 69A is inserted into the shaft hole of the cylinder 753 and the blocking pins 754 are fitted into the corresponding detection holes 600. Then, as shown in FIG. 40 and FIG. 41, the cylinder 753 is engaged with the latching pin 69A at a position where a lower end of the cylinder 753 is in contact with the parts attachment portion 69. At the same time, the blocking pins 754 are fixed inside the respective detection holes 600.

When the sensor part 750 is attached to the parts attachment portion 69 in such a way, the rear detecting switches 310 cannot be inserted into the detection holes 600 into which the blocking pins 754 have been fitted. As a result, the detection holes 600 into which the blocking pins 754 have been fitted form the pressing portions 802 that press the rear detecting switches 310, and cause the rear detecting switches 310 to be in the on state, in a similar way to the detection holes 600 that are covered by the blocking portions 703B of the above-described label sheet 700. On the other hand, the detection holes 600 into which the blocking pins 754 have not been fitted, and that are thus exposed, form the non-pressing portions 801 through which the rear detecting switches 310 are inserted, and cause the rear detecting switches 310 to be in the off state, in a similar way to the detection holes 600 that are exposed through the holes 703A of the above-described label sheet 700.

In the tape cassette 30 manufacturing process, the worker may attach the sensor part 750 to the parts attachment portion 69 that has the blocking pins 754 arranged in a pattern that corresponds to the contents housed in the cassette case 31. In a similar way as in a case where the label sheet 700 is affixed, by exposing and blocking the detection holes 600 formed in the rear indentation 68C in this way, the arrangement pattern of the rear indicator portion 900 (the indicators 900A to 900E) can be changed in accordance with the tape type of the tape cassette 30.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette comprising:

a cassette case having a first end portion and a second end portion separated from the first end portion in a first direction, and having a third end portion and a fourth end portion separated from the third end portion in a second direction;

a first spool positioned in the cassette case, the first spool positioned closer to the third end portion of the cassette case than to the fourth end portion in the second direction, the first spool positioned closer to the second end portion than to the first end portion in the first direction;

a ribbon spool positioned in the cassette case, the ribbon spool positioned closer to the fourth end portion than to the third end portion in the second direction; and a tape drive roller rotatable about an axis extending in a third direction, the tape drive roller configured to allow tape to be discharged from inside of the cassette case, the tape drive roller positioned closer to the first end portion of the cassette case in the first direction than to the second end portion, the tape drive roller positioned closer to the third end portion of the cassette case than the fourth end portion of the cassette in the second direction, wherein the cassette case includes an arm positioned at the first end portion, the arm extending in the second direction, the arm having a first outer surface facing a portion of the cassette case in the first direction and a second outer surface facing away from the cassette case in the first direction, and the arm has an exit configured to allow ink ribbon to be discharged toward the tape drive roller from inside of the cassette case, wherein the arm includes a first indicator and a second indicator arranged at the second outer surface in a predetermined pattern, a position of the first indicator is different from a position of the second indicator in the second direction and the third direction.

2. The tape cassette according to claim 1, wherein each of the first indicator and the second indicator is one of a hole extending through the second outer surface and a predetermined area of the second outer surface.

3. The tape cassette according to claim 2, wherein the predetermined area is continuous with the second outer surface.

4. The tape cassette according to claim 1, wherein the first indicator is a hole extending through the second outer surface, and wherein the second indicator is a predetermined area of the second outer surface.

5. The tape cassette according to claim 4, wherein the predetermined area is continuous with the second outer surface.

6. The tape cassette according to claim 5, wherein the second direction is orthogonal to the first direction, and wherein the third direction is orthogonal to the first direction and the second direction.

7. The tape cassette according to claim 6, further comprising:

a tape wound around the first spool.

8. The tape cassette according to claim 7, wherein the first indicator indicates a width of the tape.

9. The tape cassette according to claim 7, further comprising:

a latching hole positioned at the second outer surface, a portion of the latching hole being farther from the third end portion than the first indicator and the second indicator in the second direction, wherein a position of the latching hole in the third direction is different from the position of the first indicator in the third direction, and wherein the position of the latching hole in the third direction is different from the position of the second indicator in the third direction.

10. The tape cassette according to claim 9, wherein the latching hole allows a portion of an associated printer to be inserted.

11. The tape cassette according to claim 5, further comprising:

a tape wound around the first spool.

12. The tape cassette according to claim 11, wherein the first indicator indicates a width of the tape.

13. The tape cassette according to claim 4, wherein the second direction is orthogonal to the first direction, and wherein the third direction is orthogonal to the first direction and the second direction.

14. The tape cassette according to claim 13, further comprising:

a tape wound around the first spool.

15. The tape cassette according to claim 14, further comprising:

a latching hole positioned at the second outer surface, a portion of the latching hole being farther from the third end portion than the first indicator and the second indicator in the second direction, wherein a position of the latching hole in the third direction is different from the position of the first indicator in the third direction, and wherein the position of the latching hole in the third direction is different from the position of the second indicator in the third direction.

16. The tape cassette according to claim 15, wherein the latching hole allows a portion of an associated printer to be inserted.

17. The tape cassette according to claim 6, further comprising:

a latching hole positioned at the second outer surface, a portion of the latching hole being farther from the third end portion than the first indicator and the second indicator in the second direction, wherein a position of the latching hole in the third direction is different from the position of the first indicator in the third direction, and wherein the position of the latching hole in the third direction is different from the position of the second indicator in the third direction.

18. The tape cassette according to claim 17, wherein the latching hole allows a portion of an associated printer to be inserted.

19. The tape cassette according to claim 14, wherein the first indicator indicates a width of the tape.

20. The tape cassette according to claim 13, further comprising:

a latching hole positioned at the second outer surface, a portion of the latching hole being farther from the third end portion than the first indicator and the second indicator in the second direction, wherein a position of the latching hole in the third direction is different from the position of the first indicator in the third direction, and wherein the position of the latching hole in the third direction is different from the position of the second indicator in the third direction.

21. The tape cassette according to claim 20, wherein the latching hole allows a portion of an associated printer to be inserted.

22. The tape cassette according to claim 4, further comprising:

a tape wound around the first spool.

23. The tape cassette according to claim 22, wherein the first indicator indicates a width of the tape.

24. The tape cassette according to claim 1, wherein the second direction is orthogonal to the first direction, and wherein the third direction is orthogonal to the first direction and the second direction.

25. The tape cassette according to claim 24, further comprising:

a tape wound around the first spool.

26. The tape cassette according to claim 25, wherein the first indicator indicates a width of the tape.

27. The tape cassette according to claim 1, further comprising:

a tape wound around the first spool.

28. The tape cassette according to claim 27, wherein the first indicator indicates a width of the tape.

29. The tape cassette according to claim 1, wherein the first indicator is configured to press a switch of an associated printer, and the second indicator is configured to not press a second switch of an associated printer.

30. The tape cassette according to claim 1, further comprising:

a second spool positioned in the cassette case, the second spool is positioned closer to the fourth end portion than to the third end portion in the second direction, the second spool is positioned closer to the second end portion than to the first end portion in the first direction.

31. The tape cassette according to claim 1, wherein the cassette case has a bottom surface that extends from second end portion to the first end portion in the first direction, and extends from the fourth end portion and to third end portion in the second direction, and wherein the cassette case has a third indicator positioned in the bottom surface adjacent the second end portion at a location that is between the first spool and the second spool in the second direction.

32. The tape cassette according to claim 31, wherein the first indicator is a hole extending through the second outer surface, the second indicator is a predetermined area of the second outer surface that is continuous with the second outer surface, and the third indicator is a hole extending through the bottom surface.

33. The tape cassette according to claim 32, further comprising:

a tape wound around the first spool, wherein at least one of the first indicator and the second indicator indicates a width of the tape, and wherein the third indicator indicates color information of the tape.

34. The tape cassette according to claim 1, wherein the first indicator is a pressing portion, and the second indicator is a non-pressing portion.

35. A tape cassette comprising:

a cassette case having a first end portion and a second end portion separated from the first end portion in a first direction, and having a third end portion and a fourth end portion separated from the third end portion in a second direction;

a first spool positioned in the cassette case, the first spool positioned closer to the third end portion of the cassette case than to the fourth end portion in the second direction, the first spool positioned closer to the second end portion than to the first end portion in the first direction;

a ribbon spool positioned in the cassette case, the ribbon spool positioned closer to the fourth end portion than to the third end portion in the second direction; and a tape drive roller rotatable about an axis extending in a third direction, the drive roller configured to allow tape to be discharged from inside of the cassette case, the tape drive roller positioned closer to the first end portion of the cassette case in the first direction than to the second end portion, the tape drive roller positioned closer to the third end portion of the cassette case than the fourth end portion of the cassette in the second direction, wherein the cassette case includes an arm positioned at the first end portion, the arm extending in the second direction, the arm having a first outer surface facing a portion of the cassette case in the first direction and a second outer surface facing away from the cassette case in the first direction, and the arm has an exit configured to allow ink ribbon to be discharged toward the tape drive roller from inside of the cassette case, wherein the arm includes a first pressing portion and a first non-pressing portion both positioned at the second outer surface, the first non-pressing portion includes a surface that is spaced away from the first pressing portion in the first direction.

36. The tape cassette according to claim 35, wherein the arm includes a second non-pressing portion positioned at the second outer surface, and the first pressing portion and the first non-pressing portion are spaced away from each other in the second direction.

37. The tape cassette according to claim 36, wherein the second non-pressing portion is spaced away from the first non-pressing portion in the third direction, and the first non-pressing portion is a first hole located in the second outer surface and the second non-pressing portion is a second hole located in the second outer surface.

38. The tape cassette of claim 35, wherein the first pressing portion is a continuous portion of the second outer surface.

39. The tape cassette of claim 38, wherein the first non-pressing portion is a hole located in the second outer surface.

40. The tape cassette of claim 35, wherein the first non-pressing portion is a hole located in the second outer surface.

41. The tape cassette according to claim 35, further comprising:

a second spool positioned in the cassette case, the second spool is positioned closer to the fourth end portion than to the third end portion in the second direction, the second spool is positioned closer to the second end portion than to the first end portion in the first direction.

42. The tape cassette according to claim 35, wherein the cassette case has a bottom surface that extends from the second end portion to the first end portion in the first direction, and extends from the fourth end portion to the third end portion in the second direction, and wherein the cassette case has a second pressing portion and a second non-pressing portion positioned at the bottom surface at a location that is between the first spool and the second spool in the second direction.

43. The tape cassette according to claim 42, further comprising:

a tape wound around the first spool, wherein at least one of the first pressing portion and the first non-pressing portion indicates a width of the tape, and wherein at least one of the second pressing portion and the second non-pressing portion indicates color information of the tape.

44. The tape cassette according to claim 35, wherein the second direction is orthogonal to the first direction, and wherein the third direction is orthogonal to the first direction and the second direction.

45. The tape cassette according to claim 44, further comprising:

a tape wound around the first spool.

46. The tape cassette according to claim 45, wherein the first pressing portion indicates a width of the tape.

47. The tape cassette according to claim 35, further comprising:

a tape wound around the first spool.

48. The tape cassette according to claim 47, wherein the first pressing portion indicates a width of the tape.

* * * * *